(12) United States Patent
Fukuda et al.

(10) Patent No.: US 8,347,332 B2
(45) Date of Patent: Jan. 1, 2013

(54) INFORMATION PROCESSING APPARATUS, INFORMATION PROCESSING METHOD, PROGRAM, INFORMATION PROVIDING APPARATUS, INFORMATION PROVIDING METHOD, AND INFORMATION PROCESSING SYSTEM

(75) Inventors: Kazuhiro Fukuda, Kanagawa (JP); Daisuke Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 12/729,757

(22) Filed: Mar. 23, 2010

(65) Prior Publication Data

US 2010/0257560 A1    Oct. 7, 2010

(30) Foreign Application Priority Data

Apr. 7, 2009  (JP) ................................ 2009-093410

(51) Int. Cl.
*H04H 60/33* (2008.01)
*H04N 7/10* (2006.01)
*H04N 7/025* (2006.01)
*H04N 5/445* (2006.01)
*G06F 3/00* (2006.01)
*G06F 13/00* (2006.01)

(52) U.S. Cl. .................. 725/41; 725/9; 725/32; 725/37; 725/39; 725/40; 725/43; 725/44; 725/46; 725/50

(58) Field of Classification Search ..................... 725/43
See application file for complete search history.

(56) References Cited

U.S. PATENT DOCUMENTS

| | | | |
|---|---|---|---|
| 7,584,214 B2* | 9/2009 | Narahara et al. ....................... 1/1 |
| 2009/0019488 A1* | 1/2009 | Ruiz-Velasco et al. ......... 725/43 |
| 2009/0070819 A1* | 3/2009 | Gajda et al. ..................... 725/46 |

FOREIGN PATENT DOCUMENTS

JP    2009-5260    1/2009

* cited by examiner

*Primary Examiner* — Justin Shepard
(74) *Attorney, Agent, or Firm* — Oblon, Spivak, McClelland, Maier & Neustadt, L.L.P.

(57) ABSTRACT

There is provided a TV set including a content-related information control section which transmits the one or plurality of pieces of viewed content identification information to an ECG server and receives, from the ECG server, content-related information related to content having a relationship with respect to viewed content identified by each of the transmitted one or plurality of pieces of viewed content identification information, and a display control section which causes the display section to display an image based on image data included in each of one or a plurality of pieces of content-related information corresponding to content tuning information the input of which is accepted by an input section from among respective pieces of content-related information that the content-related information control section have received.

11 Claims, 38 Drawing Sheets

FIG.1
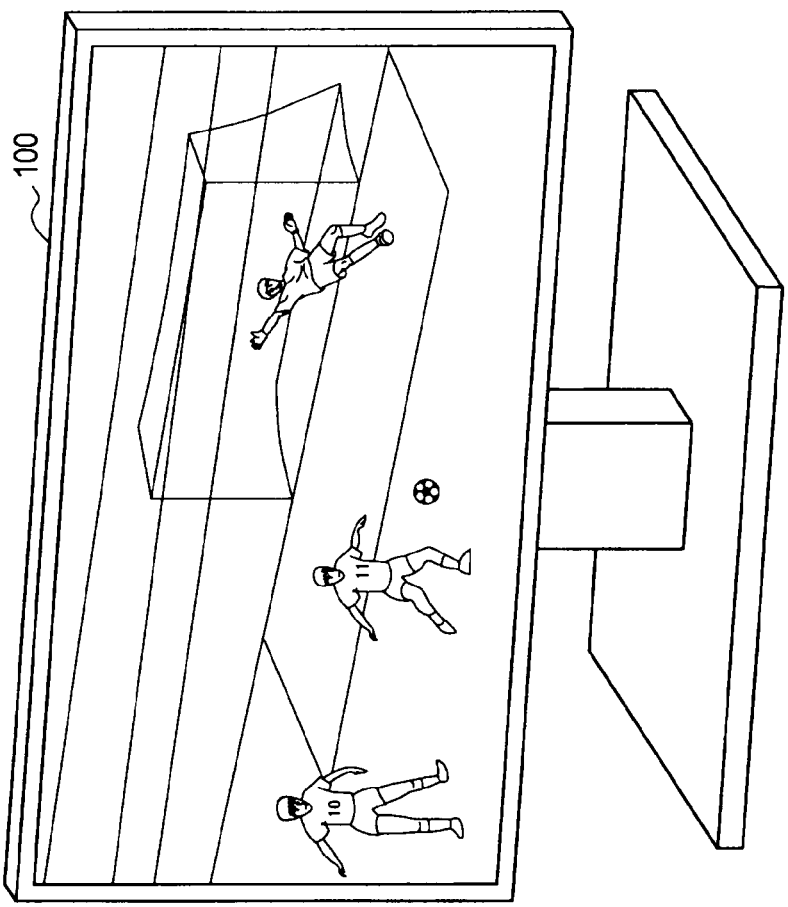
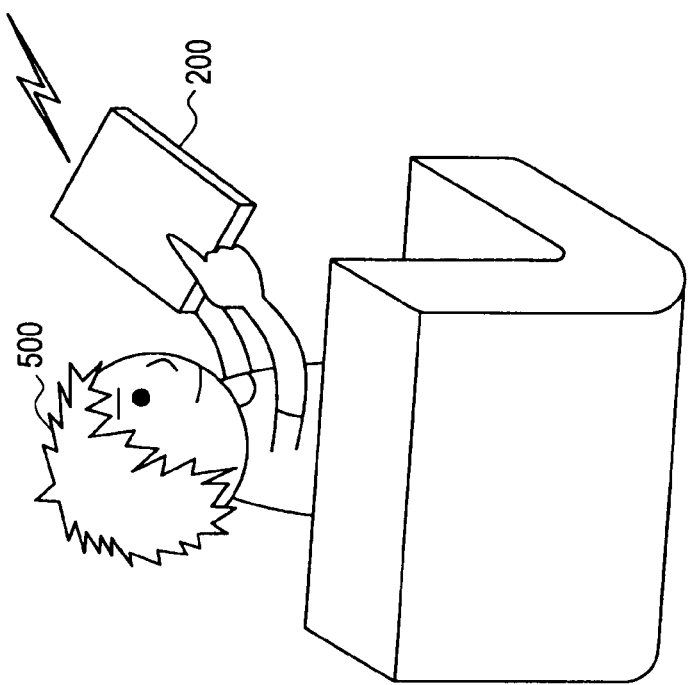

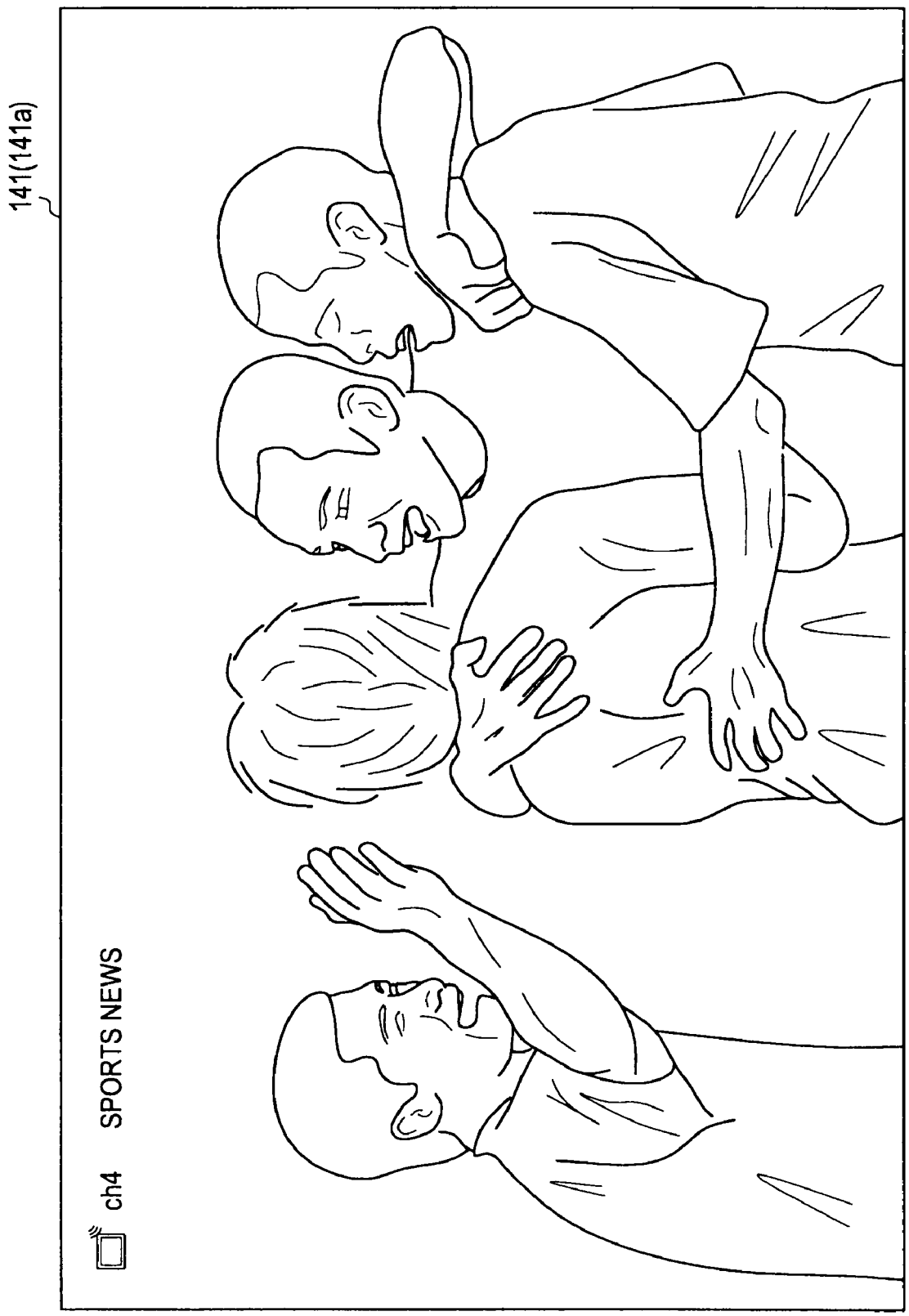

FIG.8

PROGRAM GUIDE: TV

8 MARCH (SUN)

141(141b)

| | ch1 | ch2 | ch3 | ch4 | ch5 | ch6 |
|---|---|---|---|---|---|---|
| 18:00 | 15 AMERICA | 15 COOKING | | 00 HEALTH | 00 AFTERNOON TRIP | 00 CLASSIC HIT MUSIC |
| | 35 CAPITAL CITY | 35 CLASSIC CARTOON FILM | 25 FRANCE/ | 15 AMERICA | 30 BODY DESIRES GARLIC | 30 CHILD REARING |
| | 55 LOOK-AHEAD | | 50 FAMOUS PAI | 30 CAPITAL CITY | | |
| 19:00 | 00 NEWS | 00 LIVE PARLIAMENTARY PROCEEDINGS "UPPER HOUSE BUDGET COMMITTEE DISCUSSION" | 00 WORLD ARCHITECTURE | 45 INTRODUCTION TO BADMINTON | 00 TAIWANESE DRAMA: ROSY LOVE | 00 MOVIE "HUNDRED LIES" DIRECTOR: A CAST: B CAST: C |
| | 15 ISLAND NEWS | | 55 MANPOWER | 50 GYMNASTICS | 54 ROYAL | |
| 20:00 | 00 NEWS | | 00 HI-VISION SERIES: EQUATOR ? CYCLE OF LIFE | 00 SPORTS NEWS | 00 PROGRAM A | |
| | 15 AMERICA/PBS "JIM RAILER" | | | | | |
| | | | | | 30 BEAUTY | |
| 21:00 | 00 NEWS | | | 00 NEWS | 00 AFTERNOON TRIP | 00 DRAMA "TOMORROW" DIRECTOR: D |
| | 15 AMERICA/ | | 50 HAIKU | 00 WELFARE | 30 OPEN! DOOR TO HEALTHY LIVING | |
| | 25 MARKET | | 55 CHILDREN'S | | | |
| | 55 OVERSEAS S ▽ | | | | | |

(BLUE) PREVIOUS DAY  (RED) NEXT DAY  (GREEN) CHANNEL SELECTION  (YELLOW) ZOOM IN/ZOOM OUT  (DECISION) PROGRAM DESCRIPTION  (OPTION) FUNCTION DISPLAY  (RETURN) END

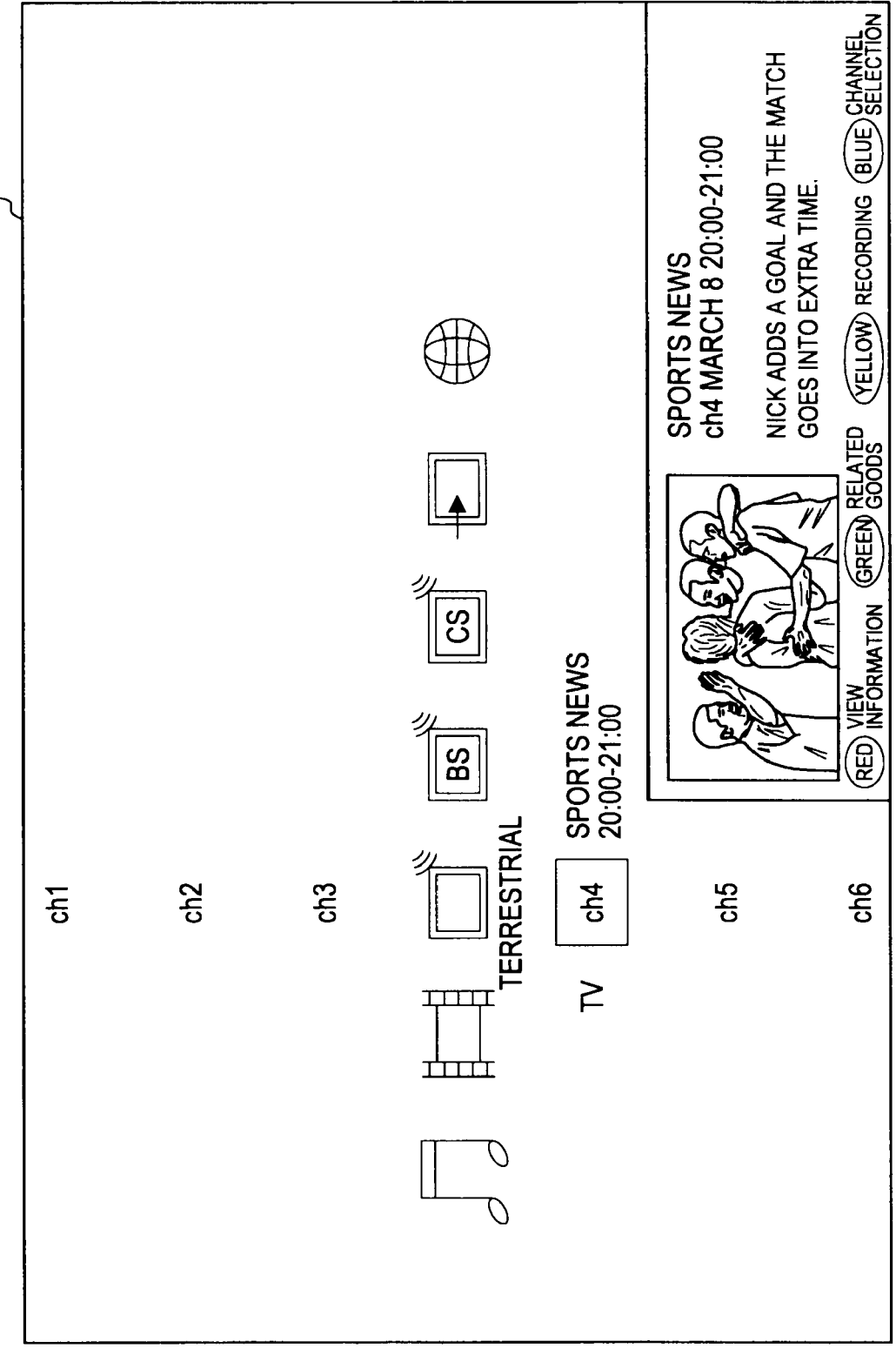

(ECG RELATION ATTRIBUTE/ECG RELATION POINT)

PROGRAM CHARACTERISTICS

FIG.39

EPG SI

```
<?xml version="1.0" encoding="UTF-8"?>
<EPGInfo ID="0000000009" index="0" status="0" message="OK">
    <title>JUSTICE</title>
    <networkID>7fe2</networkID>
    <serviceID>0410</serviceID>
    <eventID>1234</eventID>
    <startTime>2007-12-04T22:00:00+09:00</startTime>
    <endTime>2008-12-04T22:59:59+09:00</endTime>
    <expireDate>2008-12-05T00:00:00+09:00</expireDate>
    <scheduleCode>000000000004</scheduleCode>
    <formatCode>0000000004</formatCode>
    <broadcastStationName>TV STATION N</broadcastStationName>
</EPGInfo>
```

FIG.40

ECG DATA

```xml
<?xml version="1.0" encoding="UTF-8"?>
<ECG ID="0000000002" viewType="APC1.0" default="0" networkID="7fe2" serviceID="0410" startTime="2009-12-04T22:00:00+09:00" >
<ECG-Popup ECG-Relations-Attribute="Genre" ECG-Relations-Point="8" ECG-Relations-image="http://testData/forTV/4_seigi/data/popup1.png" />
<ECG-Item ID="00000001" type=" program" layoutType="000" data=" direct" index="0" status="0" message="OK">
    <title><![CDATA[JUSTICE]]></title>
    <description><![CDATA[JUSTICE]]></description>
    <descriptionLong><![CDATA[STORY ABOUT HAVING A SISTER WHO IS LIKE AN ANGEL]]></descriptionLong>
    <representativeImageURL>http://testData/forTV/4_seigi/data/seigi/seigi_logo_S.png</representativeImageURL>
    <image1URL>http://testData/forTV/4_seigi/data/seigi/seigi_logo_L.png</image1URL>
    <image2URL>http://testData/forTV/4_seigi/data/nittele_logo.png</image2URL>
    <image3URL></image3URL>
    <linkURL></linkURL>
</ECG-Item>

<ECG-Item ID="00000002" type=" person " layoutType="010" data=" direct" index="1" status="0" message="OK">
...
</ECG-Item>
<ECG-Item ID="00000003" type=" ad" layoutType="020" data=" direct" index="2" status="0" message="OK">
...
</ECG-Item>
<ECG-Item ID="00000004" type=" ec" layoutType="030" data=" mashupECMetaSearch" index="3" status="0" message="OK">
<filter watched="0" from="2000-01-01T00:00:00+09:00" to="2037-12-31T23:59:59+09:00" />
    <site>amazon</site>
    <title><![CDATA[CINDY 2010 CALENDAR]]></title>
    <description><![CDATA[CINDY 2010 CALENDAR]]></description>
    <descriptionLong><![CDATA[CALENDAR: 9 PAGES PUBLISHER: X COMPANY (19/11/2009) ASIN: B000VRUU52  RELEASE DATE: 19/11/2009 SIZE OF THE PRODUCT: 30.8 x 30.6 x 0.4 cm ]]></descriptionLong>
    <representativeImageURL>http://testData/forTV/4_seigi/data/seigi_S04.png</representativeImageURL>
    <image1URL>http://testData/forTV/4_seigi/data/seigi_amazon.png</image1URL>
    <image2URL>http://testData/forTV/4_seigi/data/amazon_logo.png</image2URL>
    <image3URL>http://testData/forTV/4_seigi/data/seigi_QR.png</image3URL>
    <linkURL></linkURL>
    <price>2,415</price>
    <productCode>B000VRUU52</productCode>
</ECG-Item>
</ECG>
```

INFORMATION PROCESSING APPARATUS, INFORMATION PROCESSING METHOD, PROGRAM, INFORMATION PROVIDING APPARATUS, INFORMATION PROVIDING METHOD, AND INFORMATION PROCESSING SYSTEM

BACKGROUND OF THE INVENTION

1. Field of the Invention

The present invention relates to an information processing apparatus, an information processing method, a program, an information providing apparatus, an information providing method, and an information processing system.

2. Description of the Related Art

In general, content-related information related to content (e.g., program content) provided by a provider is introduced in radio and TV listings in newspapers, TV magazines, and the like. In the introduction, there is provided text information which serves as information for confirming when and which content is provided. It is difficult, however, to find the content which the viewer/listener wants to watch or listen to, because the text information does not include visual information such as a photograph that indicates the substance of the content and a photograph or a logo of the cast involved in the content.

The same can be said with regard to an EPG (Electronic Program Guide) displayed on a TV set. That is, the information related to the content is also displayed in small letters on the electronic program guide, and hence, the viewer/listener may not find or may lose the content which the viewer/listener wants to watch or listen to, which is inconvenient.

Further, there are disclosed various technologies for displaying content-related information (for example, refer to Japanese Patent Application Laid-Open No. 2009-005260).

SUMMARY OF THE INVENTION

However, although a user can view content-related information according to the above-mentioned technologies, the operation of extracting the content-related information that attracts the user's interest from a plurality of pieces of content-related information is complicated. Accordingly, there was an issue that it took a long time for the user to find the content of interest. Further, there was another issue that it was difficult for the user to newly recognize the presence of the content of interest. Still further, there was another issue that it was difficult for the user to find by a simple operation the content of interest in accordance with a change in the user's preference in the case where the change occurs. In addition, there was also another issue that, for example, it was difficult for a provider to increase the viewing rate of the content that the provider provides and to increase the sales, because it was difficult for the provider of the content to effectively attract audience to watch or listen to the content that the provider provides.

In light of the foregoing, it is desirable to provide a novel and improved technology which can decrease the time taken for a user to find the content of interest.

According to an embodiment of the present invention, there is provided an information processing apparatus including a display section which is capable of displaying information, an input section which accepts, from a user, an input of content tuning information which is information for identifying a provider that is a providing source of content, a storage section which stores one or a plurality of pieces of viewed content identification information each of which is information for identifying each of one or a plurality of pieces of content that has been watched and listened to by the user, a content-related information control section which transmits the one or plurality of pieces of viewed content identification information to another device and receives, from such other device, content-related information related to content having a relationship with respect to viewed content identified by each of the transmitted one or plurality of pieces of viewed content identification information, and a display control section which causes the display section to display an image based on image data included in each of one or a plurality of pieces of content-related information corresponding to the content tuning information the input of which is accepted by the input section from among respective pieces of content-related information that the content-related information control section have received.

The content-related information control section may further receive a relation point from such other device, the relation point indicating a degree of relationship between the content having a relationship with respect to the viewed content and the viewed content and being correlated with each of the one or plurality of pieces of content-related information, and the display control section may decide a priority order of the one or plurality of pieces content-related information based on the degree of respective relation points, and may cause the display section to display the image based on image data included in each of the one or plurality of pieces of content-related information depending on the decided priority order.

The content-related information control section may further receive a relation attribute from such other device, the relation attribute indicating a relationship between the content having a relationship with respect to the viewed content and the viewed content and being correlated with each of the one or plurality of pieces of content-related information, and the display control section may further cause the display section to display the relation attribute received by the content-related information control section by being correlated with the image which is displayed based on the image data included in each of the one or plurality of pieces of content-related information which is received by being correlated with the relation attribute.

The display control section may cause a predetermined tuning screen to be displayed on the display section and may also switch the predetermined tuning screen which is displayed on the display section to a tuning screen depending on the content tuning information the input of which is accepted by the input section, and may cause the image to be displayed on the tuning screen which is being displayed on the display section in an overlapping manner based on the image data.

The input section may be capable of accepting an input of image selection information for selecting one image from the images displayed on the display section and a recording reservation request for performing recording reservation of content, and, when the input section accepts the inputs of the image selection information and the recording reservation request, the display control section may acquire, from the content-related information including the image data which is a source of the image selected by the image selection information, tuning information for identifying the provider that provides content related to the content-related information and a start time from which the content is provided from the provider, and may register in the storage section recording reservation information obtained by correlating the acquired tuning information with the start time.

The information processing apparatus may further include a recording processing section which manages a current time and, when the current time reaches the start time included in the recording reservation information stored in the storage section, stores in the storage section the content received from the provider identified by the tuning information stored in the storage section by being correlated with the start time.

According to another embodiment of the present invention, there is provided an information processing apparatus including a display section which is capable of displaying information, a storage section which stores one or a plurality of pieces of viewed content identification information each of which is information for identifying each of one or a plurality of pieces of content that has been watched and listened to by a user, a content-related information control section which transmits the one or plurality of pieces of viewed content identification information to another device and receives, from such other device, content-related information related to content having a relationship with respect to viewed content identified by each of the transmitted one or plurality of pieces of viewed content identification information, and a display control section which causes the display section to display an image based on image data included in the content-related information that the content-related information control section has received.

According to another embodiment of the present invention, there is provided an information providing apparatus including a storage section which stores program-related information obtained by being correlated with content identification information used for identifying each piece of related content and also stores content-related information related to content, a content-related information acquisition section which receives one or a plurality of pieces of viewed content identification information from another device, acquires the content identification information correlated with each of the received one or plurality of pieces of viewed content identification information from the program-related information stored in the storage section, and acquires content-related information related to content identified by the acquired content identification information from the storage section, and a content-related information transmission section which transmits the content-related information acquired by the content-related information acquisition section to such other device.

The storage section may further store a relation point which indicates a degree of relationship with related content by correlating the relation point with content identification information for identifying each of the pieces of related content and by causing the relation point to be included in the program-related information, the content-related information acquisition section may correlate the relation point which is correlated with the acquired content identification information and included in the program-related information with the content-related information related to content identified by the acquired content identification information, and the content-related information transmission section may further transmit to such other device the relation point correlated with the content-related information by the content-related information acquisition section.

The storage section may further store a relation attribute which indicates a degree of relationship with related content by correlating the relation attribute with content identification information for identifying each of the pieces of related content and by causing the relation attribute to be included in the program-related information, the content-related information acquisition section may correlate the relation attribute which is correlated with the acquired content identification information and included in the program-related information with the content-related information related to content identified by the acquired content identification information, and the content-related information transmission section may further transmit to such other device the relation attribute correlated with the content-related information by the content-related information acquisition section.

The information providing apparatus may further include a viewing time list creation section. The storage section may further store content management information with which the content identification information and a provision start time, a provision end time, and a day of the week of a provision time are correlated, the provision time being a time period during which content identified by the content identification information is provided by the provider, and also stores a predetermined permissible time period. The viewing time list creation section may acquire the provision start time, the provision end time, and the day of the week correlated with each of the one or plurality of pieces of viewed content identification information received by the content-related information acquisition section from the content management information stored in the storage section, may calculate a viewing start time which corresponds to a time earlier than the acquired provision start time by the predetermined permissible time period and a viewing end time which corresponds to a time later than the acquired provision end time by the predetermined permissible time period, and may register viewing time data obtained by being correlated with the calculated viewing start time, the calculated viewing end time, and the day of the week in the storage section. The content-related information acquisition section may acquire the day of the week, the provision start time, and the provision end time correlated with each of the acquired pieces of content identification information from the content management information stored in the storage section, may determine whether it is registered in the storage section that at least one piece of viewing time data in which the acquired day of the week corresponds to the day of the week and a part of or entire time period from the acquired provision start time to the acquired provision end time overlaps with a part of or entire time period from the viewing start time to the viewing end time, and may acquire content-related information related to content identified by the content identification information which is determined to be registered from the storage section.

According to the embodiments of the present invention described above, it is possible to decrease the time taken for a user to find the content of interest.

BRIEF DESCRIPTION OF THE DRAWINGS

FIG. 1 is a conceptual diagram of a usage example of an information processing apparatus according to a present embodiment;

FIG. 7 is a diagram showing an example of TV video displayed on a TV set according to the present embodiment;

FIG. 8 is a diagram showing an example of an electronic program guide displayed on the TV set according to the present embodiment;

FIG. 9 is a diagram showing an example of a tuning menu displayed on the TV set according to the present embodiment;

FIG. 39 is a diagram showing an example of EPG-SI; and

FIG. 40 is a diagram showing an example of ECG data.

DETAILED DESCRIPTION OF THE EMBODIMENTS

Figure 2:
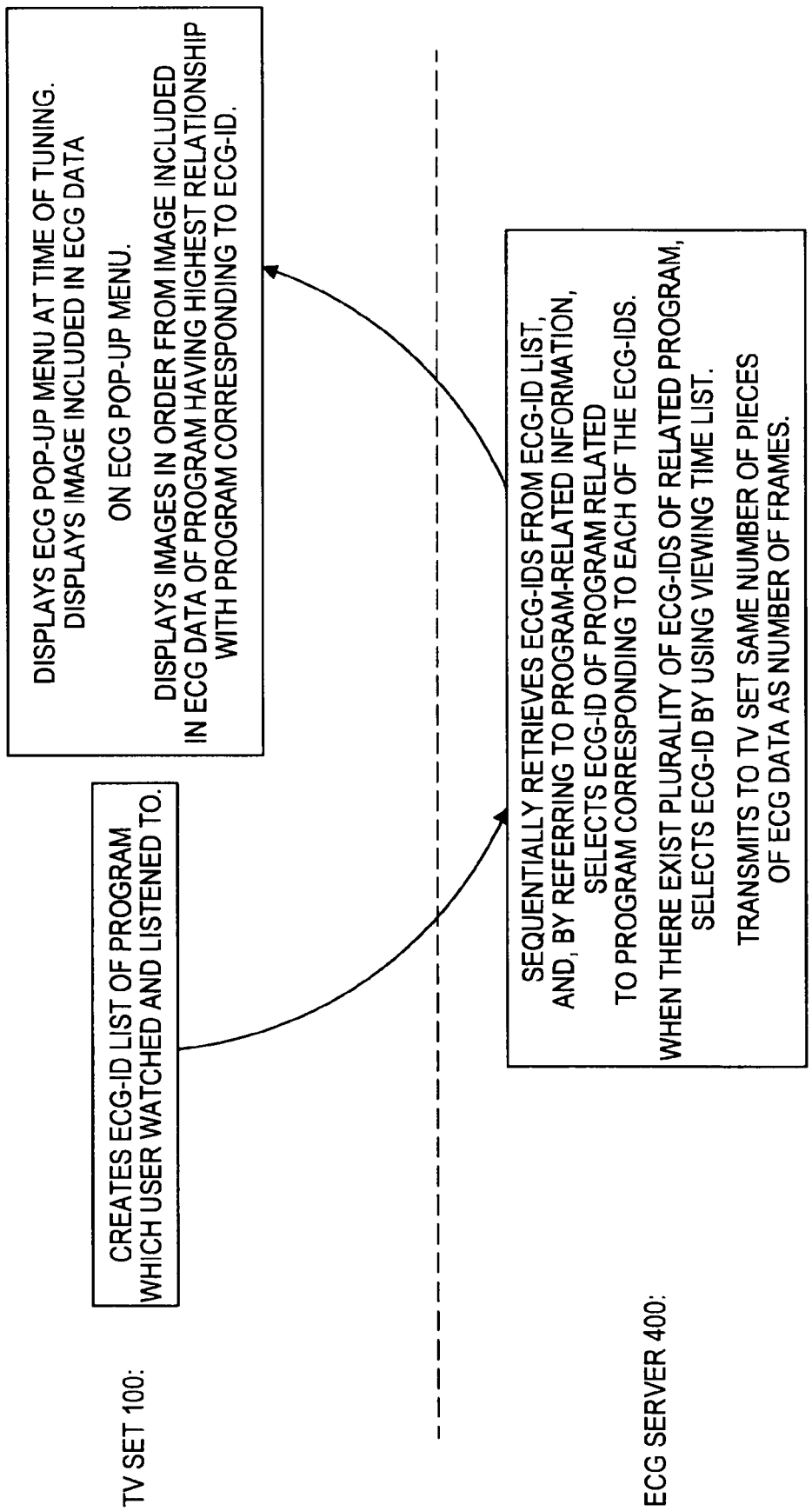
FIG. 2 is a diagram showing an outline of processing executed by an information processing system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. Note that the description is given in the following order.

1. First Embodiment
   1-1. Outline of present embodiment
   1-2. Outline of processing executed by information processing system
   1-3. System configuration of service system
      1-3-1. Configuration of content provider
      1-3-2. Configuration of sponsor
      1-3-3. Configuration of ECG service provider
      1-3-4. Configuration of ECG registration system
      1-3-5. Configuration of ECG management system
      1-3-6. Configuration of ECG providing system
      1-3-7. Configuration of ECG operation management system
      1-3-8. Configuration of ECG server
   1-4. Flow of processing performed by information processing system (processing of displaying image)
   1-5. Flow of processing performed by information processing system (creation of viewing history)
   1-6. Functional configuration of TV set
   1-7. TV video
   1-8. Electronic program guide
   1-9. Tuning menu
   1-10. Functional configuration ECG server
   1-11. Configuration example of program-related information
   1-12. Evaluation example of program characteristics
   1-13. Creation of viewing time list
   1-14. Image data to be displayed
   1-15. ECG data (part 1) transmitted from ECG server to TV set
   1-16. ECG data (part 2) transmitted from ECG server to TV set
   1-17. ECG data (part 3) transmitted from ECG server to TV set
   1-18. Display example (part 1) when image is displayed in overlapping manner on TV video
   1-19. Display example (part 2) when image is displayed in overlapping manner on TV video
   1-20. Display example when image is displayed in overlapping manner on electronic program guide
   1-21. Display example when image is displayed in overlapping manner on tuning menu
   1-22. Display example (part 1) of ECG menu 1-23. Display example (part 2) of ECG menu
1-24. Display example (part 3) of ECG menu
1-25. Display example (part 4) of ECG menu
1-26. Display example (part 5) of ECG menu
1-27. Display example (part 6) of ECG menu
1-28. Processing (part 1) executed by information processing system and remote control
1-29. Processing (part 2) executed by information processing system and remote control
1-30. Processing executed by program viewing judgment section
1-31. Processing executed by ECG list management section
1-32. Processing executed by ECG control section
1-33. Processing executed by ECG pop-up menu control section
1-34. Processing executed by ECG menu control section
1-35. Processing executed by ECG-ID processing section
1-36. Processing executed by viewing time list creation section
1-37. Processing (part 1) executed by ECG data acquisition section
1-38. Processing (part 2) executed by ECG data acquisition section
1-39. Example of EPG-SI
1-40. Example of ECG data
2. Modified example of first embodiment
3. Summary 1. First Embodiment Hereinafter, a first embodiment of the present invention will be described.

[1-1. Outline of Present Embodiment]

FIG. 1 is a conceptual diagram of a usage example of an information processing apparatus according to the present embodiment. As shown in FIG. 1, a user 500 watches and listens to program content (hereinafter, may be simply referred to as "program") which transmits a state of a soccer match, by viewing a screen of a TV set 100 serving as an example of the information processing apparatus. It is convenient for the user 500 if, for example, the user 500 can see content-related information related to program content of interest while watching the state of the soccer match displayed on the screen of the TV set 100. According to the present embodiment, the user 500 can, for example, view the content-related information related to the program content of interest on the screen of the TV set 100. Accordingly, the user 500 can, for example, watch and listen to the program content of interest by operating a remote control 200 during or after the end of the soccer match displayed on the screen of the TV set 100. Further, for example, the user 500 can make a recording reservation of the program content of interest by operating the remote control 200 while watching the soccer match displayed on the screen of the TV set 100.

Further, a provider who provides program content from a broadcast station has many other pieces of program content other than the soccer match that the provider wants the user 500 to watch and listen to; however, it is generally difficult for the provider to effectively advertise the pieces of program content to the user 500 whom the provider wants to watch and listen to those programs. If the provider can advertise program content of the user 500's interest to the user 500, the provider providing the program content from the broadcast station can increase the advertising efficiency. According to the present embodiment, the TV set 100 can display content-related information related to the program content of the user 500's interest. Therefore, according to the present embodiment, there can be provided a service which satisfies both the user 500 and the broadcast station.

Hereinafter, there will be mainly described in detail the information processing apparatus according to the embodiment of the present invention having the above-mentioned characteristics. It should be noted that, in the description of the embodiment below, although broadcast reception apparatuses such as a TV set and a recording/reproducing device are given as examples of the information processing apparatus according to the embodiment of the present invention, the information processing apparatus is not limited thereto. Further, the remote control 200 may be a terminal such as a cellular phone, PDA (Personal Digital Assistants), or a portable game device, which is mutually communicable and connectable with the information processing apparatus. Further, although the description below will be made on the assumption that a predetermined program distributed from a TV station is used as content that the TV set 100 perform display and the like, the content is not limited thereto. That is, the content is not limited to a program distributed from a TV station, but also includes various pieces of video and audio content distributed from a data broadcast station and a video distribution company.

[1-2. Outline of Processing Executed by Information Processing System]

FIG. 2 is a diagram showing an outline of processing executed by an information processing system. Here, the information processing system includes the TV set 100 as an example of the information processing apparatus and an ECG server 400 as an example of an information providing apparatus. The ECG (Electronic Contents Guide) server 400 is a server which provides ECG data related to program content to the TV set 100. In the present embodiment, the ECG data is mainly used as an example of content-related information related to content, and the content-related information is not particularly limited and may be any as long as it is information related to content. In the present embodiment, the content-related information includes at least image data which indicates the substance of the content and content identification information for identifying the content. An ECG-ID which is included in the ECG data corresponds to the content identification information and is an ID for uniquely identifying the ECG data. In EPG information received through a broadcast, the ECG data cannot be uniquely identified and there are many cases where the right to use the EPG information is limited. Therefore, the ECG-ID is often managed as an ID for uniquely identifying the ECG data. In addition, the content-related information may include, for example, the detailed substance of the content, information related to the cast of the content, homepage address information of WEB (World Wide Web), sales information of a related commercial product, information on the sponsor of the content, and an entity of the content.

The ECG data includes basic information of a program (e.g., broadcast start time, broadcast end time, and program title) and detailed information of the program (e.g., photograph of the cast and text information related to the cast, text information related to the outline of the program, photograph of a scene of the press conference and text information describing the scene of the press conference, and section information of the program). The ECG data differs from EPG Information is registered to the ECG data from a month before the start of the broadcast, data is gradually supplemented, and the data is updated upon the broadcast start time or is updated after the end of the broadcast. Therefore, the user can view the ECG data with enjoyment. Further, information associated with the program is also included in the ECG data, and when the user utilizes the information, the information introduces a similar program or a product to the user and the user can purchase a ticket or can enjoy the program even more.

As shown in FIG. 2, first, the TV set 100 creates an ECG-ID list of the program which the user 500 watched and listened to. The ECG server 400 sequentially retrieves ECG-IDs from the ECG-ID list, and, by referring to program-related information, selects an ECG-ID of the program related to the program corresponding to each of the ECG-IDs. In the case where there exist a plurality of ECG-IDs of the related program, the ECG server 400 further selects an ECG-ID of a specific program from the plurality of ECG-IDs of the related program by using a viewing time list. The ECG server 400 transmits to the TV set 100 the same number of pieces of ECG data as the number of frames (number of pieces of ECG data that can be displayed simultaneously on the TV set 100).

The TV set 100 displays an ECG pop-up menu at the time of tuning by a remote control operation or channel tuning by using a menu (at the time of displaying an ECG pop-up menu when an event of channel tuning is received by the instruction from the user). The TV set 100 displays an image included in the ECG data on the ECG pop-up menu. The TV set 100 displays an image included in the ECG data received from the ECG server 400. The TV set 100 displays images in the order from the image included in the ECG data of the program having the highest relationship with the program corresponding to the ECG-ID.

[1-3. System Configuration of Service System]

Figure 3:
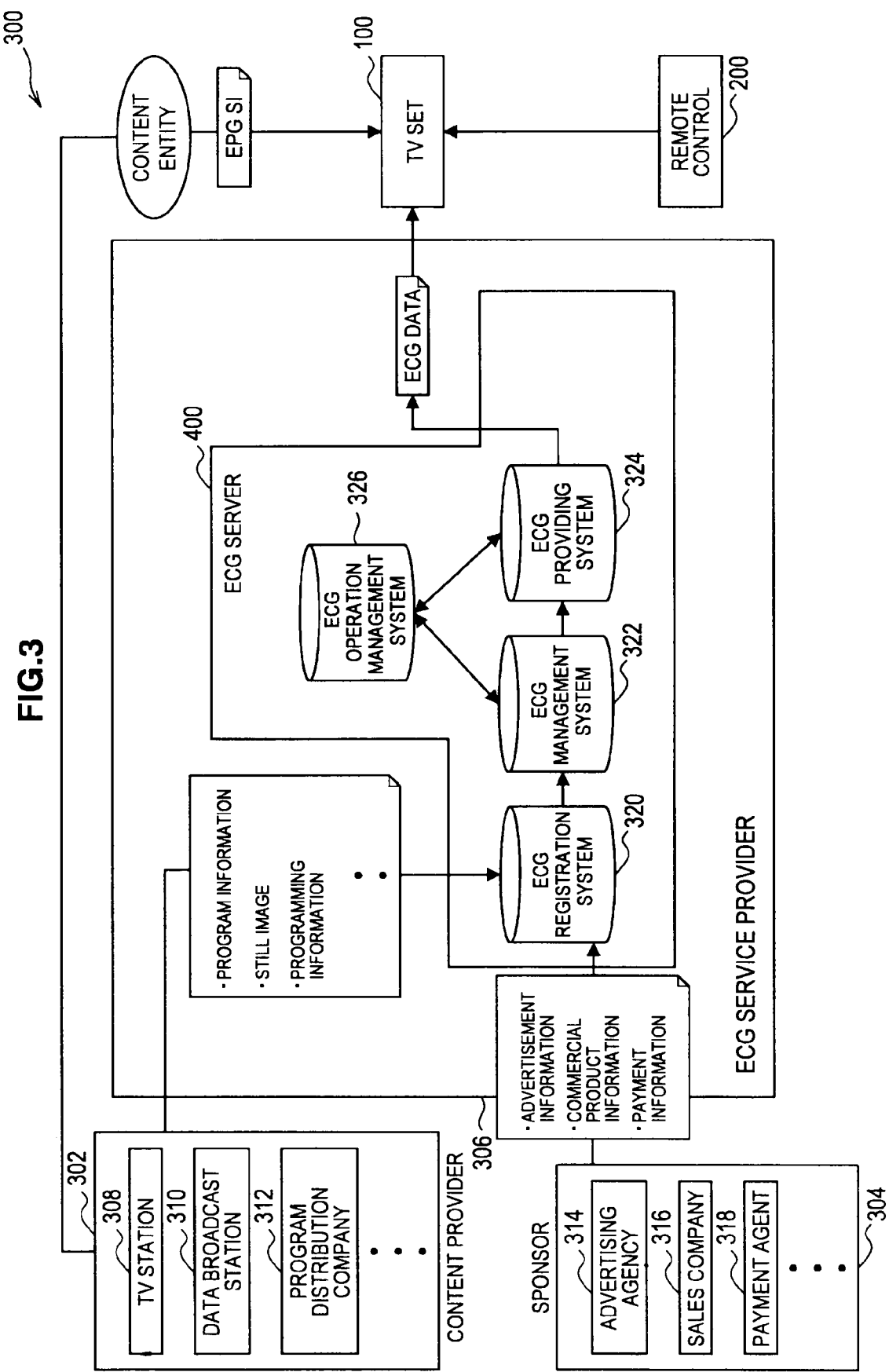
FIG. 3 is an explanatory view showing an example of an entire configuration of a service system according to the present embodiment.

FIG. 3 is an explanatory view showing an example of an entire configuration of a service system according to the present embodiment. As shown in FIG. 3, a service system 300 mainly includes a content provider 302, a sponsor 304, an ECG service provider 306, a TV set 100, and a remote control 200, the TV set 100 and the remote control 200 being utilized by a user. Hereinafter, the details of those included in the service system 300 will be described.

[1-3-1. Configuration of Content Provider]

The content provider 302 transmits a content entity such as video or audio to the TV set 100 or the like. The content provider 302 includes, for example, a provider that provides content, such as a TV station 308, a data broadcast station 310, or a program distribution company 312. The content provider 302 manages program information such as EPG information, programming information, Cue sheet (ongoing schedule of a program) information, program format (pattern for providing title, CM, main story of program, etc.) information, photograph/logo information, program propaganda information, or right information. The content provider 302 distributes video/audio information of a program, data broadcast information, and EPG-SI (Service Information) to the TV set 100. Thus, the TV set 100 can display the content received from the content provider 302 thereon, and can also display an electronic program guide based on the EPG-SI in response to an instruction of a user. Further, the content provider 302 also provides to the ECG service provider 306 information related to content. Thus, the ECG service provider 306 can perform processing of management, creation, distribution, or the like to ECG data related to the content distributed from the content provider 302.

Note that the above-mentioned configuration of the content provider 302 is an example used for explaining the present embodiment, and the configuration is not limited thereto. That is, it is naturally possible that the content provider 302 includes various other providers and the like that distribute content and manages various other information other than the above-mentioned information.

[1-3-2. Configuration of Sponsor]

The sponsor 304 includes, for example, an advertising agency 314, a sales company 316, and a payment agent (payment agency) 318 which provide advertisements, commercial products, and merchant services such as payment agent. The sponsor 304 provides, for example, related information such as advertisement information, commercial product information, or payment information to the ECG service provider 306. As a result, the ECG service provider 306 associates the program information acquired from the content provider 302 with the related information acquired from the sponsor 304, and hence can perform processing of creation, management, distribution, or the like to the ECG data related to the program.

Note that the above-mentioned configuration of the sponsor 304 is an example used for explaining the present embodiment, and the configuration is not limited thereto. That is, it is naturally possible that the sponsor 304 includes other companies and the like that distribute various other information such as event information, travel information, and financial information.

[1-3-3. Configuration of ECG Service Provider]

As described above, the ECG service provider 306 associates the program information acquired from the content provider 302 with the related information acquired from the sponsor 304 and performs processing of creation, management, distribution, or the like to the ECG data related to the program. As shown in FIG. 3, the ECG service provider 306 mainly includes an ECG server 400 including an ECG registration system 320, an ECG management system 322, an ECG providing system 324, and an ECG operation management system 326. Hereinafter, the details of respective functions of those included in the ECG service provider 306 will be described.

[1-3-4. Configuration of ECG Registration System]

The ECG registration system 320 registers program information provided by the content provider 302 and related information provided by the sponsor 304 as ECG data. As described above, there are provided, from the content provider 302, information related to a program, such as details of the program, cast, programming schedules, program formats, or Cue sheets. Further, in the related information provided from sponsor 304, there are included various information such as advertisement information, commercial product information, and payment information. Therefore, the ECG registration system 320 can register various information related to the program which the content provider 302 provides to the TV set 100 and the like. Note that the ECG registration system 320 can add identification information or attribute information indicating an information attribute to the ECG data to be registered. However, since the present embodiment does not have a feature in a creation method for ECG data, the details thereof are omitted.

[1-3-5. Configuration of ECG Management System]

The ECG management system 322 manages ECG data registered in the ECG registration system 320, as an ECG unit or the like, by associating therewith content distributed from the content provider 302. As described above, ECG data includes various information related to a predetermined program. Therefore, ECG management system 322 manages the content distributed from the content provider 302 by associating therewith at least one or more pieces of ECG data related to the content.

Accordingly, the ECG unit managed by the ECG management system 322 includes at least one or more pieces of ECG data related to content distributed from the content provider 302. For example, as the ECG data associated with a program, there are given various information related to the program such as detailed information on the story of the program, information on the cast, still image information on the program or the cast, sales information on the commercial product related to the cast, program sponsor information, information on homepage of the program, and introduction information of a related program.

Further, the ECG management system 322 can also create a distribution schedule based on the programming information or the Cue sheet information provided by the content provider 302.

Note that the ECG management system 322 can associate ECG data with the content distributed from the content provider 302 from various viewpoints. However, the present embodiment does not have a feature in the association of ECG data, and is not limited to a specific association method. Further, it is not always necessary that ECG management system 322 perform the management by associating a plurality of pieces of ECG data with a predetermined piece of content as in the case of the ECG unit described above. That is, as long as the ECG management system 322 can manage the ECG data related to the content by associating therewith content distributed from the content provider 302, the method therefor is not limited to a specific association method or management method.

[1-3-6. Configuration of ECG Providing System]

The ECG providing system 324 transmits the ECG data being managed by the ECG management system 322 to the TV set 100 in accordance with the distribution schedule created by the ECG management system 322.

[1-3-7. Configuration of ECG Operation Management System]

The ECG operation management system 326 manages an entire operation of various systems included in the ECG service provider 306 by controlling the ECG management system 322, the ECG providing system 324, and the like. For example, the ECG operation management system 326 can give an instruction to transmit ECG data based on the distribution schedule created by the ECG management system 322.

[1-3-8. Configuration of ECG Server]

The ECG service provider 306 can manage ECG data related to content distributed from the content provider 302 by associating therewith the content by using various systems included in the ECG service provider 306. Further, the ECG service provider 306 can also transmit, in accordance with the distribution of content to the TV set 100 performed by the content provider 302, the ECG data related to the content to the TV set 100. In the present embodiment, the ECG service provider 306 has a feature in having the ECG server 400 which is capable of transmitting ECG data and the like to the TV set 100. The ECG server 400 includes the ECG registration system 320, the ECG management system 322, the ECG providing system 324, and the ECG operation management system 326. Details of the configuration of the ECG server 400 will be described later.

[1-4. Flow of Processing Performed by Information Processing System (Processing of Displaying Image)]

Figure 4:
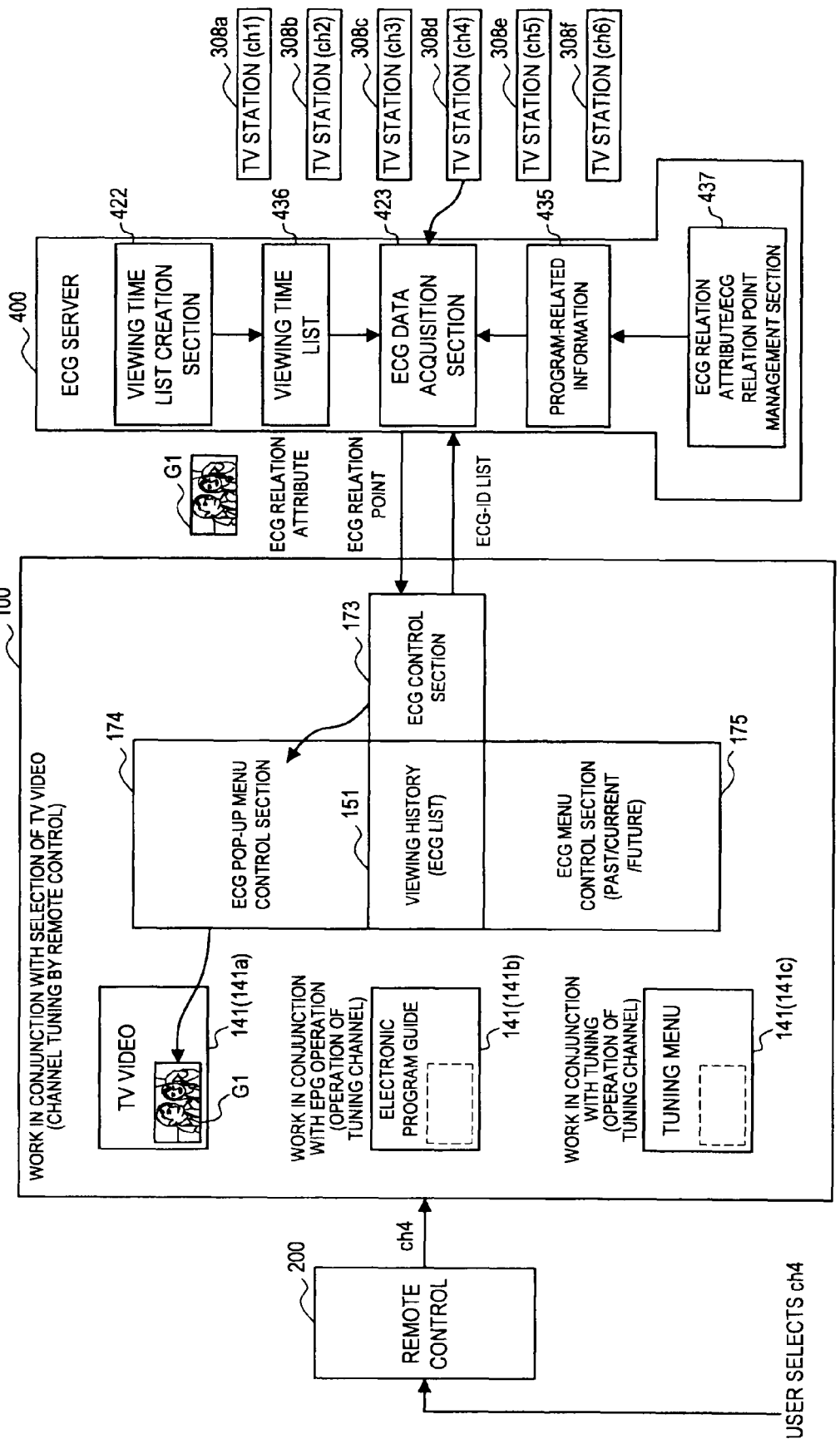
FIG. 4 is a schematic view showing a flow of processing performed by the information processing system (processing of displaying an image)

FIG. 4 is a schematic view showing a flow of processing performed by the information processing system (processing of displaying an image). As shown in FIG. 4, the TV set 100 can display a TV video 141(141a) as an example of a tuning screen on a display section 140 (see FIG. 6). In the same manner, on the display section 140 (see FIG. 6), the TV set 100 can display an electronic program guide 141(141b) as an example of the tuning screen and can display a tuning menu 141(141c) as an example of the tuning screen. Here, as an example, description will be made on the case where the TV video 141(141a) is displayed on the display section 140 (see FIG. 6), and in the case where the electronic program guide 141(141b) or the tuning menu 141(141c) is displayed, an image can be displayed in the same manner.

It is assumed that the user 500 can input tuning information for selecting any one of six TV stations from a TV station 308a to a TV station 308f into the remote control 200. Here, it is assumed that the user 500 selects ch4. The remote control 200 transmits the tuning information indicating ch4 to the TV set 100, and the TV set 100 receives the TV video 141(141a) from the TV station 308d(ch4), which corresponds to the received tuning information, and displays the TV video 141 (141a) on the display section 140 (see FIG. 6). In the example shown in FIG. 4, the TV set 100 includes a viewing history (ECG list) 151, an ECG control section 173, an ECG pop-up menu control section 174, and an ECG menu control section 175. The ECG control section 173 retrieves a viewed ECG-ID at a predetermined time from the viewing history (ECG list) 151, and transmits the viewed ECG-ID to the ECG server 400.

In the example shown in FIG. 4, the ECG server 400 includes a viewing time list creation section 422, a viewing time list 436, an ECG data acquisition section 423, and program-related information 435. When the ECG data acquisition section 423 accepts an input of the ECG-ID, the ECG data acquisition section 423 acquires ECG data identified by an ECG-ID related to the input-accepted ECG-ID from the TV station 308a to the TV station 308f. The ECG data acquisition section 423 can transmit the acquired ECG data (including image G1) to the TV set 100. The ECG data acquisition section 423 can also transmit the acquired ECG data to the TV set 100, by being correlated with an ECG relation point and an ECG relation attribute. For example, the ECG data acquisition section 423 can set, with respect to each input-accepted ECG-ID, one related ECG-ID. The ECG data acquisition section 423 can find an ECG-ID having a relationship with respect to the input-accepted ECG-ID by referring to the program-related information 435, but in the case where a plurality of ECG-IDs each having a relationship with respect to one of the input-accepted ECG-IDs are found or the like, one ECG-ID can be selected from the plurality of related ECG-IDs by using the viewing time list 436 created by the viewing time list creation section 422.

When the ECG pop-up menu control section 174 accepts a tuning information input from the remote control 200, the ECG pop-up menu control section 174 acquires an image (for example, image G) from the ECG data corresponding to the tuning information, from among the ECG data received from the ECG server 400, and displays the image in an overlapping manner on the TV video 141(141a).

[1-5. Flow of Processing Performed by Information Processing System (Creation of Viewing History)]

Figure 5:
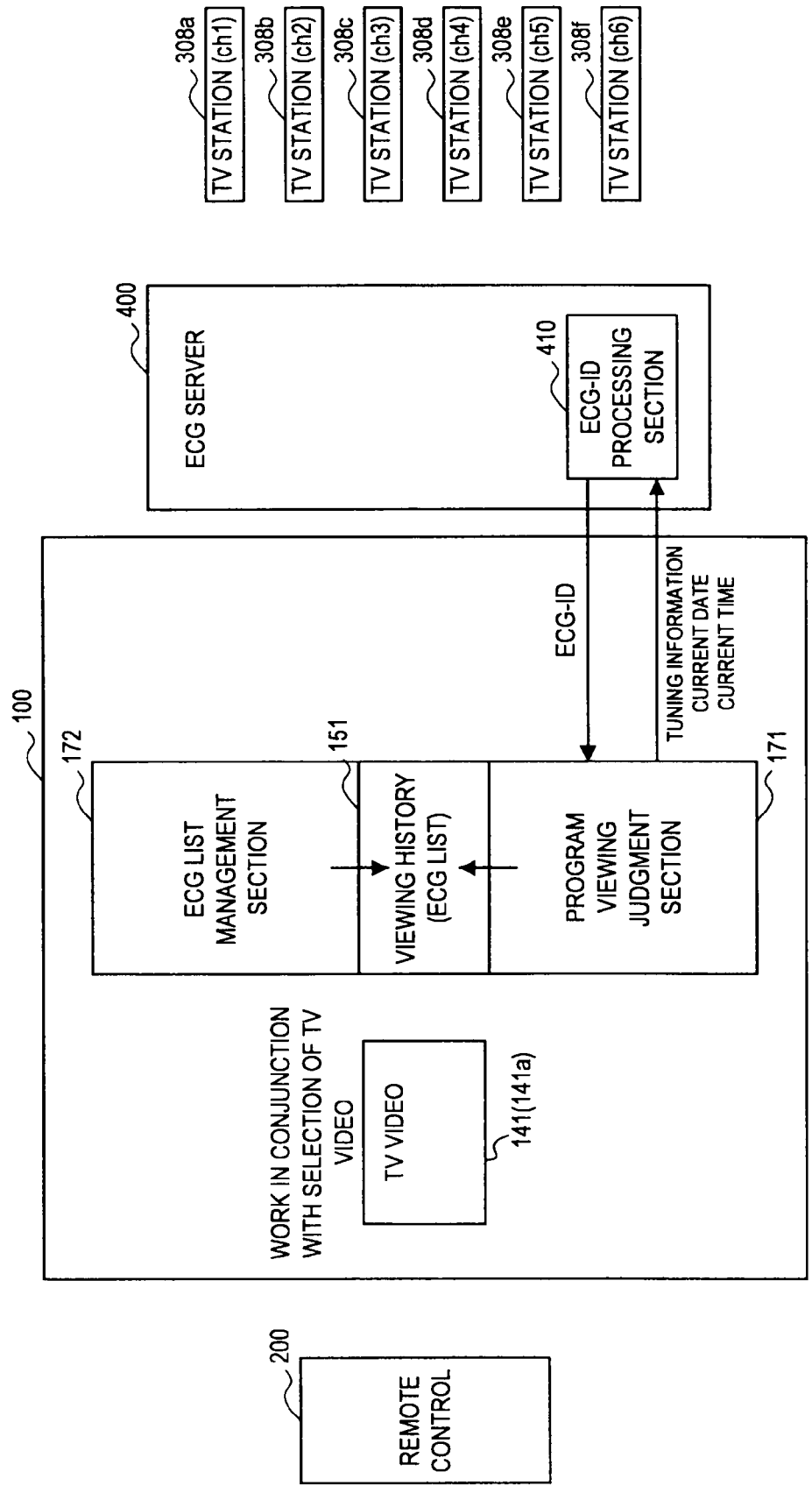
FIG. 5 is a schematic view showing a flow of processing performed by the information processing system (creation of a viewing history)

FIG. 5 is a schematic view showing a flow of processing performed by the information processing system (creation of a viewing history). In the example shown in FIG. 5, the TV set 100 includes a viewing history (ECG list) 151, a program viewing judgment section 171, and an ECG list management section 172. The program viewing judgment section 171 manages tuning information indicating a TV station which provided a program that has been watched and listened to by the user 500, a current date indicating the date in which the program is watched and listened to, and a current time indicating the time at which the program is watched and listened to. The program viewing judgment section 171 transmits the tuning information, the current date indicating the viewed date, and the current time indicating the viewed time, to the ECG server 400 at a predetermined time.

In the example shown in FIG. 5, the ECG server 400 includes an ECG-ID processing section 410. When the ECG-ID processing section 410 accepts the tuning information, the current date indicating the viewed date, and the current time indicating the viewed time, the ECG-ID processing section 410 transmits the corresponding ECG-ID to the TV set 100. When the program viewing judgment section 171 receives the ECG-ID, the program viewing judgment section 171 registers the received ECG-ID, the current date indicating the viewed date, and the current time indicating the viewed time in the viewing history (ECG list) 151 by correlating the ECG-ID, the current date, and the current time with each other. The ECG list management section 172 performs the maintenance of the viewing history (ECG list) 151.

[1-6. Functional Configuration of TV Set]

Figure 6:
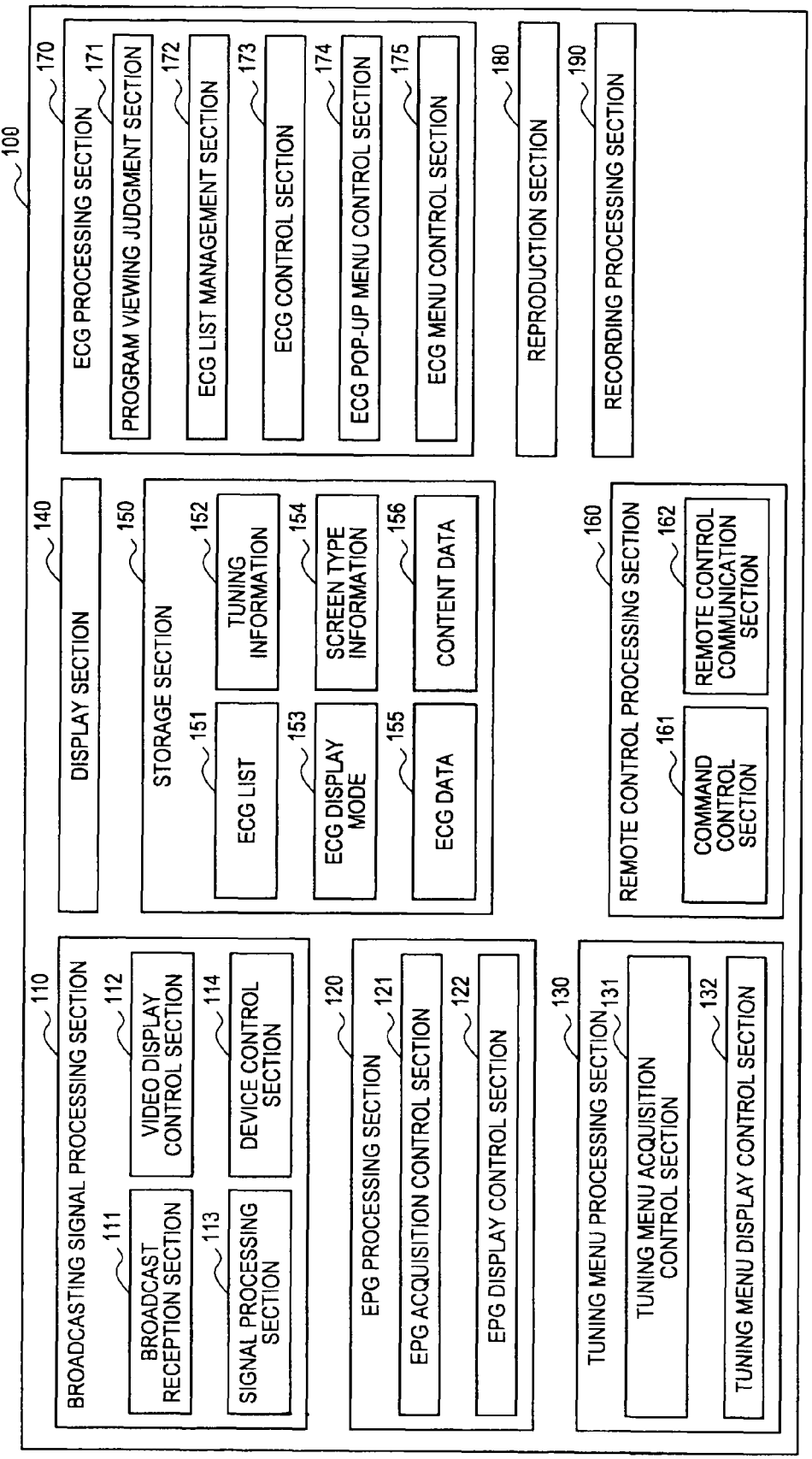
FIG. 6 is a block diagram showing a functional configuration of a TV set.

FIG. 6 is a block diagram showing a functional configuration of a TV set. The TV set 100 can receive a program provided through a transmission path such as terrestrial analog broadcasting, terrestrial digital broadcasting, BS (Broadcast Satellite) analog broadcasting, BS digital broadcasting, CS (Communication Satellite) broadcasting, CATV broadcasting, or optical fiber broadcasting, via an antenna, STB (Set Top Box), or the like.

As shown in FIG. 6, the TV set 100 mainly includes a broadcasting signal processing section 110, an EPG processing section 120, a tuning menu processing section 130, a display section 140, a storage section 150, a remote control processing section 160, an ECG processing section 170, a reproduction section 180, and a recording processing section 190. The broadcasting signal processing section 110 includes a broadcast reception section 111, a signal processing section 113, a video display control section 112, a device control section 114, and the like which are included in a general TV set. Note that the functional sections included in the broadcasting signal processing section 110 is not limited to those, and it is naturally possible that various functions which a general TV set has are additionally provided. The EPG processing section 120 includes EPG an acquisition control section 121, an EPG display control section 122, and the like which are generally provided for displaying EPG. The tuning menu processing section 130 includes a tuning menu acquisition control section 131, a tuning menu display control section 132, and the like which are generally provided for displaying a tuning menu.

The remote control processing section 160 as an example of an input section can perform bidirectional communication with the remote control 200 and can receive a command signal such as a channel change from the remote control 200. The remote control processing section 160 mainly includes, as shown in FIG. 6, a remote control communication section 162 and a command control section 161. In the present embodiment, the remote control processing section 160 is to be used as an example of an input section. However, the input section is not limited to the remote control processing section and may include another input device and the like. It can be assumed that, as an input device, there is used an operation means which is operated by a user, such as a mouse, a keyboard, a touch panel, a button, a switch, or a lever. The remote control processing section 160 accepts from the user 500 an input of content tuning information (e.g., channel number) which is information for identifying a provider that is a providing source of the content.

The remote control communication section 162 performs bidirectional communication connection with the remote control 200. For example, the remote control communication section 162 receives a command signal such as a channel change from the remote control 200 and transmits device information peculiar to the TV set 100 to the remote control 200.

The command control section 161 instructs the broadcasting signal processing section 110 to execute a command such as a channel change in response to a command signal such as a channel change received from the remote control 200. Accordingly, the user 500 selects a program by using the remote control 200, and hence can change a program to be viewed on TV set 100.

Note that, although the TV set 100 was mainly described as an information processing apparatus in the description above, the information processing apparatus may be, for example, a broadcast reception apparatus which can receive a broadcasting signal, such as a personal computer.

The display section 140 includes, for example, a display device, and has a function of displaying information. The kind of the display device is not particularly limited, and there can be used a CRT display device, a liquid crystal display device, a plasma display device, an EL display device, a lamp, and the like.

The storage section 150 includes, for example, a storage device, and can store one or a plurality of pieces of viewed content identification information each of which is information for identifying each of one or a plurality of pieces of content that have been watched and listened to by the user 500. In the present embodiment, broadcast program content is used as content. Further, an ECG-ID of a viewed program is used as viewed content identification information. The storage device is a device for storing data, and includes, for example, a magnetic storage device such as an HDD (Hard Disk Drive), a semiconductor storage device, an optical storage device, or a magneto-optical storage device. The storage device is capable of storing a program and data executed by a CPU (Central Processing Unit), and data acquired from outside.

A content-related information control section corresponds to, for example, the ECG control section 173, and transmits one or a plurality of pieces of viewed content identification information (viewed ECG-ID) to the ECG server 400 (another device). The content-related information control section receives, from the ECG server 400 (another device), content-related information related to content having a relationship with respect to viewed content (viewed broadcast program content) identified by each of the transmitted one or plurality of pieces of viewed content identification information (viewed ECG-ID). The content-related information control section includes, for example, CPU, RAM, and HDD, and the function thereof is realized by executing a program which CPU has read from HDD and developed in RAM.

A display control section corresponds to, for example, the video display control section 112, the EPG display control section 122, the tuning menu display control section 132, and the ECG pop-up menu control section 174. The display control section causes the display section 140 to display an image based on image data included in each of one or a plurality of pieces of content-related information corresponding to the content tuning information the input of which is accepted by the input section (remote control processing section 160) from among respective pieces of content-related information that the content-related information control section have received. The display control section includes, for example, CPU, RAM, and HDD, and the function thereof is realized by executing a program which CPU has read from HDD and developed in RAM.

The content-related information control section may further receive a relation point from the ECG server 400 (another device). The relation point indicates a degree of relationship between the content having a relationship with respect to the viewed content and the viewed content, and is correlated with each of the one or plurality of pieces of content-related information. In this case, the display control section may decide a priority order of the one or plurality of pieces content-related information based on the degree of respective relation points, and may cause the display section 140 to display the image based on image data included in each of the one or plurality of pieces of content-related information depending on the decided priority order.

The content-related information control section may further receive a relation attribute from the ECG server 400 (another device). The relation attribute indicates a relationship between the content having a relationship with respect to the viewed content and the viewed content, and is correlated with each of the one or plurality of pieces of content-related information. In this case, the display control section may further cause the display section 140 to display the relation attribute received by the content-related information control section by being correlated with the image which is displayed based on the image data included in each of the one or plurality of pieces of content-related information which is received by being correlated with the relation attribute.

The display control section may cause a predetermined tuning screen to be displayed on the display section 140, and may also switch the predetermined tuning screen which is displayed on the display section 140 to a tuning screen depending on the content tuning information (e.g., channel number) the input of which is accepted by the input section. As the predetermined tuning screen, there can be assumed TV video, an electronic program guide, a tuning menu, and the like. Further, the display control section may cause the image to be displayed on the tuning screen which is being displayed on the display section 140 in an overlapping manner based on the image data.

The input section may be capable of accepting an input of image selection information for selecting one image from the images displayed on the display section 140 and a recording reservation request for performing recording reservation of content. In that case, when the input section accepts the input of the image selection information and the recording reservation request, the display control section may acquire, from the content-related information including the image data which is a source of the image selected by the image selection information, tuning information for identifying the provider that provides content related to the content-related information and a start time from which the content is provided from the provider, and may register in the storage section 150 recording reservation information obtained by correlating the acquired tuning information with the start time.

The TV set 100 may further include the recording processing section 190. The recording processing section 190 manages a current time. When the current time reaches the start time included in the recording reservation information stored in the storage section 150, the recording processing section 190 stores in the storage section 150 (performs recording processing) the content received from the provider (content provider 302) identified by the tuning information stored in the storage section 150 by being correlated with the start time. For example, the start time and the tuning information may be included in ECG data 155 which the TV set 100 has received from the ECG server 400 and has stored in the storage section 150. The recording processing section 190 includes, for example, CPU, RAM, and HDD, and the function thereof is realized by executing a program which CPU has read from HDD and developed in RAM.

The display control section may cause the display section 140 to display an image based on image data included in content-related information received by the content-related information control section. In that case, it is also possible to cause the image to be displayed on the display section 140 without depending on the content tuning information the input of which is accepted by the input section.

The reproduction section 180 has a function to reproduce content data (content) 156 stored in the storage section 150. For example, the reproduction section 180 reproduces the content data 156 stored in the storage section 150 in response to the reproduction instruction input into the remote control 200 from the user 500. The content data 156 is stored in the recording processing section 190, for example.

Each of the components included in the ECG processing section 170 shown in FIG. 6 will be described in detail later.

In the description above, an example of a hardware configuration that can realize the function of the TV set 100 according to each embodiment of the present invention. Each of the components described above may be formed by using a versatile member or may be formed of hardware which has a function specialized in each component. Accordingly, it is possible to appropriately change the hardware configuration to be used depending on the levels of technology at the time of the present embodiment is performed.

[1-7. TV Video]

FIG. 7 is a diagram showing an example of TV video displayed on a TV set according to the present embodiment. The example of the TV video shown in FIG. 7 is merely an example of TV video according to the present embodiment, and hence, the TV video according to the present embodiment is not limited to the TV video shown in FIG. 7. Further, the TV video is an example of a tuning screen.

As shown in FIG. 7, TV video 141a is displayed on the display section 140 of the TV set 100. The TV video 141a may include tuning information (channel number) and a program title, and display and non-display of the program title, the channel number, and the like can be switched by an operation of the remote control 200 performed by the user 500. Further, when tuning information (channel number) is input by the operation of the remote control 200 performed by the user 500, video displayed on the display section 140 is switched to the TV video received from the TV station 308 which is selected by the input tuning number (channel number).

[1-8. Electronic Program Guide]

FIG. 8 is a diagram showing an example of an electronic program guide displayed on the TV set according to the present embodiment. The example of the electronic program guide shown in FIG. 8 is merely an example of an electronic program guide, and hence, the electronic program guide according to the present embodiment is not limited to the electronic program guide shown in FIG. 8. Further, the electronic program guide is an example of a tuning screen.

As shown in FIG. 8, an electronic program guide 141b is displayed on the display section 140 of the TV set 100. For example, the electronic program guide 141b is a two-dimensional program guide in which the horizontal axis represents tuning information (channel number) and the vertical axis represents time and from which a date can be selected within a week from today. Since entire time period cannot be displayed, the program guide can be viewed by setting the amount of time period that can be displayed to 4 hours and by switching the time period to another time period. Inside a frame, there are displayed in text a program title, main cast in the program, and the like.

[1-9. Tuning Menu]

FIG. 9 is a diagram showing an example of a tuning menu displayed on the TV set according to the present embodiment. The example of the tuning menu shown in FIG. 9 is merely an example of a tuning menu according to the present embodiment, and hence, the tuning menu according to the present embodiment is not limited to the tuning menu shown in FIG. 9. Further, the tuning menu is an example of a tuning screen.

As shown in FIG. 9, the tuning menu 141c is displayed on the display section 140 of the TV set 100. In the example shown in FIG. 9, the tuning information (ch4) is selected by the user 500, and it is shown that a program "sports news" is to be provided during "20:00-21:00" from the TV station 308 corresponding to ch4. In the text information, there is included an outline and the like of the program "sports news".

[1-10. Functional Configuration ECG Server]

Figure 10:
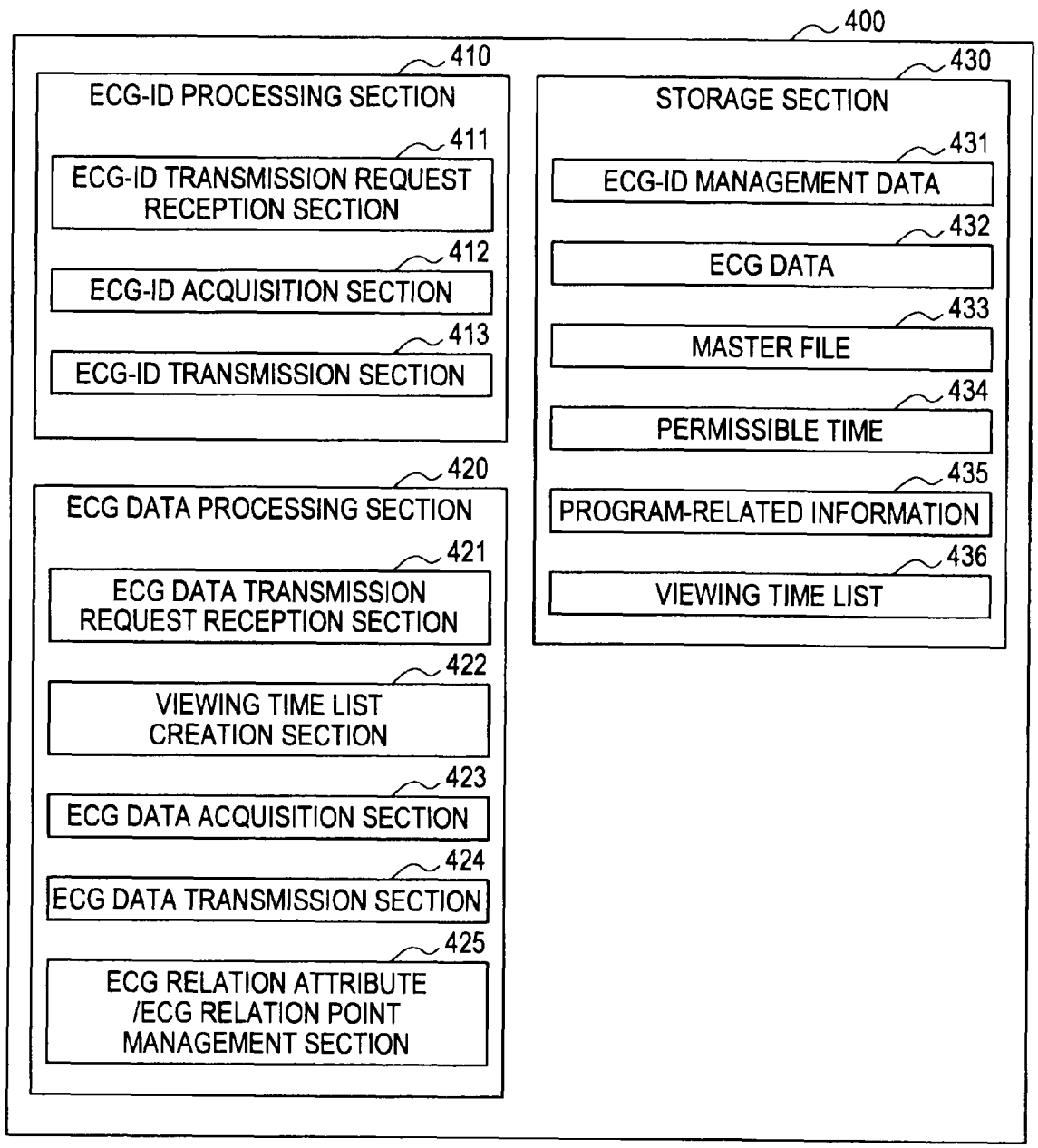
FIG. 10 is a block diagram showing a functional configuration an ECG server.

FIG. 10 is a block diagram showing a functional configuration an ECG server. As shown in FIG. 10, the ECG server 400 mainly includes the ECG-ID processing section 410, an ECG data processing section 420, and a storage section 430.

The storage section 430 mainly includes ECG-ID management data 431, ECG data 432, a master file 433, a permissible time period 434, program-related information 435, a viewing time list 436, and the like. The storage section 430 includes, for example, a storage device or the like. The storage device is a device for storing data and includes, for example, a magnetic storage device such as an HDD, a semiconductor storage device, an optical storage device, or a magneto-optical storage device. The storage device is capable of storing a program and data executed by a CPU, and data acquired from outside.

The program-related information 435 is obtained by being correlated with content identification information used for identifying each piece of related content. As for the content identification information, there can be used an ECG-ID for example. Further, the related content refers to first content and second content in the case where the first content and the second content have relationship therebetween.

The ECG data 432 is an example of content-related information related to content. Here, the ECG data 432 includes an ECG-ID as an example of content identification information, and includes image data that indicates the substance of the content which is identified by the ECG-ID.

A content-related information acquisition section corresponds to an ECG data transmission request reception section 421 and the ECG data acquisition section 423. The content-related information acquisition section receives transmission request for ECG data which includes one or a plurality of pieces of viewed content identification information (ECG-ID list) from the TV set 100 (another device). Further, the content-related information acquisition section acquires the content identification information correlated with each of the received one or plurality of pieces of viewed content identification information (ECG-ID list) from the program-related information 435 stored in the storage section 430. The content-related information acquisition section acquires content-related information (ECG data 432) related to content identified by the acquired content identification information from the storage section 430.

The ECG data acquisition section 423 includes, for example, CPU, RAM, and HDD, and the function thereof is realized by executing a program which CPU has read from HDD and developed in RAM. The ECG data transmission request reception section 421 includes, for example, a communication device, and is capable of receiving ECG data transmission request from the TV set 100.

A content-related information transmission section corresponds to an ECG data transmission section 424. The content-related information transmission section transmits the content-related information acquired by the content-related information acquisition section to the TV set 100 (another device). The ECG data transmission section 424 includes, for example, a communication device, and is capable of transmitting content-related information to the TV set 100.

The storage section 430 may further store a relation point which indicates a degree of relationship with related content by correlating the relation point with content identification information for identifying each of the pieces of related content and by causing the relation point to be included in the program-related information 435. In that case, the content-related information acquisition section correlates the relation point which is correlated with the acquired content identification information and included in the program-related information 435 with content-related information related to content identified by the acquired content identification information. The content-related information transmission section further transmits to the TV set 100 (another device) the relation point correlated with the content-related information by the content-related information acquisition section.

The storage section 430 may further store a relation attribute which indicates a degree of relationship with related content by correlating the relation attribute with content identification information for identifying each of the pieces of related content and by causing the relation attribute to be included in the program-related information 435. In that case, the content-related information acquisition section correlates the relation attribute which is correlated with the acquired content identification information and included in the program-related information 435 with content-related information related to content identified by the acquired content identification information. The content-related information transmission section further transmits to the TV set 100 (another device) the relation attribute correlated with the content-related information by the content-related information acquisition section. The relation point, the relation attribute, and the like are managed by, for example, an ECG relation attribute/ECG relation point management section 425 included in the ECG data processing section 420.

The ECG server 400 may further include the viewing time list creation section 422. In that case, the storage section 430 further stores content management information (ECG-ID management data 431) with which the content identification information and a provision start time, a provision end time, and a day of the week of a provision time are correlated, the provision time being a time period during which content identified by the content identification information is provided by the provider (TV station 308). Further, the storage section 430 stores a predetermined permissible time period 434.

The viewing time list creation section 422 acquires the provision start time, the provision end time, and the day of the week correlated with each of the one or plurality of pieces of viewed content identification information received by the content-related information acquisition section from the content management information (ECG-ID management data 431) stored in the storage section 430. Further, the viewing time list creation section 422 calculates a viewing start time which corresponds to a time earlier than the acquired provision start time by the predetermined permissible time period 434 and a viewing end time which corresponds to a time later than the acquired provision end time by the predetermined permissible time period 434. The viewing time list creation section 422 registers viewing time data obtained by being correlated with the calculated viewing start time, the calculated viewing end time, and the day of the week in the storage section 430. The viewing time data is added to the viewing time list 436 by being registered in the storage section 430. The content-related information acquisition section acquires the day of the week, the provision start time, and the provision end time correlated with each of the acquired pieces of content identification information from the content management information (ECG-ID management data 431) stored in the storage section 430.

The content-related information acquisition section determines whether it is registered in the storage section 430 that at least one piece of viewing time data in which the acquired day of the week corresponds to the day of the week and a part of or entire time period from the acquired provision start time to the acquired provision end time overlaps with a part of or entire time period from the viewing start time to the viewing end time. The content-related information acquisition section acquires content-related information related to content identified by the content identification information which is determined to be registered from the storage section 430.

Details of the configurations of the ECG-ID processing section 410, the ECG data processing section 420, and the storage section 430 shown in FIG. 10 will be described later.

[1-11. Configuration Example of Program-Related Information]

Figure 11:
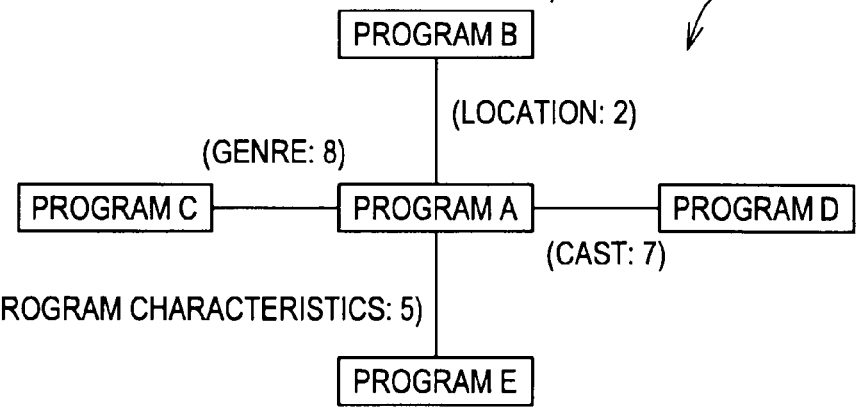
FIG. 11 is a diagram showing a configuration example of program-related information.

FIG. 11 is a diagram showing a configuration example of program-related information. As shown in FIG. 11, the program-related information 435 is obtained by being correlated with content identification information used for identifying each piece of related content. The TV stations 308 from which the pieces of content to be correlated are provided may be the same or different from each other. In the example shown in FIG. 11, as the pieces of content each having a relationship with the content "program A", there are given "program C", "program B", "program D", and the like.

Further, as shown in FIG. 11, a relation attribute (e.g., ECG relation attribute) indicating a relationship and a relation point (e.g., ECG relation point) indicating a degree of a relationship are correlated with each of the relationships. For example, "program A" and "program C" have a relationship with each other, and the relation attribute of the relationship is "genre" and the relation point of the relationship is "8". In the same manner, for example, "program A" and "program B" have a relationship with each other, and the relation attribute of the relationship is "location" and the relation point of the relationship is "2". Further, for example, "program A" and "program D" have a relationship with each other, and the relation attribute of the relationship is "cast" and the relation point of the relationship is "7". Still further, for example, "program A" and "program E" have a relationship with each other, and the relation attribute of the relationship is "program characteristics" and the relation point of the relationship is "5".

For example, for each program, a score is provided to each of the relation attributes (on a 10 point scale in the example shown in FIG. 11); the highest score is taken as an ECG relation point, and the relation attribute with the highest score is taken as an ECG relation attribute.

[1-12. Evaluation Example of Program Characteristics]

Figure 12:
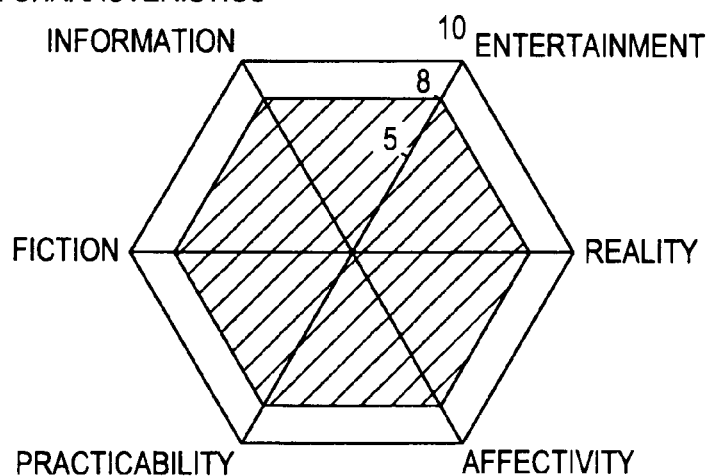
FIG. 12 is a diagram showing an evaluation example of program characteristics.

FIG. 12 is a diagram showing an evaluation example of program characteristics. As shown in FIG. 12, evaluation items of the program characteristics include aspects of "affectivity", "entertainment", "reality", "information", "practicability", and "fiction". An evaluation result of the program characteristics may be given as an average score of those six evaluation items, or may be given as a highest score from among the scores of those six evaluation items. Further, the number of evaluation items is not limited to six, and may be any number.

[1-13. Creation of Viewing Time List]

Figure 13:
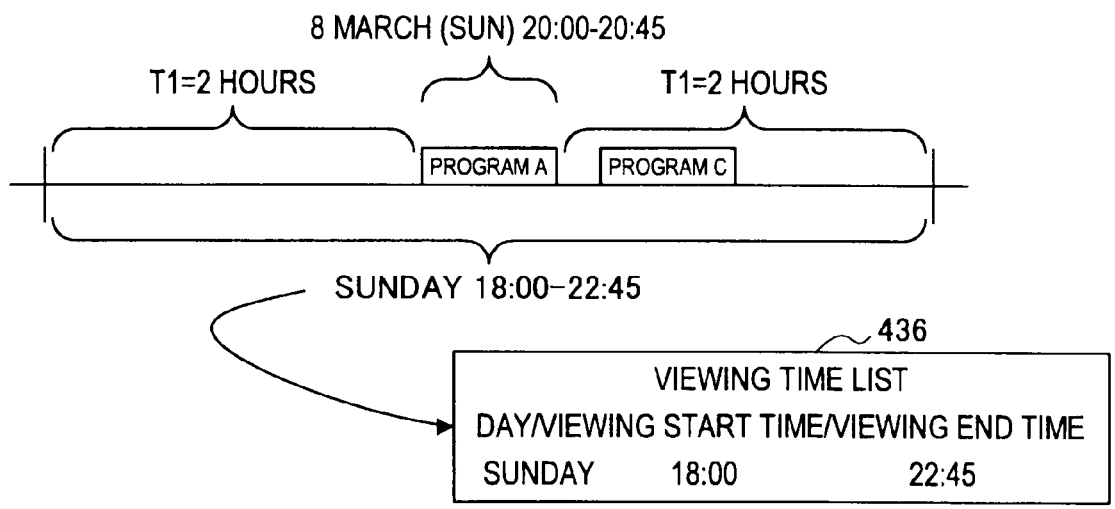
FIG. 13 is a diagram schematically showing a creation process of a viewing time list 436.

FIG. 13 is a diagram schematically showing a creation process of a viewing time list 436. As shown in FIG. 13, the viewing time list creation section 422 calculates a viewing start time which is a time earlier than the start time of a target program ("program A") by a permissible time period T1 (e.g., 2 hours), a viewing end time which is a time later than the end time of the target program by the permissible time period T1 (e.g., 2 hours), and a day of the week, and adds the calculation results to the viewing time list 436. In the example shown in FIG. 13, viewing data of "program A" (SUNDAY, 18:00-22:45) is registered in the viewing time list 436.

In the case where the ECG data acquisition section 423 acquires a plurality of related programs by referring to the program-related information 435, the ECG data acquisition section 423 can leave as a candidate for a related program in the viewing time list 436, from among the acquired plurality of programs, a program having the viewing time data which the day of the week corresponds to and a part of or entire time period overlaps with. In the example shown in FIG. 13, the day of the week of "program C" corresponds to the day of the week of "program A" which is registered in the viewing time list 436, and a part of the viewing time of "program A" overlaps with the entire time period from the start time to the end time of "program C". Therefore, in the case where "program C" is included in the plurality of related programs, the ECG data acquisition section 423 can leave "program C" as a candidate for a related program. The ECG data acquisition section 423 can select one program in the case where there are plurality of candidates for a related program.

[1-14. Image Data to be Displayed]

Figure 14:
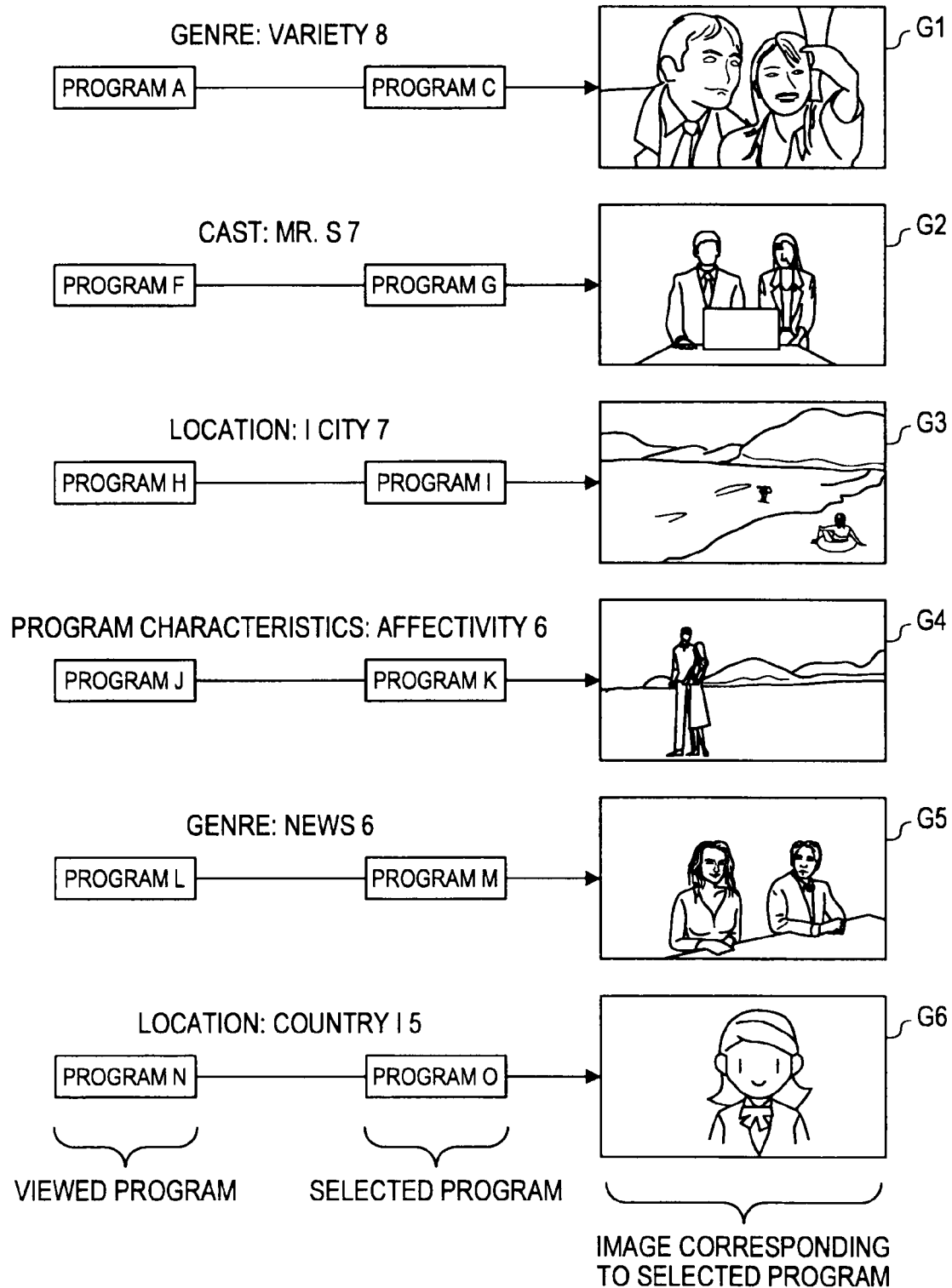
FIG. 14 is a diagram showing a process of deciding image data to be displayed.

FIG. 14 is a diagram showing a process of deciding image data to be displayed. As shown in FIG. 14, it is assumed that the TV set 100 transmits ECG-IDs of viewed programs (at least six programs including "program A", "program F", "program H", "program J", "program L", and "program N") to the ECG server 400. Further, it is assumed that the TV set 100 receives "program C", "program G", "program I", "program K", "program M", and "program O" as the pieces of content-related information of the related programs of "program A", "program F", "program H", "program J", "program L", and "program N", respectively, from the ECG server 400. It is assumed that the received pieces of ECG data includes images G1 to G6. The TV set 100 displays the images G1 to G6 on the display section 140.

At the time of displaying the images G1 to G6 on the display section 140, the TV set 100 can, for example, display the images G1 to G6 by being arranged in order of decreasing relation point, or sequentially display the images G1 to G6 in order of decreasing relation point. Further, the TV set 100 is capable of displaying the images G1 to G6 at predetermined positions depending on relation attributes thereof, and is also capable of displaying each of the relation attributes by being correlating the relation attribute with each of the images.

[1-15. ECG Data (Part 1) Transmitted from ECG Server to TV Set]

Figure 15:
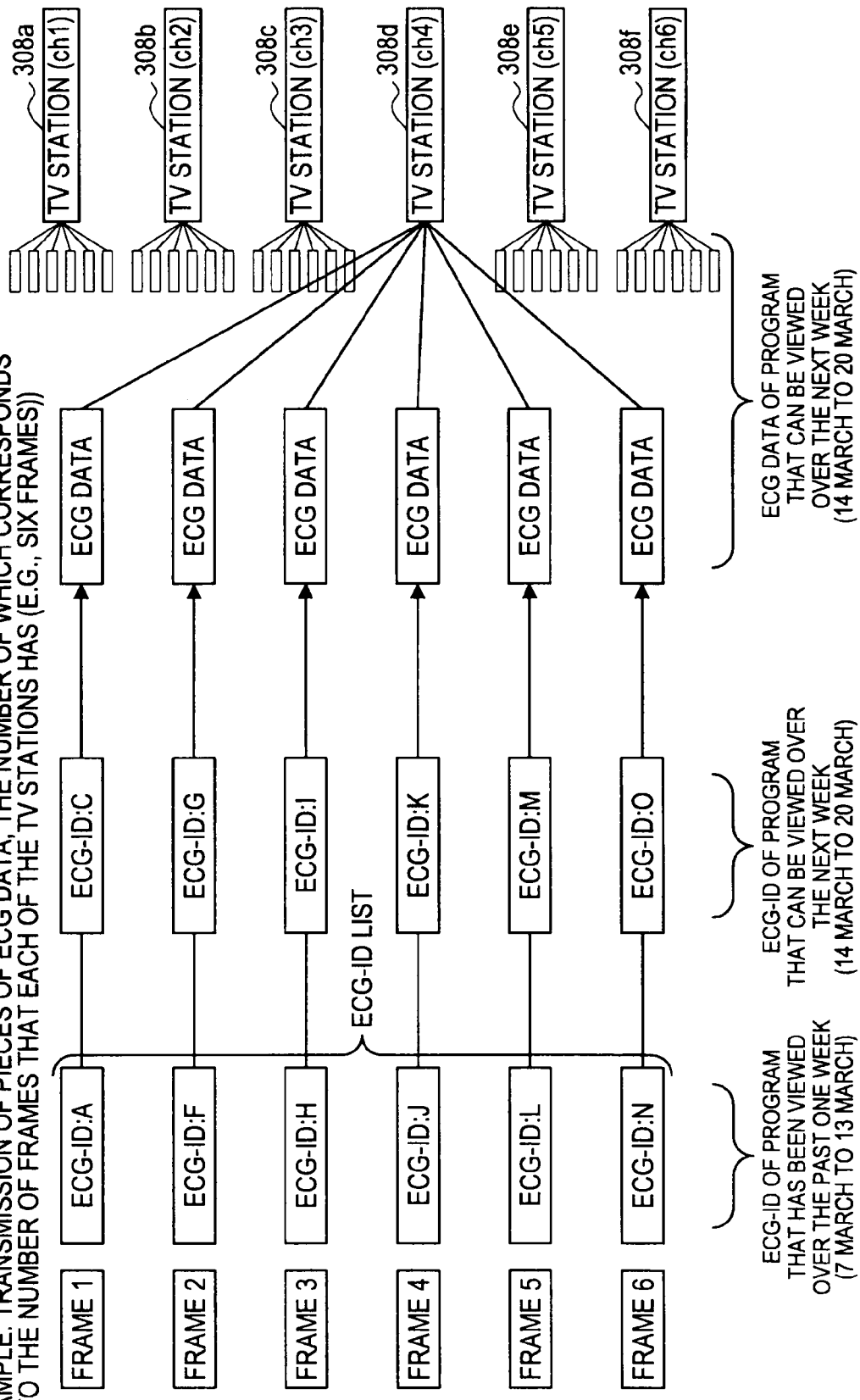
FIG. 15 is a diagram showing ECG data (part 1) transmitted from the ECG server to the TV set.

FIG. 15 is a diagram showing ECG data (part 1) transmitted from the ECG server to the TV set. As shown in FIG. 15, the TV set 100 is capable of, for example, receiving pieces of ECG data, the number of which corresponds to the number of frames that each of the TV stations 308 has (six frames in the example shown in FIG. 15), from each of the TV stations 308.

Further, the number of pieces of ECG data the TV set 100 receives from each of the TV stations 308 may vary depending on the TV station 308.

[1-16. ECG Data (Part 2) Transmitted from ECG Server to TV Set]

Figure 16:
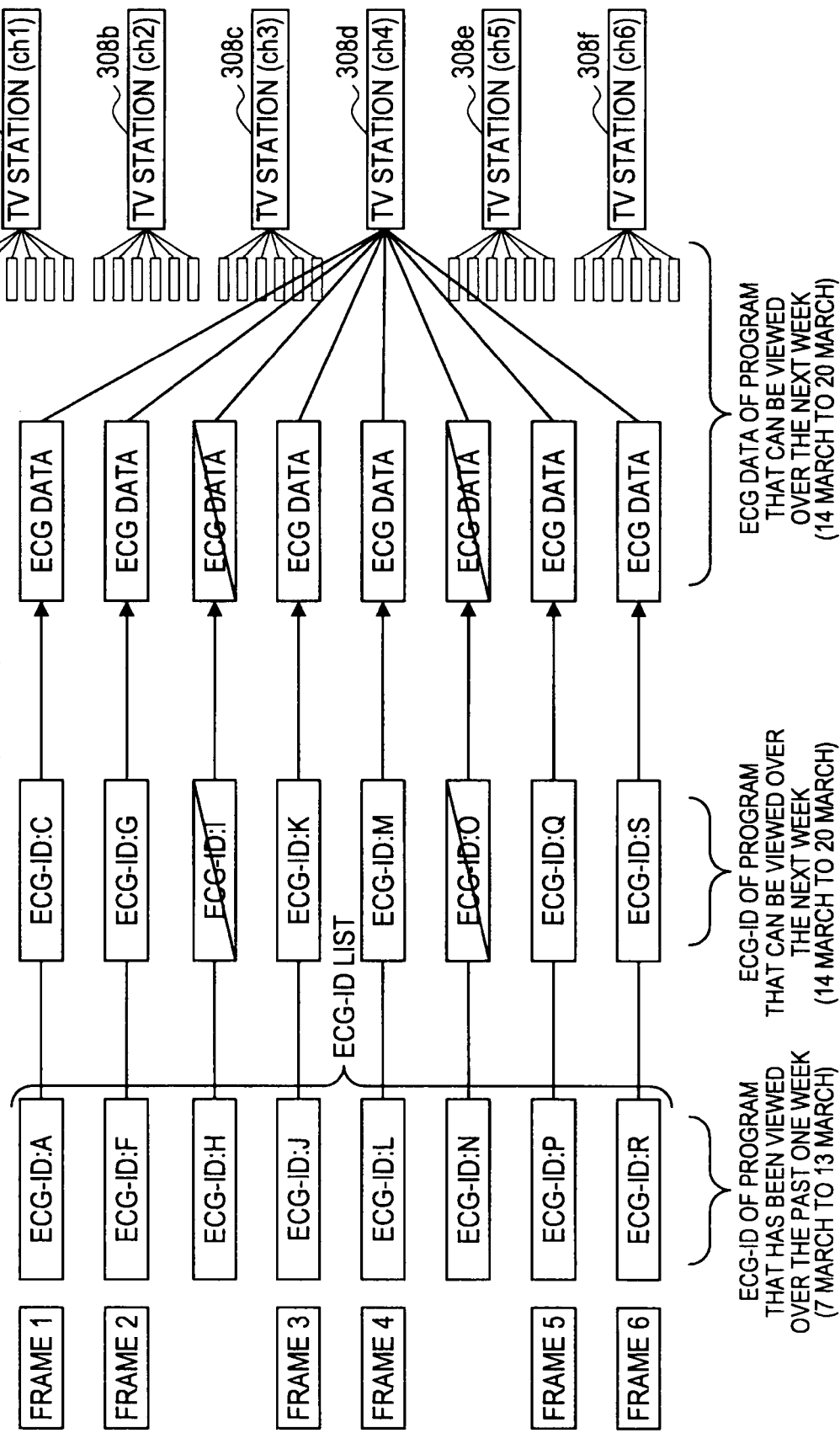
FIG. 16 is a diagram showing ECG data (part 2) transmitted from the ECG server to the TV set.

FIG. 16 is a diagram showing ECG data (part 2) transmitted from the ECG server to the TV set. In particular, FIG. 16 shows the case where there is a channel (ch4 in the example shown in FIG. 16) having frames, the number of which is more than the number of viewing programs (eight programs in the example shown in FIG. 16). In this case, for example, TV set 100 may not display pieces of ECG data (two pieces of ECG data corresponding to "ECG-ID: I" and "ECG-ID: O" in the example shown in FIG. 16), the number of which being more than that of the frames.

[1-17. ECG Data (Part 3) Transmitted from ECG Server to TV Set]

Figure 17:
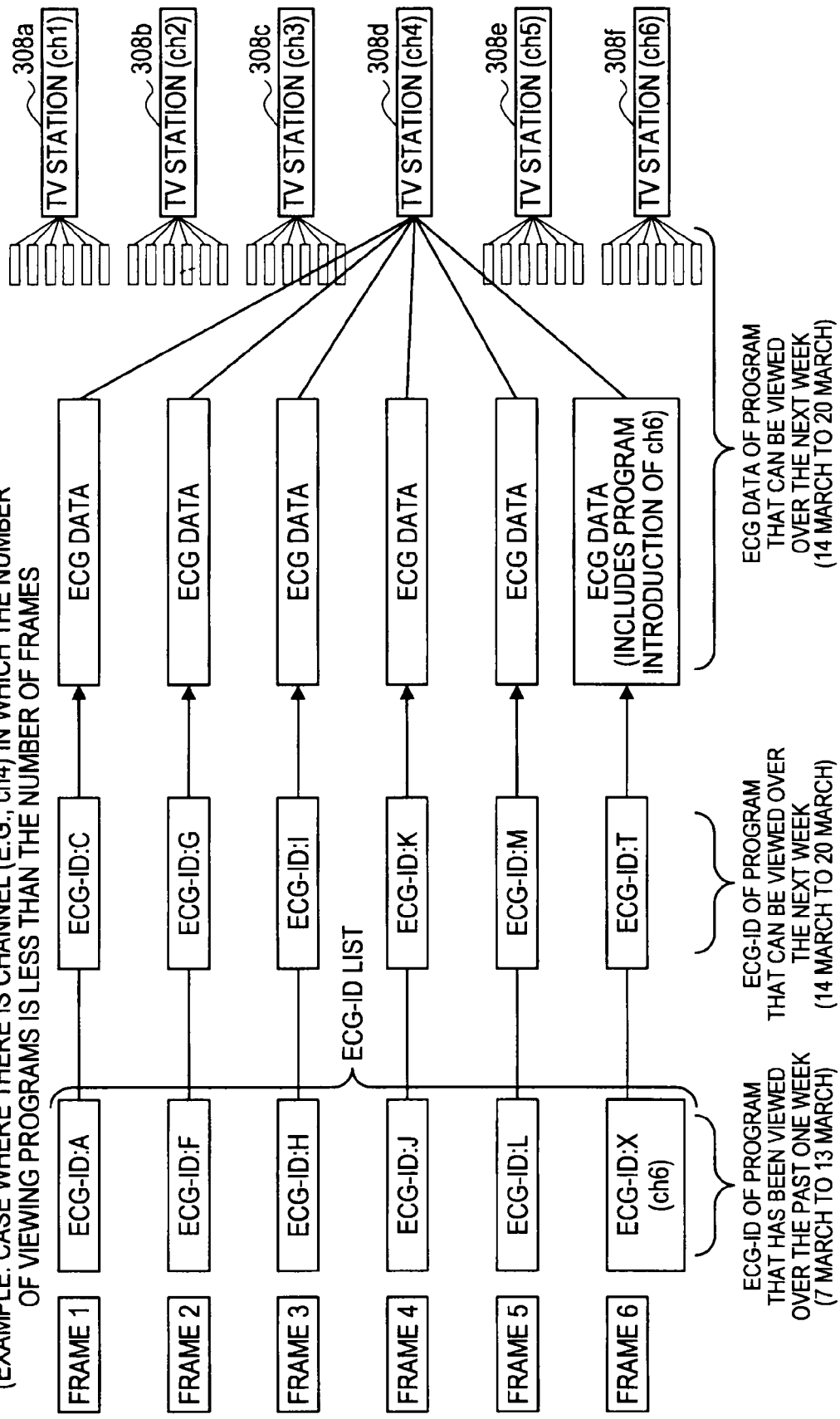
FIG. 17 is a diagram showing ECG data (part 3) transmitted from the ECG server to the TV set.

FIG. 17 is a diagram showing ECG data (part 3) transmitted from the ECG server to the TV set. In particular, FIG. 17 shows the case where there is a channel (ch4 in the example shown in FIG. 17) having frames, the number of which is less than the number of viewing programs (five programs in the example shown in FIG. 17). In this case, for example, TV set 100 may substitute pieces of ECG data each corresponding to ECG-ID (ECG-ID: T in the example shown in FIG. 17) having a relationship with ECG-ID (ECG-ID: X in the example shown in FIG. 17) of another station (ch6 in the example shown in FIG. 17) for pieces of ECG data, the number of which being less than the number of the frames. Then the TV set 100 can effectively provide the ECG data of ch4 to the user 500 by using the substituted ECG data. In terms of services, it can be assumed that a program related to the ECG-ID: X of ch6 is introduced in the ECG data of ch4.

[1-18. Display Example (Part 1) when Image is Displayed in Overlapping Manner on TV Video]

Figure 18:
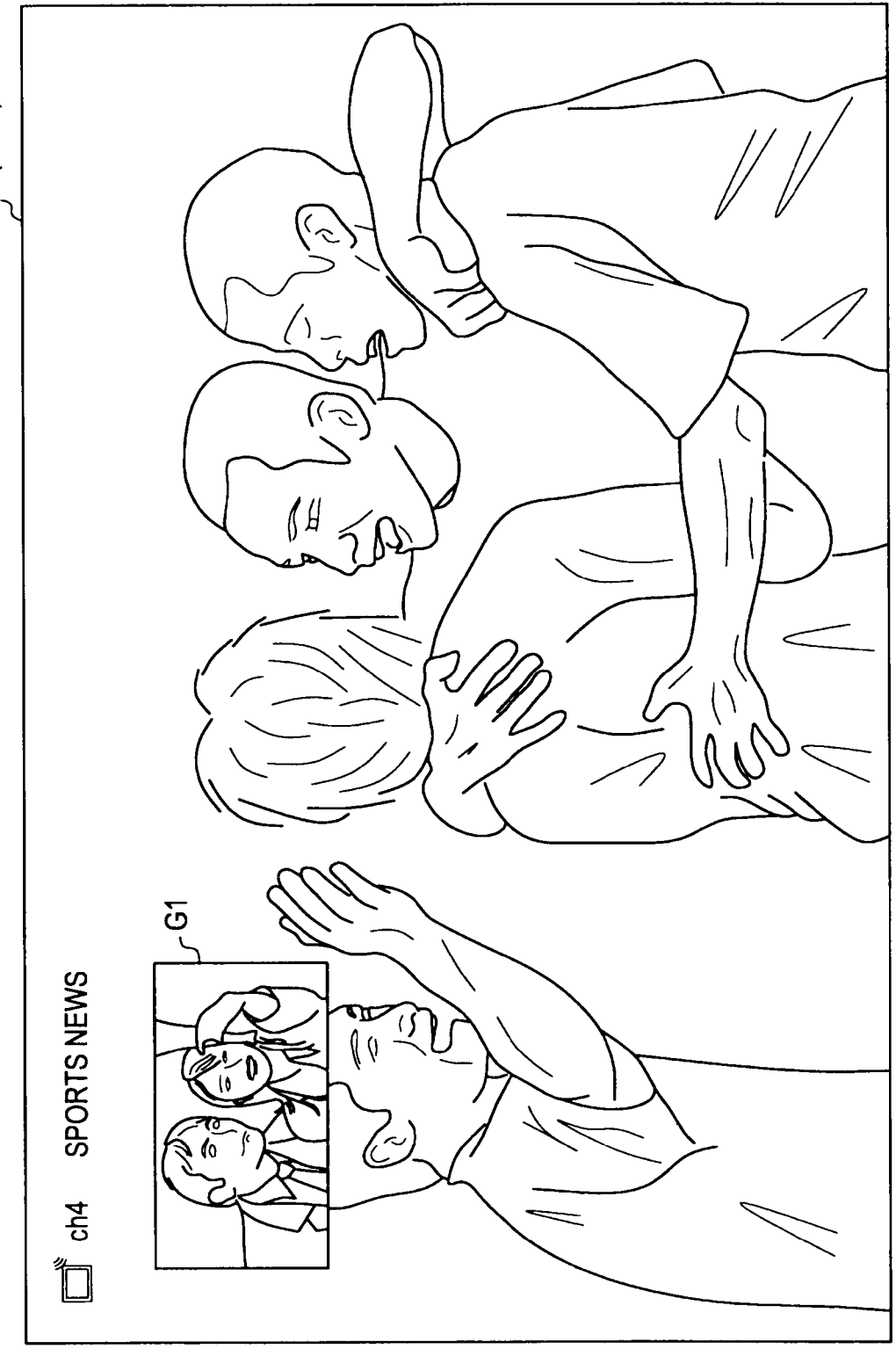
FIG. 18 is a diagram showing a display example (part 1) when an image is displayed in an overlapping manner on the TV video.

FIG. 18 is a diagram showing a display example (part 1) when an image is displayed in an overlapping manner on the TV video. As shown in FIG. 18, the ECG pop-up menu control section 174 controls to display the image G1 at a predetermined position on the TV video 141a which is being displayed on the display section 140, and, after elapse of a predetermined period of time, controls to hide the image G1. Next, the ECG pop-up menu control section 174 controls to display the image G2 at the same position as that at which the image G1 has been displayed, and, after elapse of a predetermined period of time, controls to hide the image G2. In the same manner, the ECG pop-up menu control section 174 can sequentially control to display and to hide images after the image G3. When the user 500 selects a displayed image and performs an ECG menu display operation, an ECG menu is displayed. Further, when the user 500 selects a displayed image and performs a recording reservation operation, the recording reservation of a program corresponding to the selected image is set. Those functions can be applied to a case where the electronic program guide 141b or the tuning menu 141c, instead of the TV video 141a, is displayed on the display section 140.

[1-19. Display Example (Part 2) when Image is Displayed in Overlapping Manner on TV Video]

Figure 19:
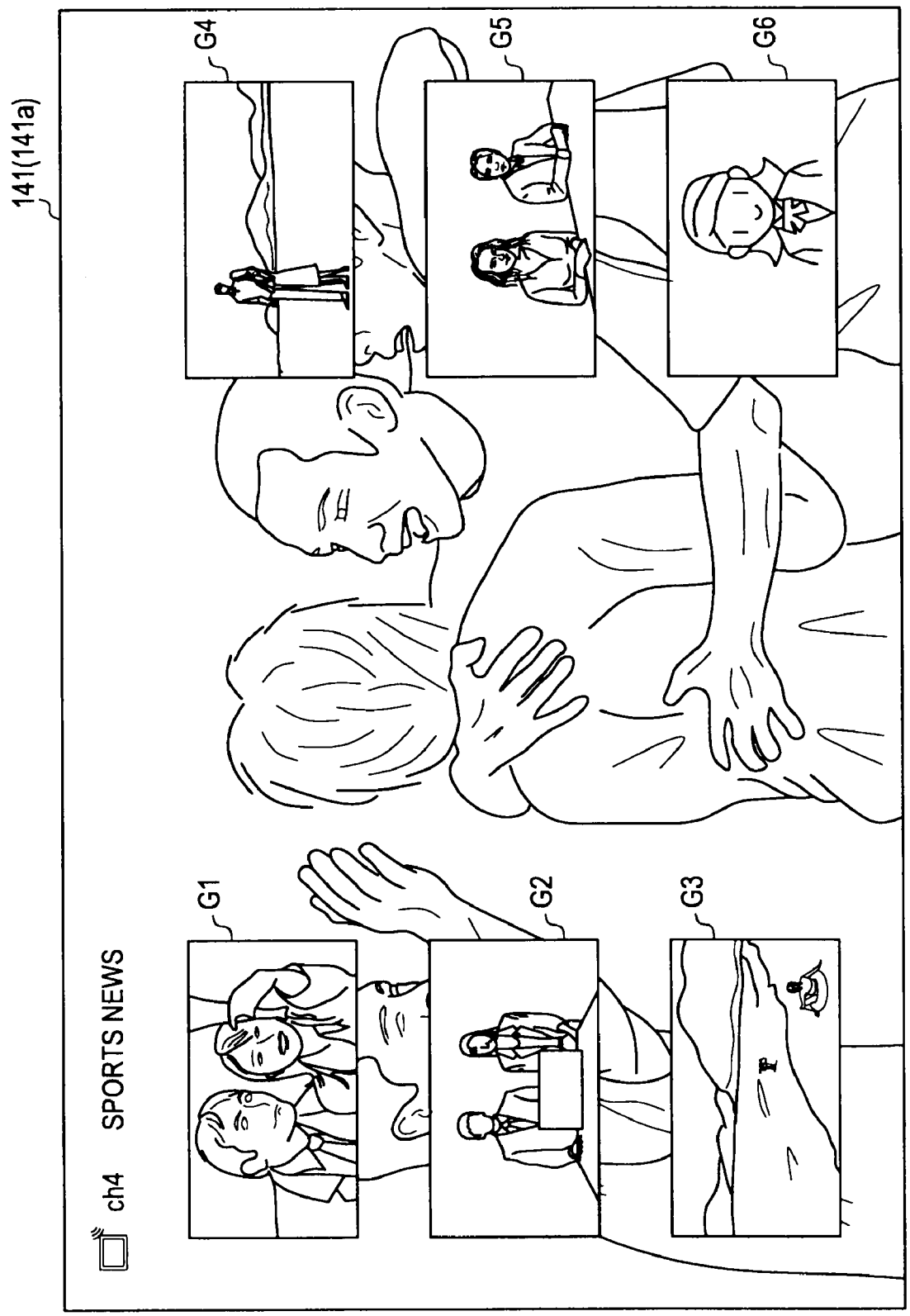
FIG. 19 is a diagram showing a display example (part 2) when an image is displayed in an overlapping manner on the TV video.

FIG. 19 is a diagram showing a display example (part 2) when an image is displayed in an overlapping manner on the TV video. As shown in FIG. 19, the ECG pop-up menu control section 174 controls to display the images G1 to G6 side by side at predetermined positions on the TV video 141a which is being displayed on the display section 140. Further, the ECG pop-up menu control section 174 may control to sequentially display the images G1 to G6 one by one at each of the respective positions. The number of images that can be displayed at one time is not limited to six, and may be three or any other numbers. When the user 500 selects a displayed image and performs an ECG menu display operation, an ECG menu is displayed. Further, when the user 500 selects a displayed image and performs a recording reservation operation, the recording reservation of a program corresponding to the selected image is set.

[1-20. Display Example when Image is Displayed in Overlapping Manner on Electronic Program Guide]

Figure 20:
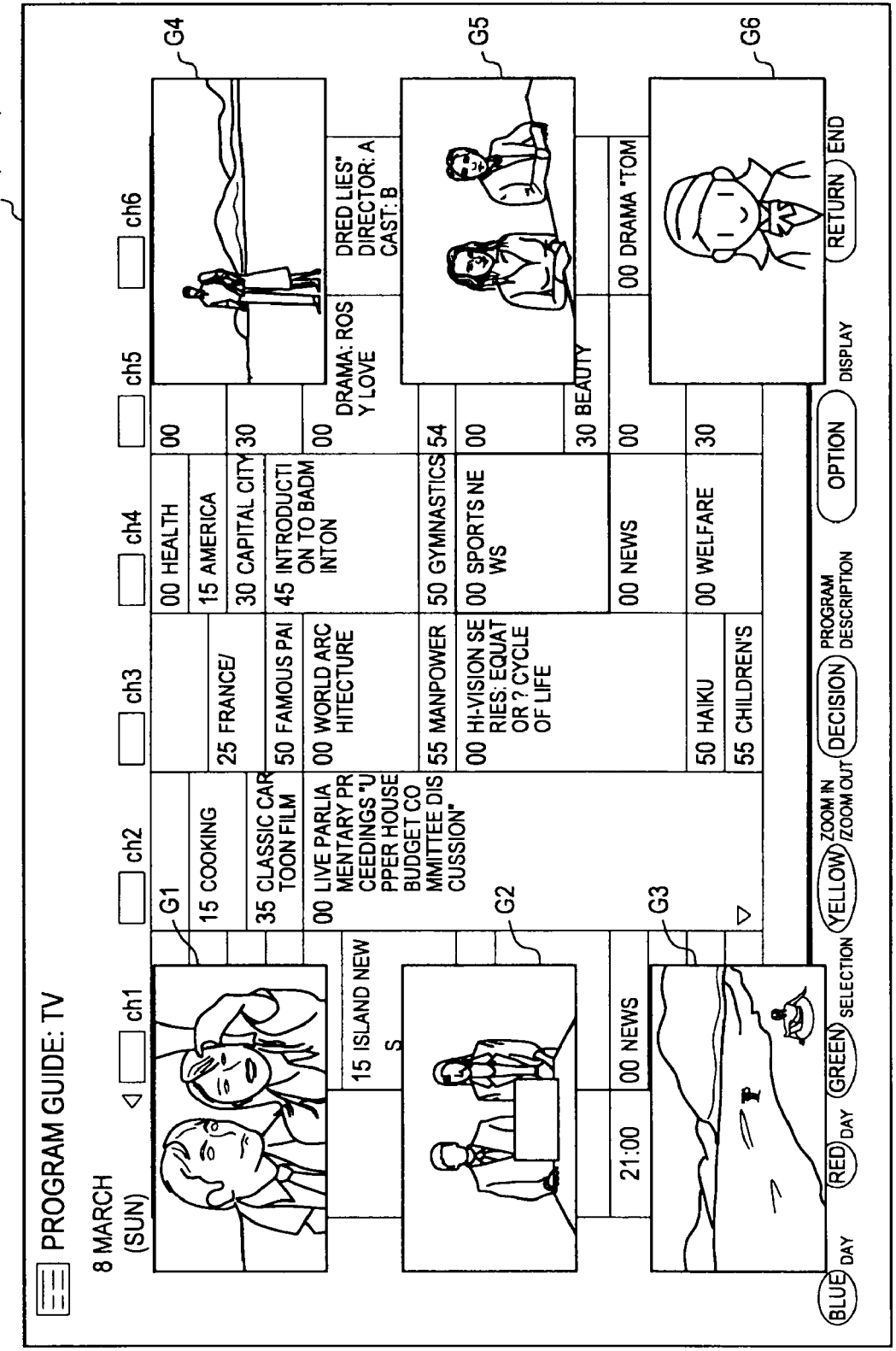
FIG. 20 is a diagram showing a display example when an image is displayed in an overlapping manner on the electronic program guide.

FIG. 20 is a diagram showing a display example when an image is displayed in an overlapping manner on the electronic program guide. As shown in FIG. 20, the ECG pop-up menu control section 174 controls to display the images G1 to G6 side by side at predetermined positions on the electronic program guide 141b which is being displayed on the display section 140. Further, the ECG pop-up menu control section 174 may control to sequentially display the images G1 to G6 one by one at each of the respective positions. The number of images that can be displayed at one time is not limited to six, and may be three or any other numbers. When the user 500 selects a displayed image and performs an ECG menu display operation, an ECG menu is displayed. Further, when the user 500 selects a displayed image and performs a recording reservation operation, the recording reservation of a program corresponding to the selected image is set.

[1-21. Display Example when Image is Displayed in Overlapping Manner on Tuning Menu]

Figure 21:
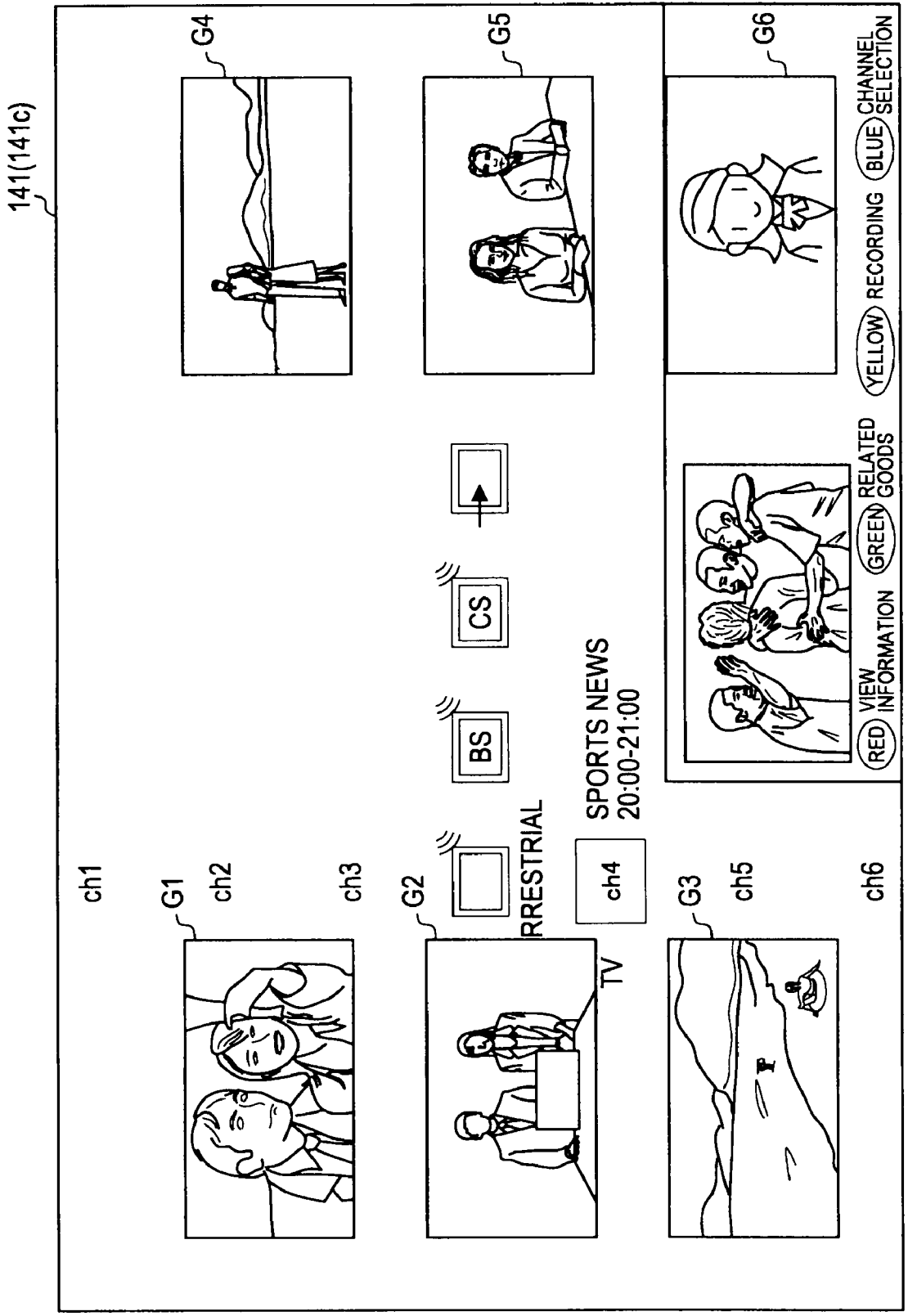
FIG. 21 is a diagram showing a display example when an image is displayed in an overlapping manner on the tuning menu.

FIG. 21 is a diagram showing a display example when an image is displayed in an overlapping manner on the tuning menu. As shown in FIG. 21, the ECG pop-up menu control section 174 controls to display the images G1 to G6 side by side at predetermined positions on the tuning menu 141c which is being displayed on the display section 140. Further, the ECG pop-up menu control section 174 may control to sequentially display the images G1 to G6 one by one at each of the respective positions. The number of images that can be displayed at one time is not limited to six, and may be three or any other numbers. When the user 500 selects a displayed image and performs an ECG menu display operation, an ECG menu is displayed. Further, when the user 500 selects a displayed image and performs a recording reservation operation, the recording reservation of a program corresponding to the selected image is set.

[1-22. Display Example (Part 1) of ECG Menu]

Figure 22:
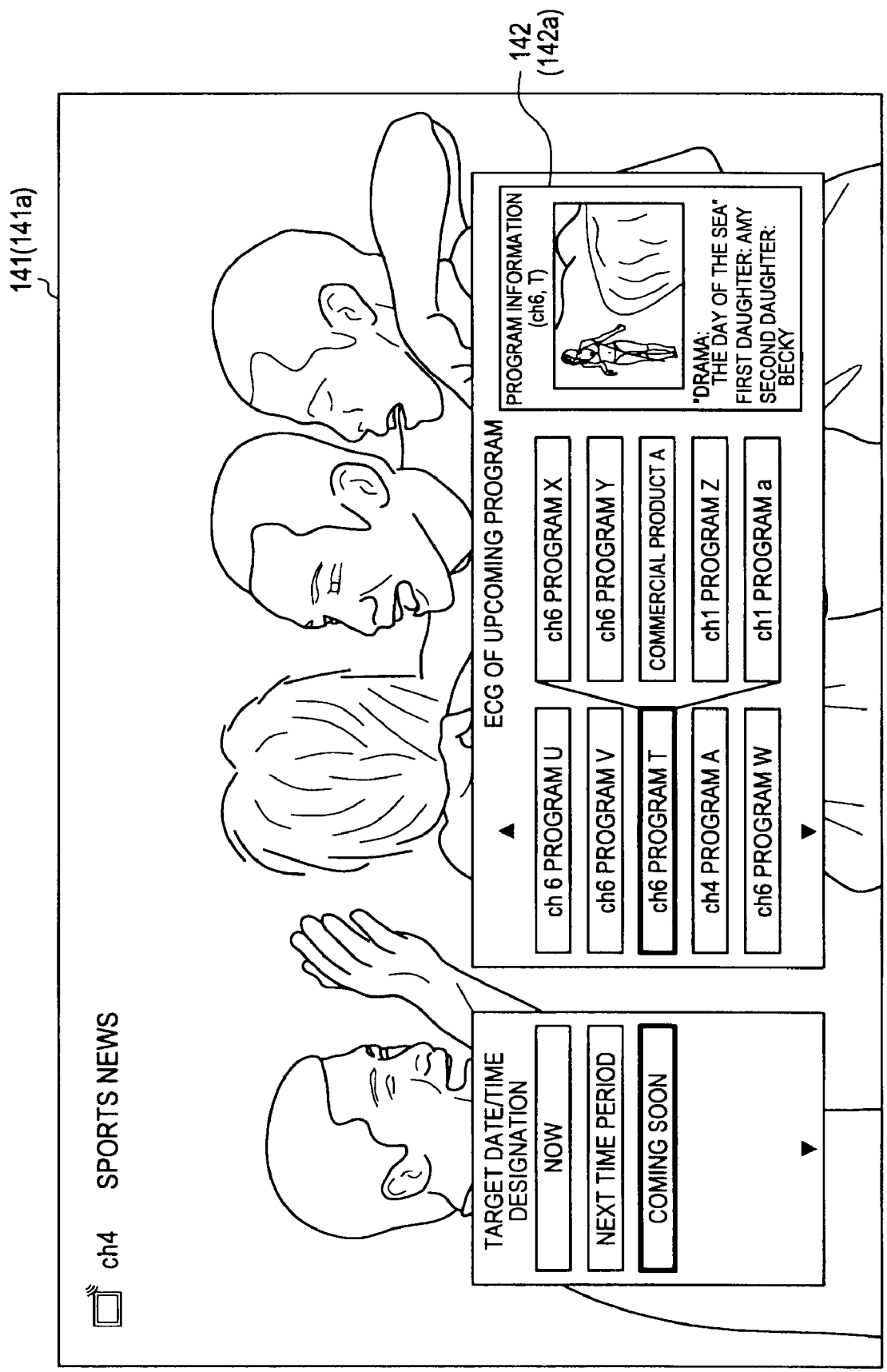
FIG. 22 is a diagram showing a display example (part 1) of an ECG menu.

FIG. 22 is a diagram showing a display example (part 1) of an ECG menu. As shown in FIG. 22, the user 500 can select "coming soon" from the items included in the target date/time designation. For example, recommended pieces of ECG data for the next one week are displayed in the list by referring to a viewing history of the user 500. Examples thereof include introduction of ECG data of the following week after the week on which a viewed program has been provided, and ECG data that is linked to the ECG data. The ECG data is introduced based on the viewing history of the user 500, and hence, effective ECG data can be introduced. Detailed information of a focused program is displayed on a detail window 142(142a).

[1-23. Display Example (Part 2) of ECG Menu]

Figure 23:
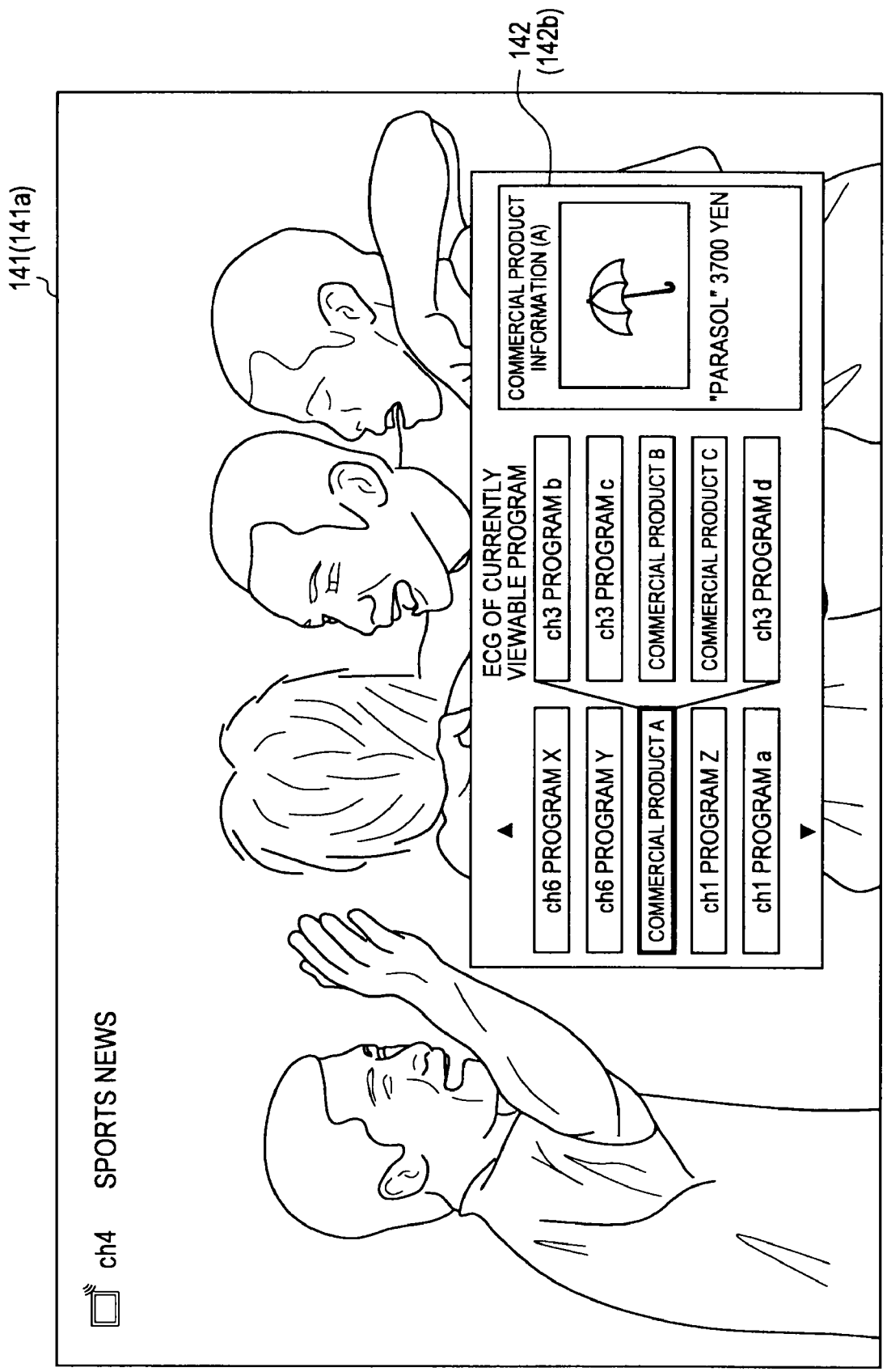
FIG. 23 is a diagram showing a display example (part 2) of an ECG menu.

FIG. 23 is a diagram showing a display example (part 2) of an ECG menu. In the case where the ECG menu shown in FIG. 22 is displayed, when the user 500 performs an operation to instruct the movement to the right, the ECG menu after the movement to the right as shown in FIG. 23 is displayed. By causing the ECG menu to move as mentioned above, the user 500 can see related programs and commercial products one after another. Detailed information of a focused program is displayed on a detail window 142(142*b*).

[1-24. Display Example (Part 3) of ECG Menu]

Figure 24:
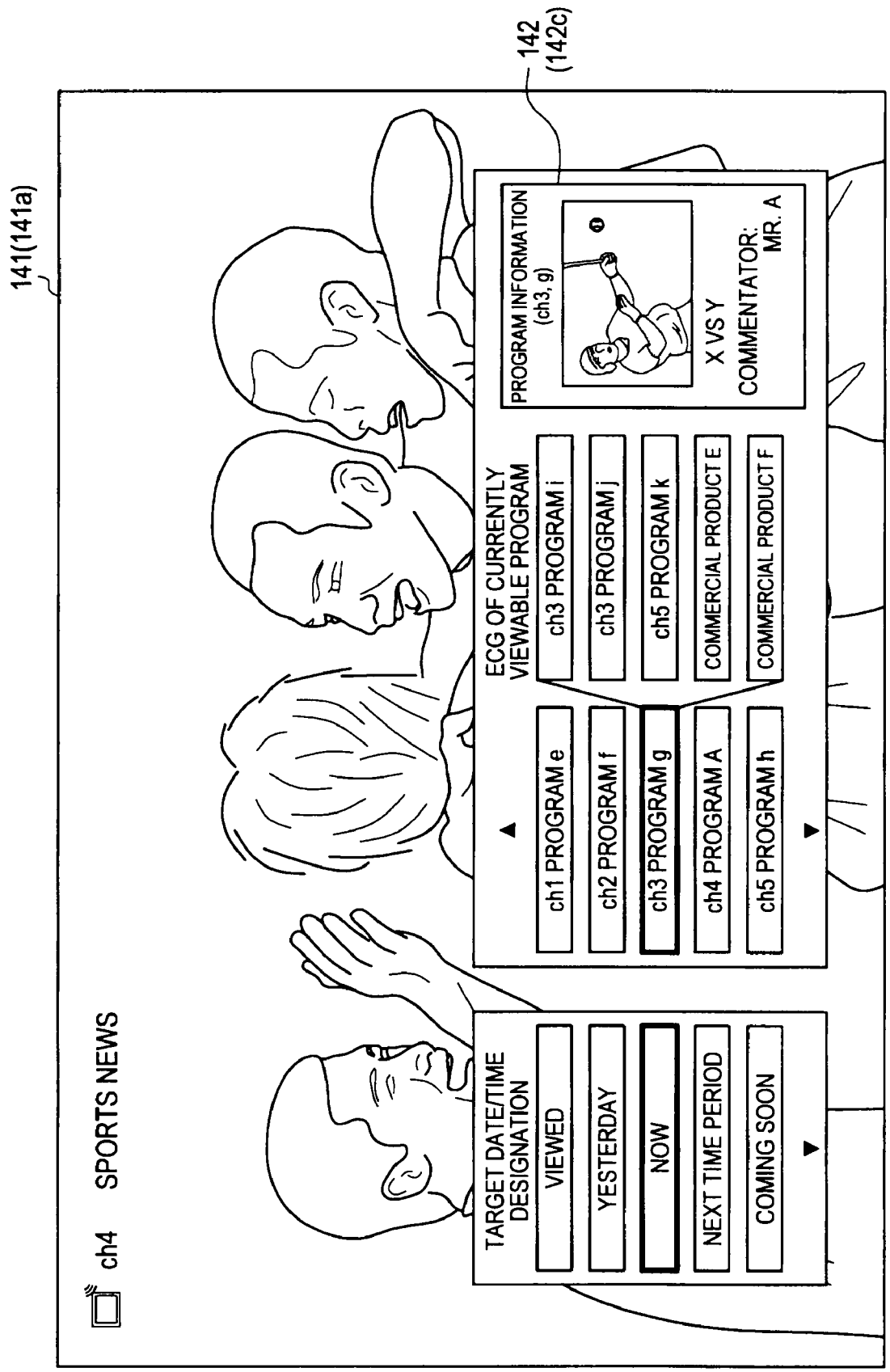
FIG. 24 is a diagram showing a display example (part 3) of an ECG menu.

FIG. 24 is a diagram showing a display example (part 3) of an ECG menu. As shown in FIG. 24, the user 500 can select "now" from the items included in the target date/time designation. For example, when the user 500 selects "now", pieces of ECG data that are currently viewable are displayed in the list. Detailed information of a focused program is displayed on a detail window 142(142*c*).

[1-25. Display Example (Part 4) of ECG Menu]

Figure 25:
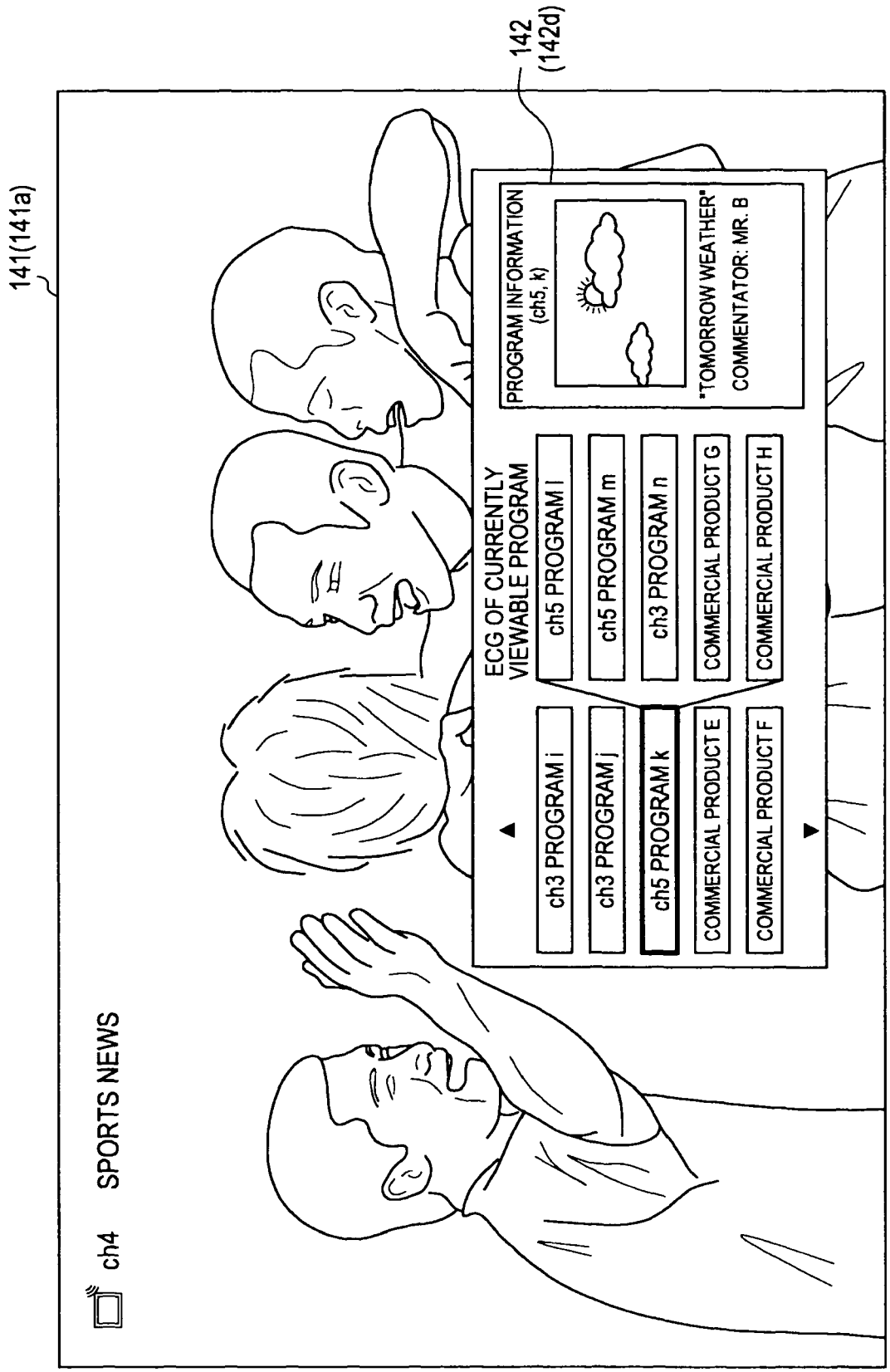
FIG. 25 is a diagram showing a display example (part 4) of an ECG menu.

FIG. 25 is a diagram showing a display example (part 4) of an ECG menu. In the case where the ECG menu shown in FIG. 24 is displayed, when the user 500 performs an operation to instruct the movement to the right, the ECG menu after the movement to the right as shown in FIG. 25 is displayed. By causing the ECG menu to move as mentioned above, the user 500 can see related programs and commercial products one after another. Detailed information of a focused program is displayed on a detail window 142(142*d*).

[1-26. Display Example (Part 5) of ECG Menu]

Figure 26:
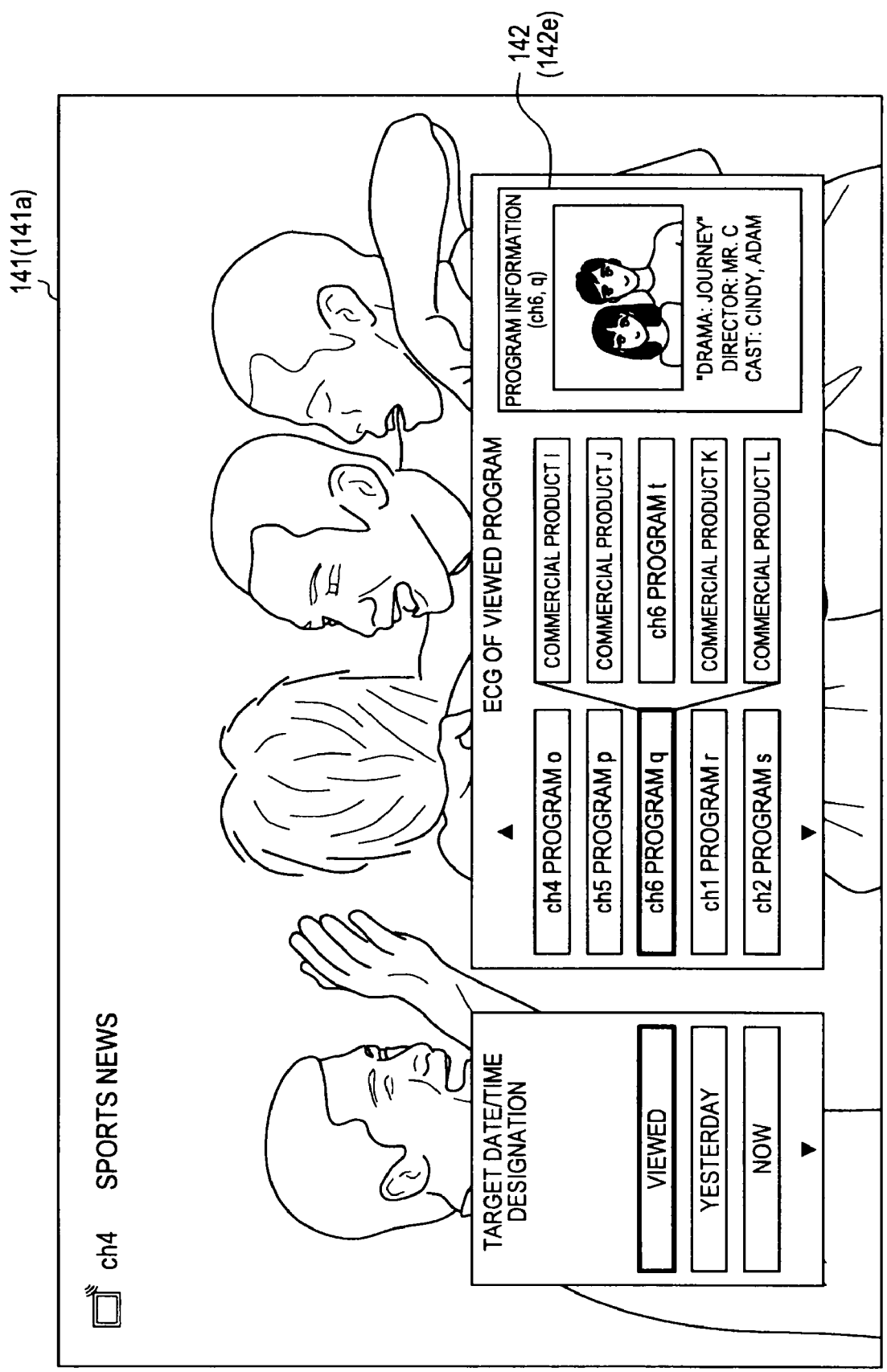
FIG. 26 is a diagram showing a display example (part 5) of an ECG menu.

FIG. 26 is a diagram showing a display example (part 5) of an ECG menu. As shown in FIG. 26, the user 500 can select "viewed" from the items included in the target date/time designation. For example, when the user 500 selects "viewed", programs that have been viewed over the past week are displayed in the list. In viewing ECG of the viewed programs, an upcoming program can be precisely found, because the viewed programs used for the ECG viewing are given based on the programs of the user's interest. Examples thereof include introduction of ECG data of a program of the following week after the week on which a viewed program has been provided, and ECG data that is linked to the ECG data. Detailed information of a focused program is displayed on a detail window 142(142*e*).

[1-27. Display Example (Part 6) of ECG Menu]

Figure 27:
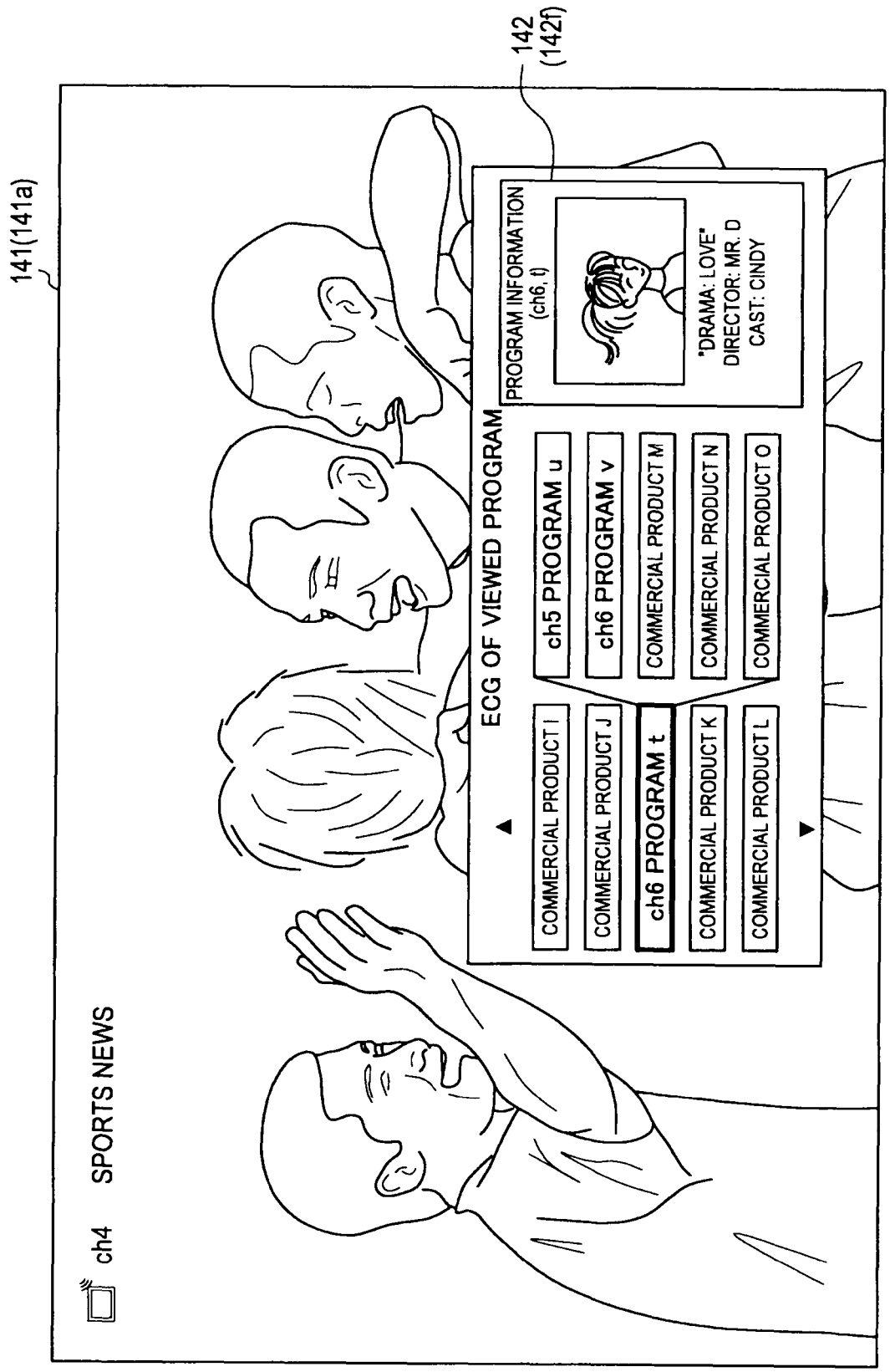
FIG. 27 is a diagram showing a display example (part 6) of an ECG menu.

FIG. 27 is a diagram showing a display example (part 6) of an ECG menu. In the case where the ECG menu shown in FIG. 26 is displayed, when the user 500 performs an operation to instruct the movement to the right, the ECG menu after the movement to the right as shown in FIG. 27 is displayed. By causing the ECG menu to move as mentioned above, the user 500 can see related programs and commercial products one after another. Detailed information of a focused program is displayed on a detail window 142(142*f*).

[1-28. Processing (Part 1) Executed by Information Processing System and Remote Control]

Figure 28:
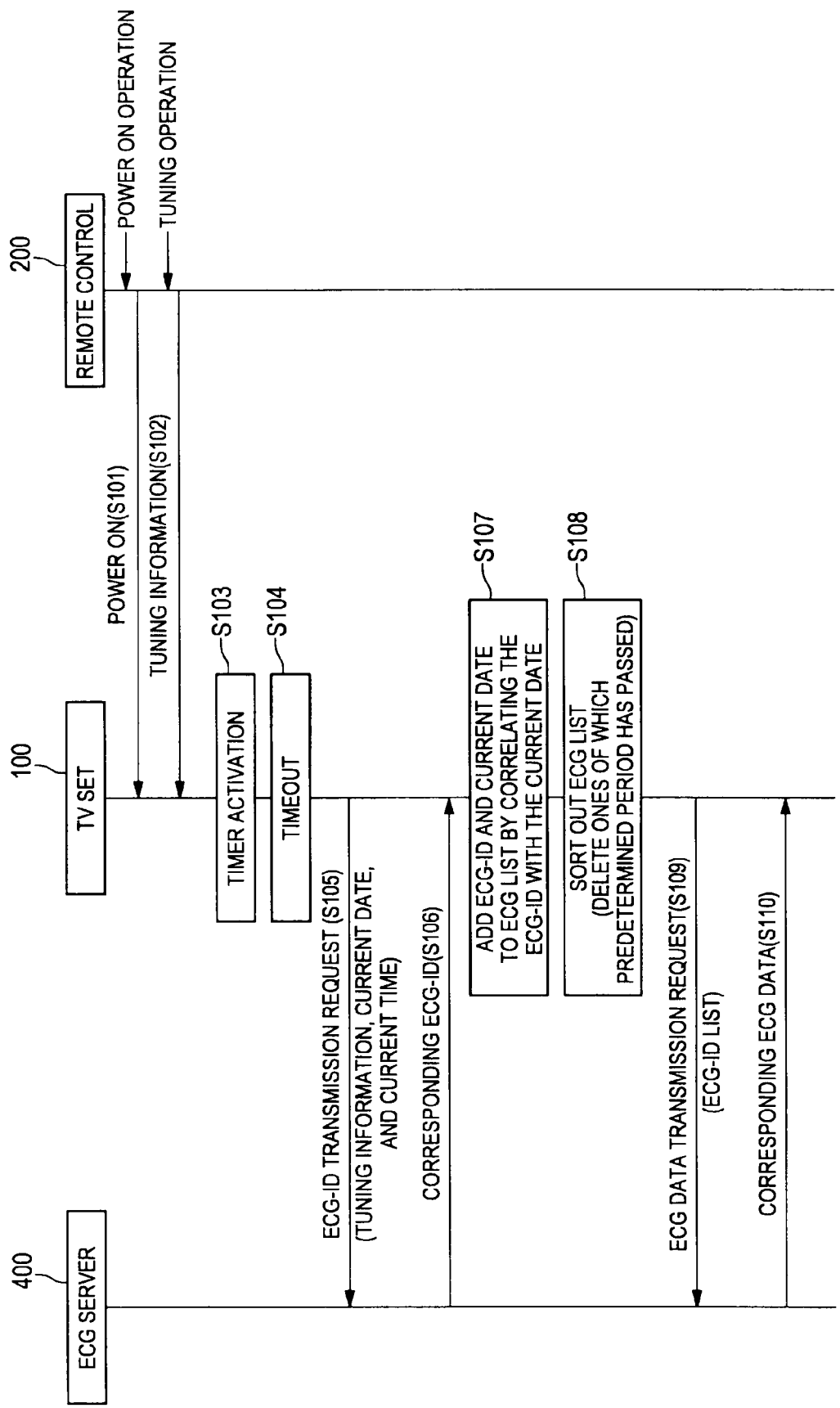
FIG. 28 is a sequence diagram showing a flow of processing (part 1) executed by an information processing system and a remote control according to the present embodiment.

FIG. 28 is a sequence diagram showing a flow of processing (part 1) executed by an information processing system and a remote control according to the present embodiment. The sequence diagram shown in FIG. 28 shows an example of the flow of the processing (part 1) executed by the information processing system and the remote control, and the processing executed by the information processing system and the remote control is not limited to the flow shown in this sequence diagram.

As shown in FIG. 28, when an operation to power on the TV set 100 is input from the user 500, the remote control 200 powers on the TV set 100 (step S101). Subsequently, when a tuning operation for a program to be viewed is input from the user 500, the remote control 200 transmits tuning information corresponding to the tuning operation to the TV set 100 (step S102).

When the TV set 100 receives tuning information 152 from the remote control 200, the TV set 100 causes the storage section 150 to store the tuning information 152, activates a timer (step S103), and waits until a predetermined time period elapses. A timeout occurs after the elapse of the predetermined time period (step S104), the TV set 100 transmits an ECG-ID transmission request to the ECG server 400 (step S105). The ECG-ID transmission request includes tuning information of a program which has been watched and listened to by the user 500 on the TV set 100, a current date corresponding to the date in which the program is watched and listened to, and a current time corresponding to the time at which the program is watched and listened to.

When the ECG server 400 receives the ECG-ID transmission request from the TV set 100, the ECG server 400 sends back a corresponding ECG-ID to the TV set 100 (step S106). When the TV set 100 receives the ECG-ID from the ECG server 400, the TV set 100 adds to the ECG list 151 the received ECG-ID and the current date corresponding to the date in which the program is watched and listened to by correlating the ECG-ID with the current time (step S107). The TV set 100 sorts out the ECG list 151 (step S108). The sorting out of the ECG list 151 is performed by, for example, deleting ECG-ID of the program of which a predetermined period has passed after the last viewing time.

The TV set 100 transmits an ECG data transmission request including an ECG-ID list to the ECG server 400 at a predetermined time (step S109). The ECG-ID list can be obtained by extracting ECG-ID included in the ECG list 151. When the ECG server 400 receives the ECG data transmission request, the ECG server 400 transmits ECG data corresponding to the received ECG-ID to the TV set 100 (step S110).

[1-29. Processing (Part 2) Executed by Information Processing System and Remote Control]

Figure 29:
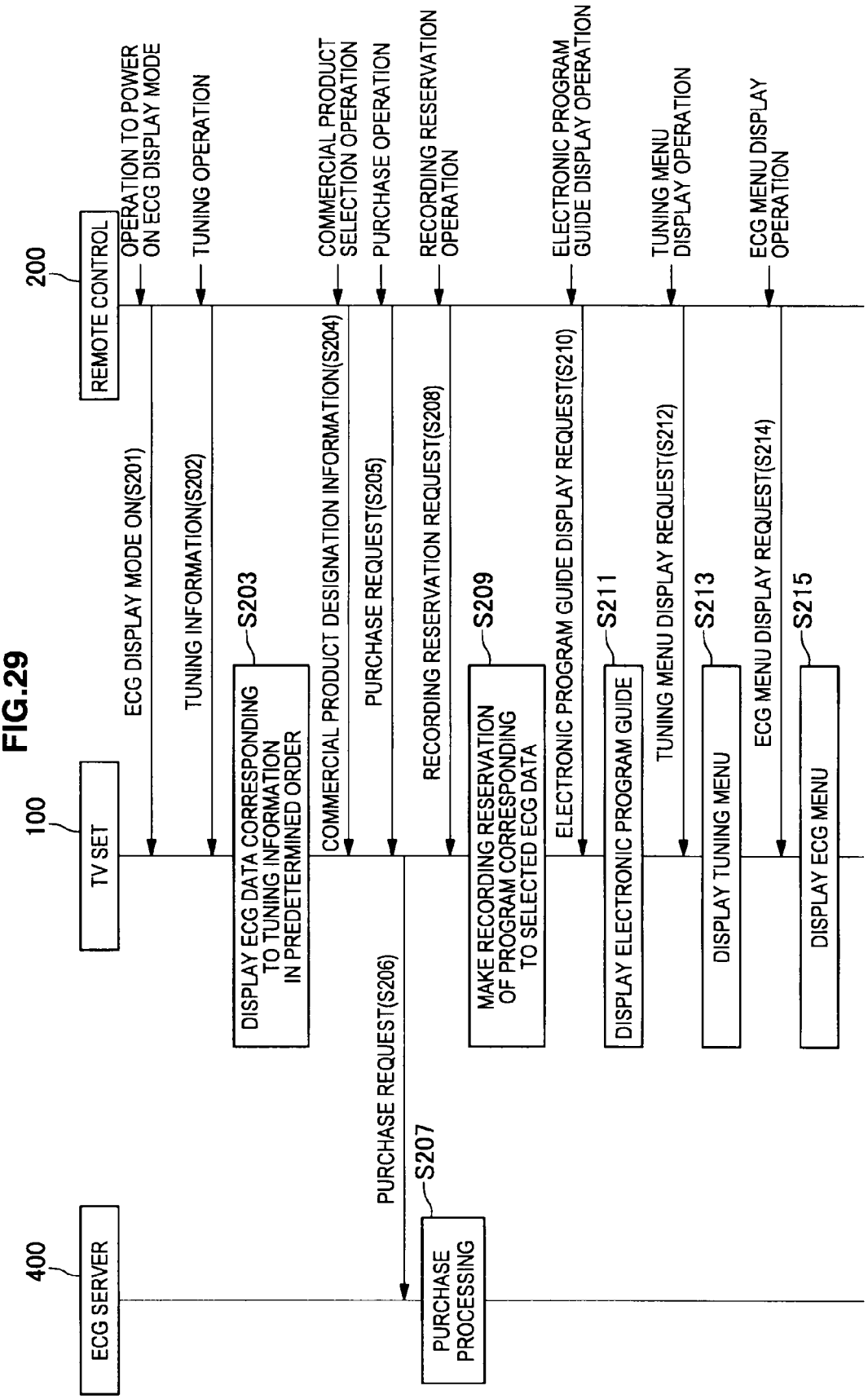
FIG. 29 is a sequence diagram showing a flow of processing (part 2) executed by the information processing system and the remote control according to the present embodiment.

FIG. 29 is a sequence diagram showing a flow of processing (part 2) executed by the information processing system and the remote control according to the present embodiment. The sequence diagram shown in FIG. 29 shows an example of the flow of the processing (part 2) executed by the information processing system and the remote control, and the processing executed by the information processing system and the remote control is not limited to the flow shown in this sequence diagram.

As shown in FIG. 29, when an operation to power on an ECG display mode 153 is input from the user 500, the remote control 200 powers on the ECG display mode 153 (step S201). The TV set 100 then controls to display ECG data on the display section 140. Next, when a tuning operation for a program to be watched and listened to on the TV set 100 is input, the remote control 200 transmits tuning information corresponding to the tuning operation to the TV set 100 (step S202).

When the TV set 100 receives the tuning information 152 from the remote control 200, the TV set 100 causes the storage section 150 to store the tuning information 152, and displays the ECG data corresponding to the tuning information 152 in a predetermined order (step S203). In the case where the user 500 has an intention to view commercial product information included in ECG data, the user 500 performs a commercial product selection operation for selecting the commercial product. When the commercial product selection operation from the user 500 is input, the remote control 200 transmits commercial product designation information for designating the commercial product selected by the commercial product selection operation to the TV set 100 (step S204). When the TV set 100 receives the commercial product designation information from the remote control 200, the TV set 100 displays detailed information of the commercial product designated by the received commercial product designation information. When the user 500 views the detailed information of the commercial product and has an intention to purchase the commercial product, the user 500 performs a purchase operation for purchasing the commercial product. When the purchase operation is input from the user 500, the remote control 200 transmits a purchase request to the TV set 100 (step S205). When the TV set 100 receives purchase information from the remote control 200, the TV set 100 transmits the purchase request including the commercial product designation information to the ECG server 400 (step S206). When the ECG server 400 receives the purchase request from the TV set 100, the ECG server 400 executes the purchase processing of the commercial product designated by the commercial product designation information included in the purchase request (step S207).

In the case where the user 500 has, as a result of viewing the ECG data, an intention to make a recording reservation of a program corresponding to the ECG data, the user 500 performs a recording reservation operation. When the recording reservation operation is input from the user 500, the remote control 200 transmits a recording reservation request to the TV set 100 (step S208). The TV set 100 makes a recording reservation of a program corresponding to the selected ECG data (step S209).

When an electronic program guide display operation is input from the user 500, the remote control 200 transmits an electronic program guide display request to the TV set 100 (step S210). When the TV set 100 receives the electronic program guide display request from the remote control 200, the TV set 100 changes screen type information 154 stored in the storage section 150 to type information for identifying the electronic program guide, and displays the electronic program guide (step S211).

When a tuning menu display operation is input from the user 500, the remote control 200 transmits a tuning menu display request to the TV set 100 (step S212). When the TV set 100 receives the tuning menu display request from the remote control 200, the TV set 100 changes the screen type information 154 stored in the storage section 150 to type information for identifying the tuning menu, and displays the tuning menu (step S213).

When an ECG menu display operation is input from the user 500, the remote control 200 transmits an ECG menu display request to the TV set 100 (step S214). When the TV set 100 receives the ECG menu display request from the remote control 200, the TV set 100 displays the ECG menu (step S215).

[1-30. Processing Executed by Program Viewing Judgment Section]

Figure 30:
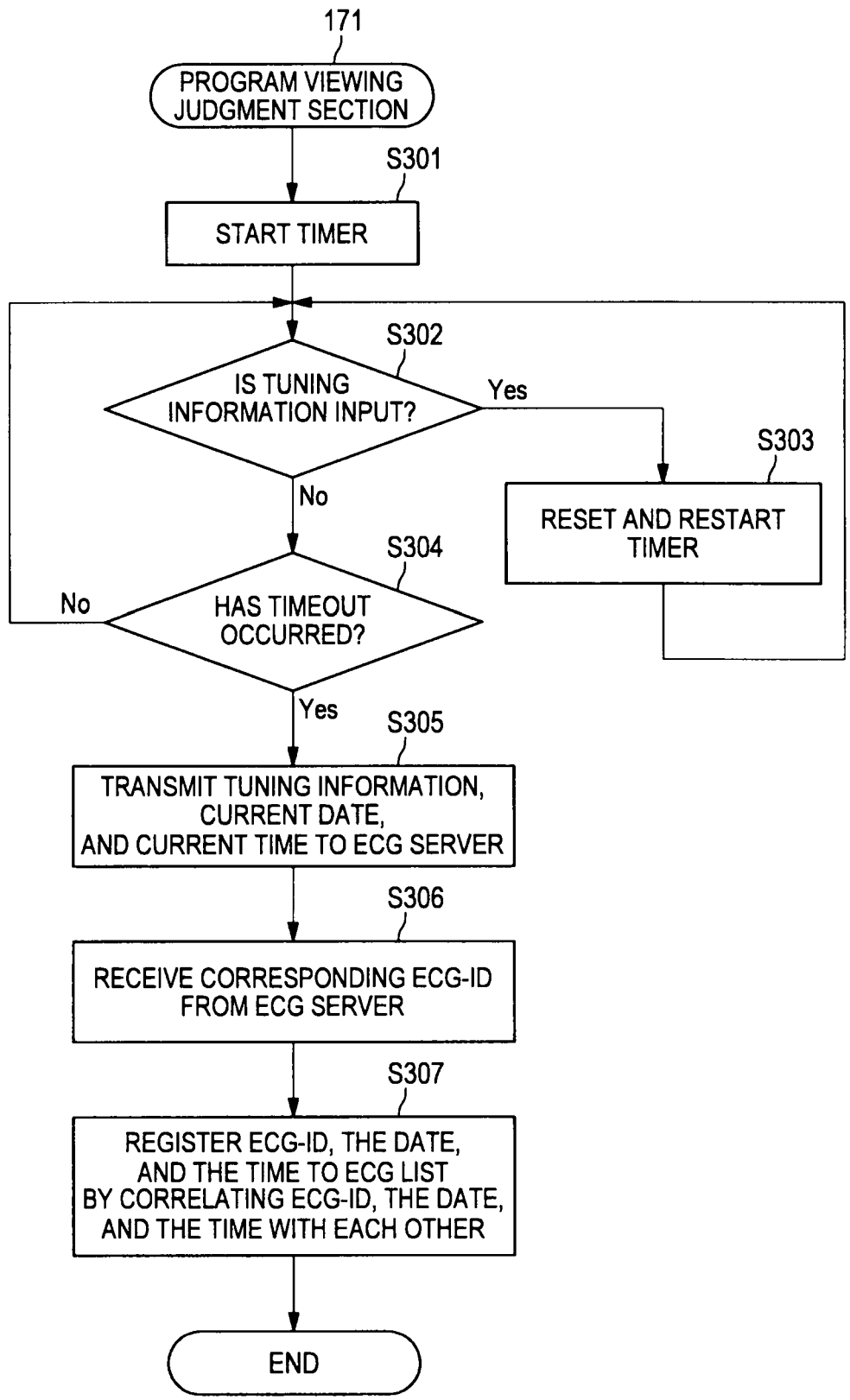
FIG. 30 is a flowchart showing a flow of processing executed by a program viewing judgment section according to the present embodiment.

FIG. 30 is a flowchart showing a flow of processing executed by a program viewing judgment section according to the present embodiment. The flowchart shown in FIG. 30 shows an example of the flow of the processing executed by the program viewing judgment section, and the processing executed by the program viewing judgment section is not limited to the flow shown in this flowchart.

Figure 31:
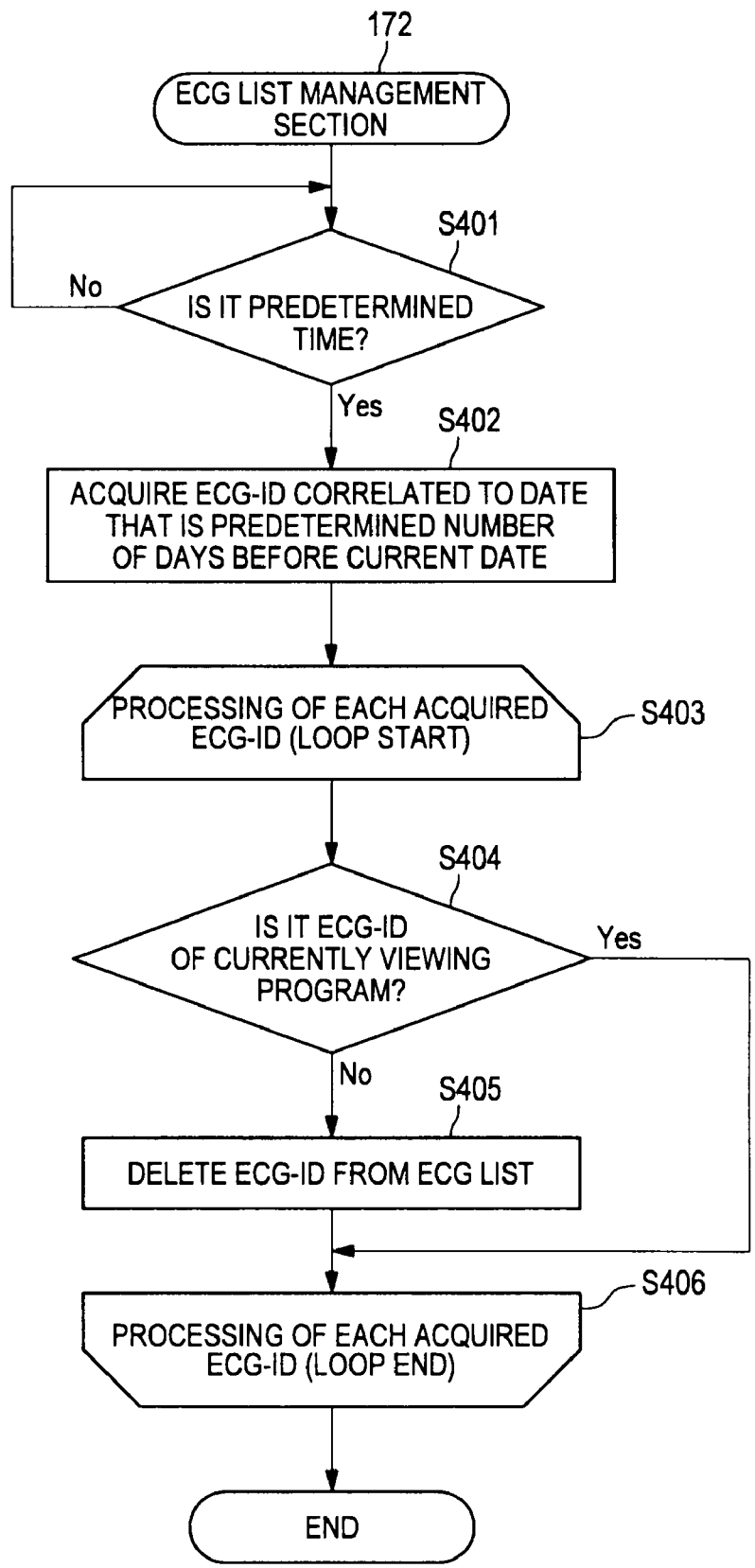
FIG. 31 is a flowchart showing a flow of processing executed by an ECG list management section according to the present embodiment.

As shown in FIG. 31, the program viewing judgment section 171 starts a timer (step S301), and determines whether tuning information is input (step S302). The tuning information is received from the remote control 200 and is input to the program viewing judgment section 171. In the case where the program viewing judgment section 171 determines that the tuning information is input ("Yes" at step S302), the program viewing judgment section 171 resets and restarts the timer (step S303) and returns to step S302. In the case where the program viewing judgment section 171 determines that the tuning information is not input ("No" at step S302), the program viewing judgment section 171 determines whether timeout has occurred (step S304).

In the case where the program viewing judgment section 171 determines that the timeout has not occurred ("No" at step S304), the program viewing judgment section 171 returns to step S302. In the case where the program viewing judgment section 171 determines that the timeout has occurred ("Yes" at step S303), the program viewing judgment section 171 transmits to the ECG server 400 tuning information of a program which has been watched and listened to by the user 500, a current date corresponding to the date in which the program is watched and listened to, and a current time corresponding to the time at which the program is watched and listened to (step S305). The program viewing judgment section 171 receives a corresponding ECG-ID from the ECG server 400 (step S306), registers the ECG-ID, the date, and the time to ECG list 151 by correlating the ECG-ID, the date, and the time with each other (step S307), and completes the processing. The program viewing judgment section 171 may return to step S301 after executing step S307.

[1-31. Processing Executed by ECG List Management Section]

FIG. 31 is a flowchart showing a flow of processing executed by an ECG list management section according to the present embodiment. The flowchart shown in FIG. 31 shows an example of the flow of the processing executed by the ECG list management section, and the processing executed by the ECG list management section is not limited to the flow shown in this flowchart.

As shown in FIG. 31, ECG list management section 172 determines whether the current time reaches a predetermined time (step S401). For example, when it is assumed that the predetermined time is 00:00, the current time reaches the predetermined time once a day. The ECG list management section 172 acquires an ECG-ID correlated with the date that is a predetermined number of days before the current date from the ECG list 151 (step S402). For example, when it is assumed that the predetermined number of days is 8 days, an entire week's worth of ECG lists 151 are accumulated in the storage section 150.

The ECG list management section 172 repeats processing (step S403 to step S406) for each acquired ECG-ID. In the repeating processing (step S403 to step S406), ECG list management section 172 determines whether the acquired ECG-ID is an ECG-ID of a currently viewing program (step S404). In the case where the ECG list management section 172 determines that the acquired ECG-ID is the ECG-ID of the currently viewing program ("Yes" at step S404), the ECG list management section 172 proceeds to step S406. In the case where the ECG list management section 172 determines that the acquired ECG-ID is not the ECG-ID of the currently viewing program ("No" at step S404), the ECG list management section 172 deletes the ECG-ID from the ECG list 151 (step S405) and proceeds to step S406. The ECG list management section 172 completes the processing by executing the repeating processing (step S403 to step S406). The ECG list management section 172 may return to step S401 after executing the repeating processing (step S403 to step S406).

[1-32. Processing Executed by ECG Control Section]

Figure 32:
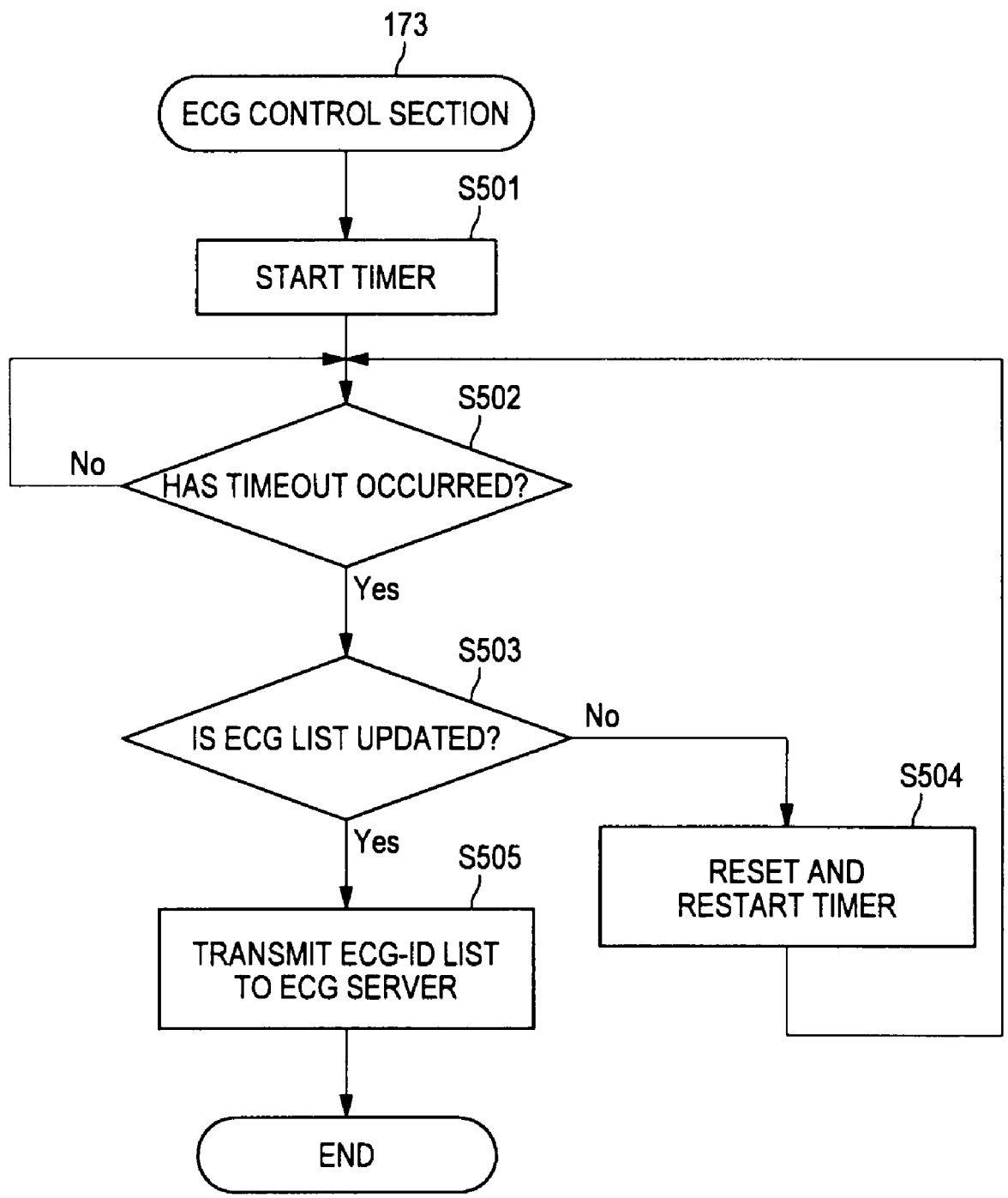
FIG. 32 is a flowchart showing a flow of processing executed by an ECG control section according to the present embodiment.

FIG. 32 is a flowchart showing a flow of processing executed by an ECG control section according to the present embodiment. The flowchart shown in FIG. 32 shows an example of the flow of the processing executed by the ECG control section, and the processing executed by the ECG control section is not limited to the flow shown in this flowchart.

As shown in FIG. 32, the ECG control section 173 starts a timer (step S501), and determines whether timeout has occurred (step S502). The time period from the start of the timer to the occurrence of timeout may be set to, for example, one hour. In the case where the ECG control section 173 determines that the timeout has not occurred ("No" at step S502), the ECG control section 173 returns to step S502. In the case where the ECG control section 173 determines that the timeout has occurred ("Yes" at step S502), the ECG control section 173 determines whether the ECG list 151 is updated (step S503).

In the case where the ECG control section 173 determines that the ECG list 151 is not updated ("No" at step S503), the ECG control section 173 resets and restarts the timer (step S504) and returns to step S502. In the case where the ECG control section 173 determines that the ECG list 151 is updated ("Yes" at step S503), the ECG control section 173 transmits an ECG-ID list to the ECG server 400 (step S505). The ECG-ID list is included in the ECG list 151. The ECG control section 173 completes the processing after executing step S505. The ECG control section 173 may return to step S501 after executing step S505.

[1-33. Processing Executed by ECG Pop-Up Menu Control Section]

Figure 33:
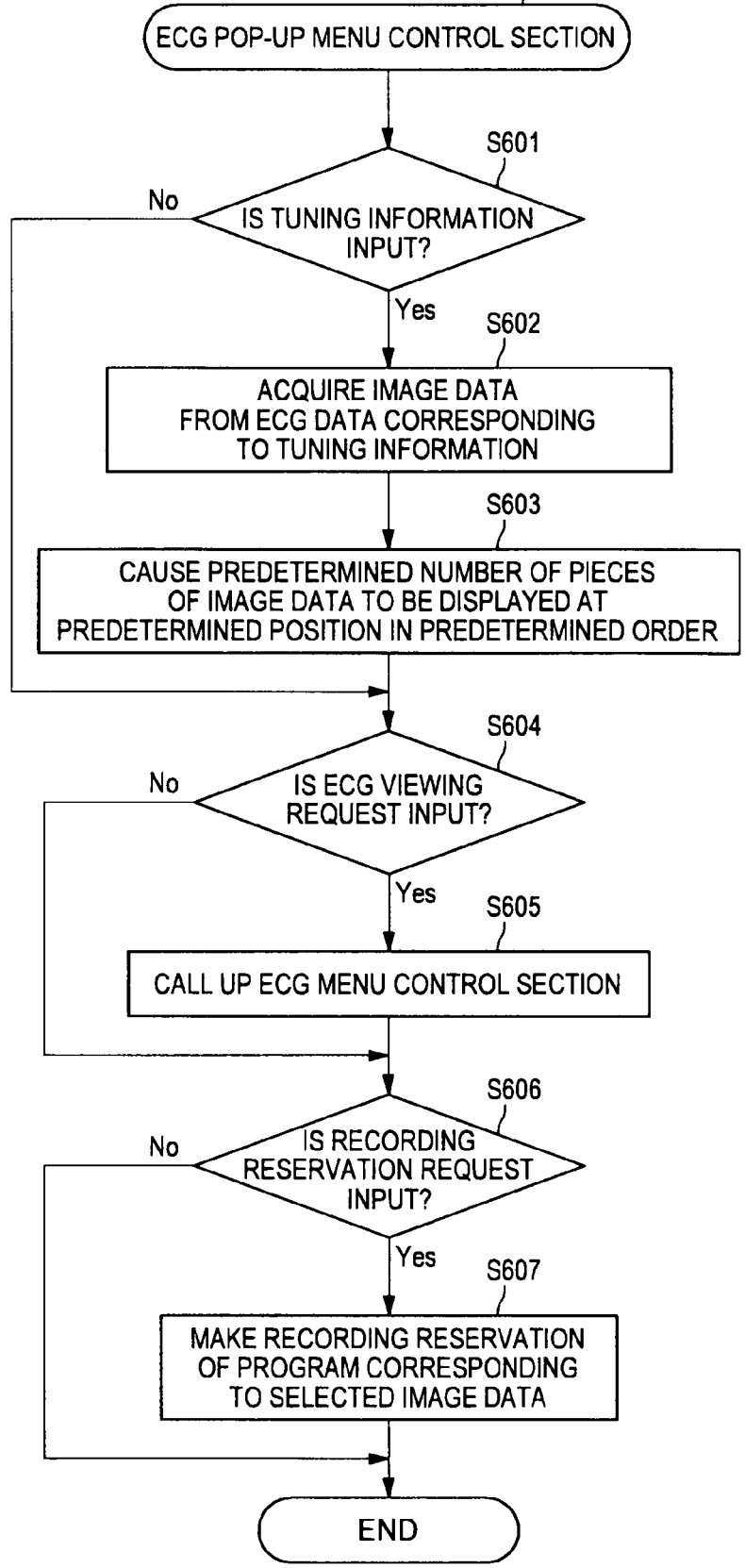
FIG. 33 is a flowchart showing a flow of processing executed by an ECG pop-up menu control section according to the present embodiment.

FIG. 33 is a flowchart showing a flow of processing executed by an ECG pop-up menu control section according to the present embodiment. The flowchart shown in FIG. 33 shows an example of the flow of the processing executed by the ECG pop-up menu control section, and the processing executed by the ECG pop-up menu control section is not limited to the flow shown in this flowchart. Note that the ECG pop-up menu control section 174 executes the processing from step S601 onwards in the case where the ECG display mode 153 is set to be ON.

As shown in FIG. 33, the ECG pop-up menu control section 174 determines whether tuning information is input (step S601). The tuning information is received from the remote control 200 and is input to the ECG pop-up menu control section 174. In the case where the ECG pop-up menu control section 174 determines that the tuning information is not input ("No" at step S601), the ECG pop-up menu control section 174 proceeds to step S604. In the case where the ECG pop-up menu control section 174 determines that the tuning information is input ("Yes" at step S601), the ECG pop-up menu control section 174 acquires image data from ECG data 155 corresponding to the tuning information (step S602). The ECG pop-up menu control section 174 causes a predetermined number of pieces of image data to be displayed at a predetermined position in a predetermined order (step S603) and proceeds to step S604.

The ECG pop-up menu control section 174 determines whether an ECG viewing request is input (step S604). The ECG viewing request is received from the remote control 200 and is input to the ECG pop-up menu control section 174. In the case where the ECG pop-up menu control section 174 determines that the ECG viewing request is not input ("No" at step S604), the ECG pop-up menu control section 174 proceeds to step S606. In the case where the ECG pop-up menu control section 174 determines that the ECG viewing request is input ("Yes" at step S604), the ECG pop-up menu control section 174 calls up the ECG menu control section 175 (step S605).

The ECG pop-up menu control section 174 determines whether a recording reservation request is input (step S606). The recording reservation request is received from the remote control 200 and is input to the ECG pop-up menu control section 174. In the case where the ECG pop-up menu control section 174 determines that the recording reservation request is not input ("No" at step S606), the ECG pop-up menu control section 174 completes the processing. In the case where the ECG pop-up menu control section 174 determines that the recording reservation request is input ("Yes" at step S606), the ECG pop-up menu control section 174 makes the recording reservation of a program corresponding to the selected image data (step S607) and completes the processing. The ECG pop-up menu control section 174 may return to step S601 after executing step S606 or step S607.

[1-34. Processing Executed by ECG Menu Control Section]

Figure 34:
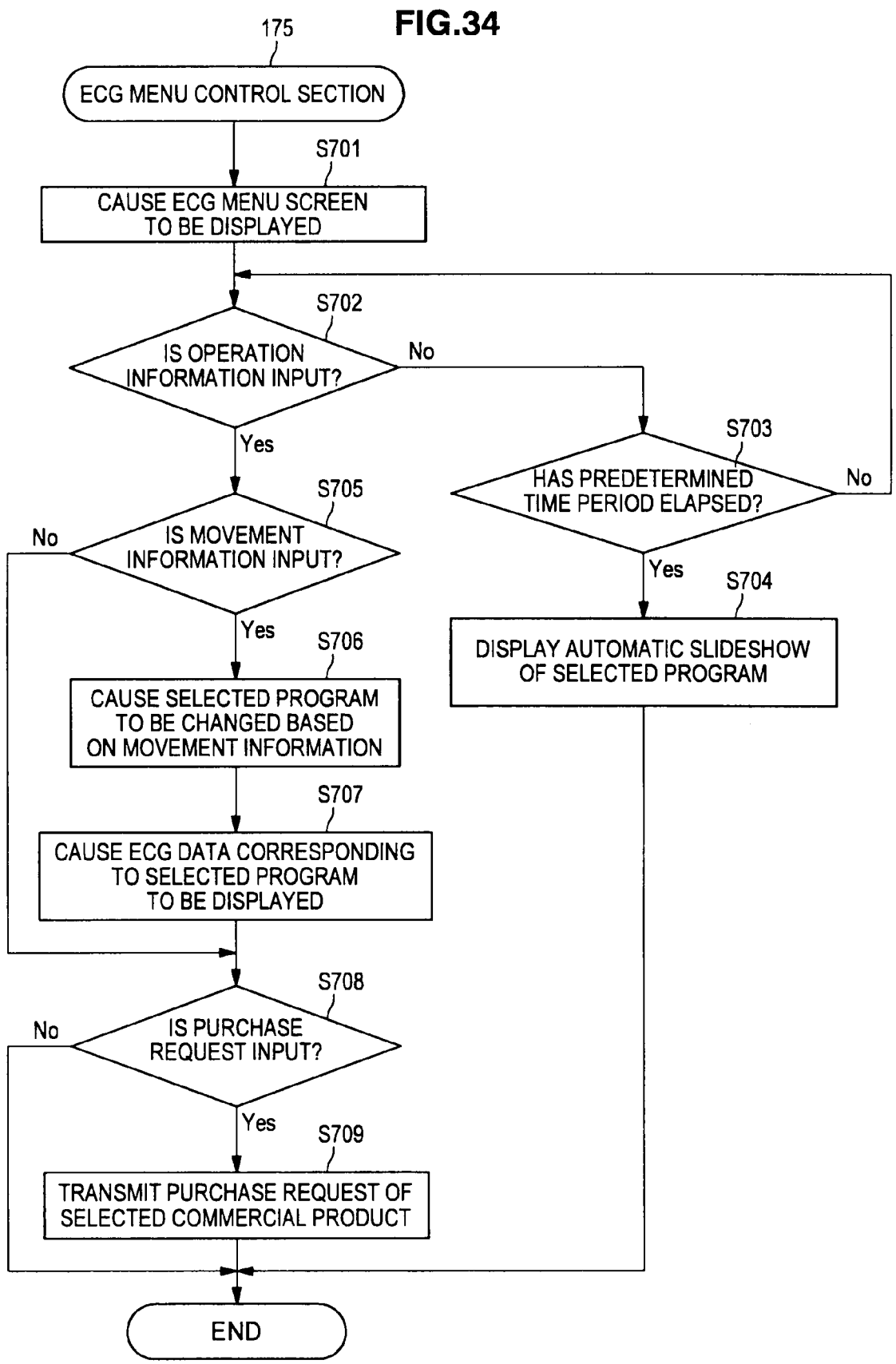
FIG. 34 is a flowchart showing a flow of processing executed by an ECG menu control section according to the present embodiment.

FIG. 34 is a flowchart showing a flow of processing executed by an ECG menu control section according to the present embodiment. The flowchart shown in FIG. 34 shows an example of the flow of the processing executed by the ECG menu control section, and the processing executed by the ECG menu control section is not limited to the flow shown in this flowchart. Note that the ECG menu control section 175 executes the processing from step S701 onwards in the case where the ECG menu control section 175 receives a request for displaying an ECG menu from the remote control 200 or in the case where the ECG menu control section 175 is called up by the ECG pop-up menu control section 174.

As shown in FIG. 34, the ECG menu control section 175 causes an ECG menu screen to be displayed (step S701) and determines whether operation information is input (step S702). The operation information is received from the remote control 200 and is input to the ECG menu control section 175. In the case where the ECG menu control section 175 determines that the operation information is not input ("No" at step S702), the ECG menu control section 175 determines whether a predetermined time period has elapsed from the last input of operation information (step S703). In the case where the ECG menu control section 175 determines that the predetermined time period has not elapsed from the last input of operation information ("No" at step S703), the ECG menu control section 175 returns to step S702. In the case where the ECG menu control section 175 determines that the predetermined time period has elapsed from the last input of operation information ("Yes" at step S703), the ECG menu control section 175 displays an automatic slideshow of a selected program (step S704) and completes the processing.

In the case where the ECG menu control section 175 determines that the operation information is input ("Yes" at step S702), the ECG menu control section 175 determines whether movement information is input (step S705). The movement information is received from the remote control 200 and is input to the ECG menu control section 175. In the case where the ECG menu control section 175 determines that the movement information is not input ("No" at step S705), the ECG menu control section 175 proceeds to step S708. In the case where the ECG menu control section 175 determines that the movement information is input ("Yes" at step S705), the ECG menu control section 175 causes a selected program to be changed based on the movement information (step S706). The ECG menu control section 175 causes ECG data corresponding to the selected program to be displayed (step S707).

The ECG menu control section 175 determines whether a purchase request is input (step S708). The purchase request is received from the remote control 200 and is input to the ECG menu control section 175. In the case where the ECG menu control section 175 determines that the purchase request is not input ("No" at step S708), the ECG menu control section 175 completes the processing. In the case where the ECG menu control section 175 determines that the purchase request is input ("Yes" at step S708), the ECG menu control section 175 transmits a purchase request of a selected commercial product to the ECG server 400 (step S709) and completes the processing. The ECG menu control section 175 may return to step S701 after executing step S704, step S708, or step S709.

[1-35. Processing Executed by ECG-ID Processing Section]

Figure 35:
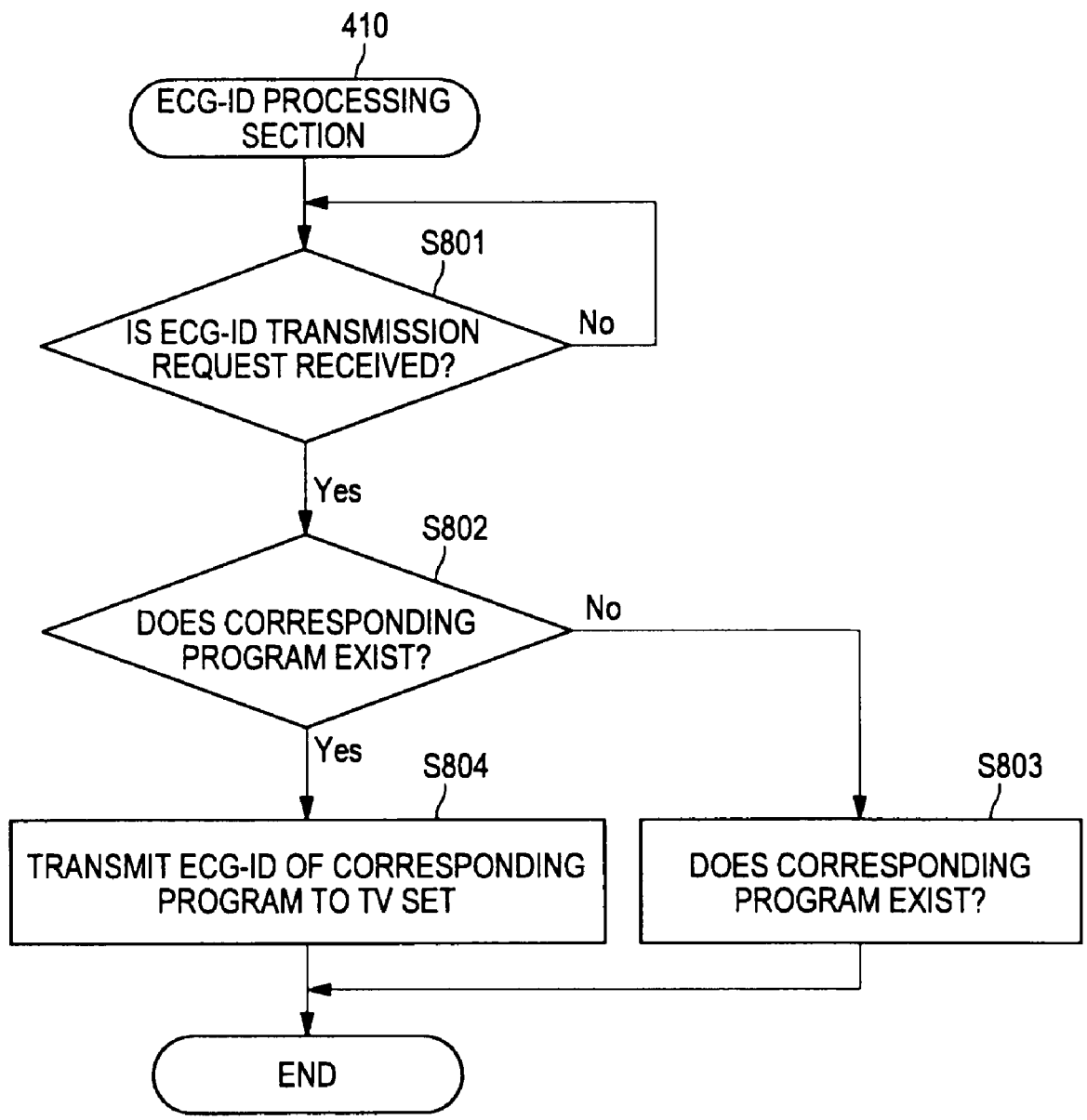
FIG. 35 is a flowchart showing a flow of processing executed by an ECG-ID processing section according to the present embodiment.

FIG. 35 is a flowchart showing a flow of processing executed by an ECG-ID processing section according to the present embodiment. The flowchart shown in FIG. 35 shows an example of the flow of the processing executed by the ECG-ID processing section, and the processing executed by the ECG-ID processing section is not limited to the flow shown in this flowchart.

As shown in FIG. 35, the ECG-ID processing section 410 determines whether the ECG-ID processing section 410 has received an ECG-ID transmission request from the TV set 100 via an ECG-ID transmission request reception section 411 (step S801). In the case where the ECG-ID processing section 410 determines that the ECG-ID processing section 410 has not received the ECG-ID transmission request from the TV set 100 ("No" at step S801), the ECG-ID processing section 410 returns to step S801. In the case where the ECG-ID processing section 410 determines that the ECG-ID processing section 410 has received the ECG-ID transmission request from the TV set 100 ("Yes" at step S801), the ECG-ID processing section 410 determines whether a program corresponding to an ECG-ID is included in the ECG-ID transmission request (step S802).

In the case where the ECG-ID processing section 410 determines that the corresponding program does not exist ("No" at step S802), the ECG-ID processing section 410 transmits a notification indicating that the corresponding program does not exist to the TV set 100 via an ECG-ID transmission section 413 (step S803) and completes the processing. In the case where the ECG-ID processing section 410 determines that the corresponding program exists ("Yes" at step S803), the ECG-ID processing section 410 transmits an ECG-ID of the corresponding program to the TV set 100 via an ECG-ID transmission section 413 (step S804) and completes the processing. The ECG-ID processing section 410 may return to step S801 after executing step S803 or step S804.

[1-36. Processing Executed by Viewing Time List Creation Section]

Figure 36:
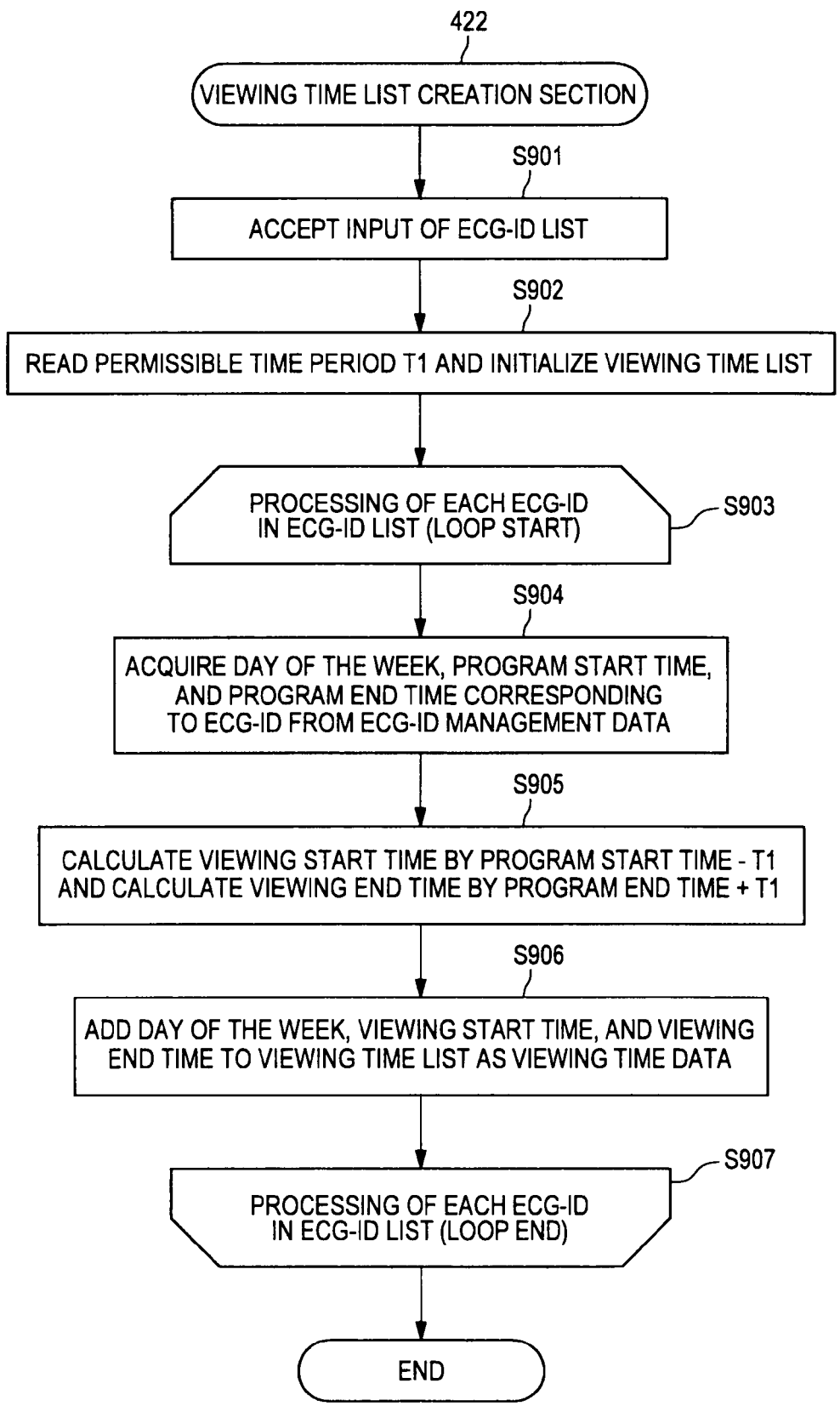
FIG. 36 is a flowchart showing a flow of processing executed by a viewing time list creation section according to the present embodiment.

FIG. 36 is a flowchart showing a flow of processing executed by a viewing time list creation section according to the present embodiment. The flowchart shown in FIG. 36 shows an example of the flow of the processing executed by the viewing time list creation section, and the processing executed by the viewing time list creation section is not limited to the flow shown in this flowchart.

As shown in FIG. 36, the viewing time list creation section 422 accepts an input of an ECG-ID list (step S901). To the viewing time list creation section 422, an ECG-ID list included in the ECG data transmission request received by the ECG data transmission request reception section 421 is output from the ECG data transmission request reception section 421.

The viewing time list creation section 422 reads a permissible time period T1 from the storage section 150 and initializes the viewing time list 436 (step S902). The permissible time period T1 may be set to, for example, two hours. The viewing time list creation section 422 repeats processing (step S903 to step S907) for each ECG-ID in the ECG-ID list. In the repeating processing (step S903 to step S907), the viewing time list creation section 422 acquires a day of the week, a program start time, and a program end time of a corresponding ECG-ID from ECG-ID management data (step S904). The viewing time list creation section 422 calculates a viewing start time by subtracting T1 from the program start time and also calculates a viewing end time by adding T1 to the program end time (step S905). The viewing time list creation section 422 adds the day of the week, the viewing start time, and the viewing end time to the viewing time list 436 as viewing time data (step S906), and proceeds to step S907. The viewing time list creation section 422 completes the processing after executing the repeating processing (step S903 to step S907). The viewing time list creation section 422 may return to step S901 after executing the repeating processing (step S903 to step S907).

[1-37. Processing (Part 1) Executed by ECG Data Acquisition Section]

Figure 37:
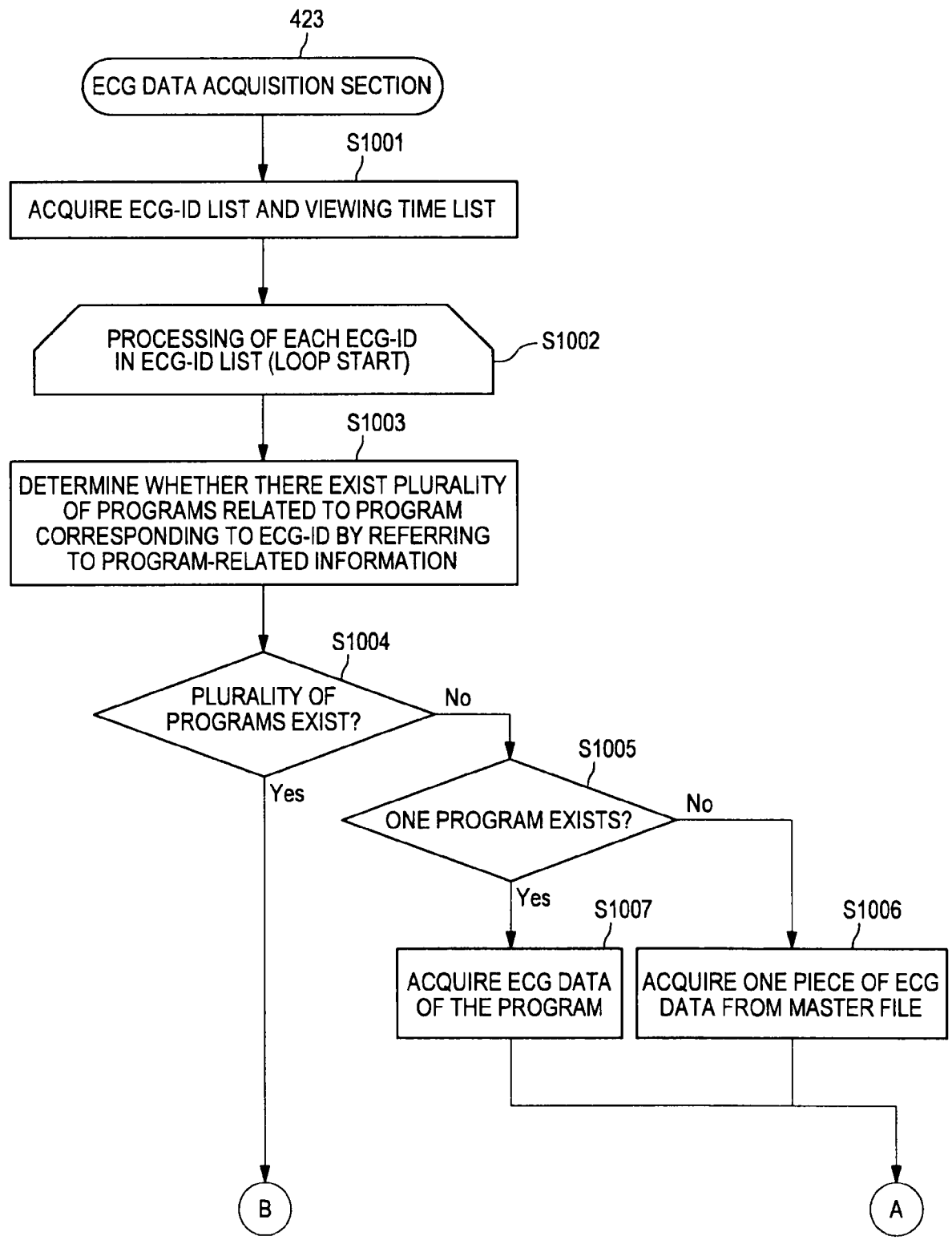
FIG. 37 is a flowchart showing a flow of processing (part 1) executed by an ECG data acquisition section.

FIG. 37 is a flowchart showing a flow of processing (part 1) executed by an ECG data acquisition section. The flowchart shown in FIG. 37 shows an example of the flow of the processing executed by the ECG data acquisition section, and the processing executed by the ECG data acquisition section is not limited to the flow shown in this flowchart.

As shown in FIG. 37, the ECG data acquisition section 423 acquires the ECG-ID list and the viewing time list 436 (step S1001). For example, the ECG data acquisition section 423 acquires an ECG-ID from the viewing time list creation section 422 after the processing of the viewing time list creation section 422 has completed, and acquires the viewing time list 436 from the storage section 430.

The ECG data acquisition section 423 repeats processing (step S1002 to step S1014) for each ECG-ID in the ECG-ID list. In the repeating processing (step S1002 to step S1014), the ECG data acquisition section 423 determines whether there exist a plurality of programs related to a program corresponding to the ECG-ID by referring to the program-related information 435 (step S1003). In the case where the ECG data acquisition section 423 determines that there do not exist a plurality of related programs ("No" at step S1004), the ECG data acquisition section 423 determines whether there exists one related program (step S1005).

In the case where the ECG data acquisition section 423 determines that there exists no related program ("No" at step S1005), the ECG data acquisition section 423 acquires one piece of ECG data from the master file 433 (step S1006) and proceeds to step S1014. In the case where the ECG data acquisition section 423 determines that there exists one related program ("Yes" at step S1005), the ECG data acquisition section 423 acquires the ECG data of the program (step S1007) and proceeds to step S1014.

[1-38. Processing (Part 2) Executed by ECG Data Acquisition Section]

Figure 38:
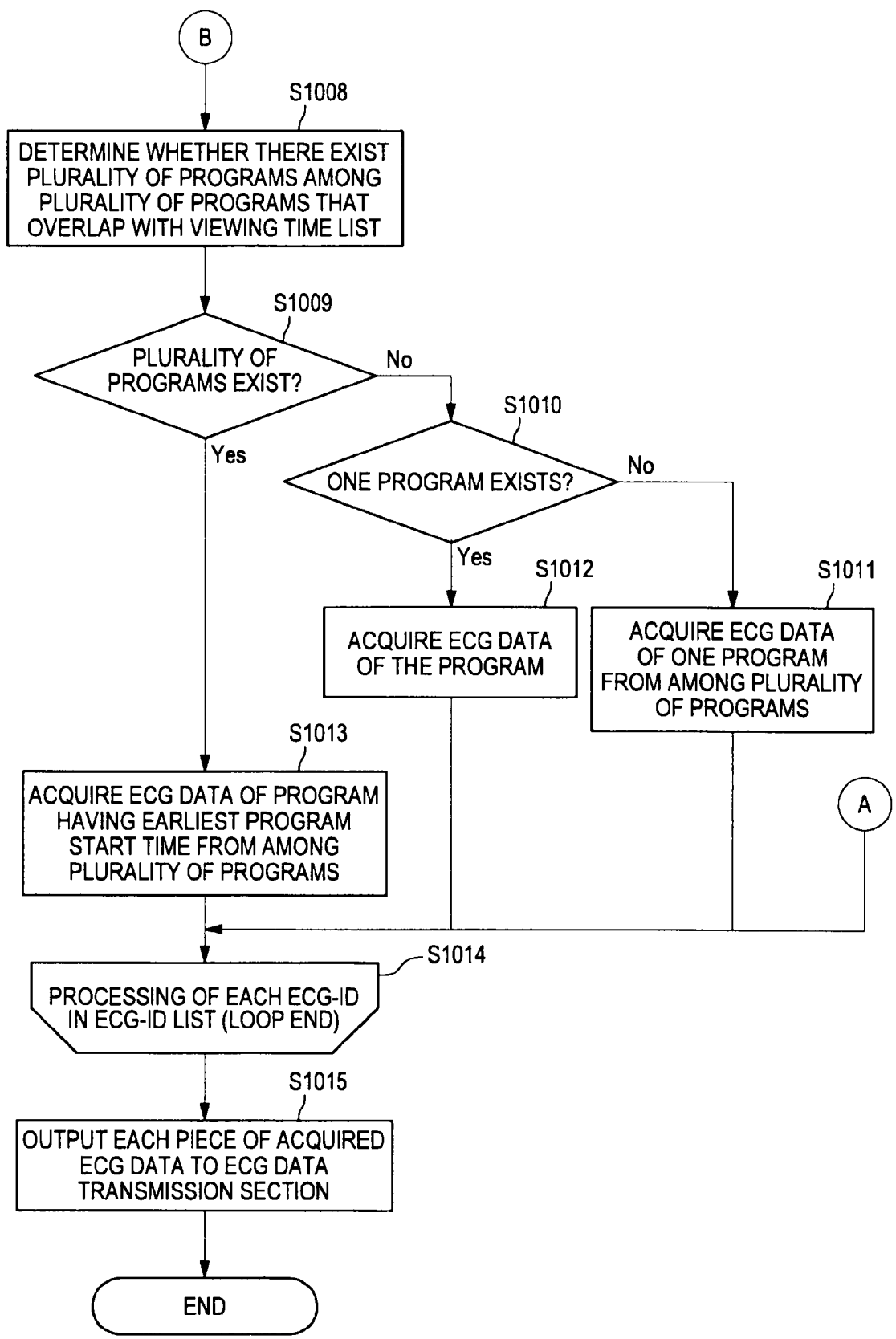
FIG. 38 is a flowchart showing a flow of processing (part 2) executed by the ECG data acquisition section.

FIG. 38 is a flowchart showing a flow of processing (part 2) executed by the ECG data acquisition section. The flowchart shown in FIG. 38 shows an example of the flow of the processing executed by the ECG data acquisition section, and the processing executed by the ECG data acquisition section is not limited to the flow shown in this flowchart.

As shown in FIG. 38, in the case where the ECG data acquisition section 423 determines that there exist a plurality of related programs ("Yes" at step S1004), the ECG data acquisition section 423 determines whether there exist a plurality of programs that overlap with the viewing time list 436 (step S1008). In the case where the ECG data acquisition section 423 determines that there do not exist a plurality of programs that overlap with the viewing time list 436 ("No" at step S1009), the ECG data acquisition section 423 determines whether there exists one program that overlaps with the viewing time list 436 (step S1010).

In the case where the ECG data acquisition section 423 determines that there exists no program that overlaps with the viewing time list 436 ("No" at step S1010), the ECG data acquisition section 423 acquires one piece of ECG data of one program from among the plurality of programs (step S1011) and proceeds to step S1014. In the case where the ECG data acquisition section 423 determines that there exists one program that overlaps with the viewing time list 436 ("Yes" at step S1010), the ECG data acquisition section 423 acquires ECG data of the program and proceeds to step S1014.

In the case where the ECG data acquisition section 423 determines that there exist a plurality of programs that overlap with the viewing time list 436 ("Yes" at step S1009), the ECG data acquisition section 423 acquires ECG data of a program having an earliest program start time from among the plurality of programs (step S1013) and proceeds to step S1014. When the ECG data acquisition section 423 executes the repeating processing (step S1003 to step S1014), the ECG data acquisition section 423 outputs each ECG data to the ECG data transmission section 424 (step S1015) and completes the processing. The ECG data output from the ECG data acquisition section 423 is transmitted to the TV set 100 by the ECG data transmission section 424. The ECG data acquisition section 423 may return to step S1001 after executing step S1015.

[1-39. Example of EPG-SI]

FIG. 39 is a diagram showing an example of EPG-SI. The example of EPG-SI shown in FIG. 39 is merely an example of EPG-SI according to the present embodiment, and hence, the EPG-SI according to the present embodiment is not limited to the EPG-SI shown in FIG. 39.

[1-40. Example of ECG Data]

FIG. 40 is a diagram showing an example of ECG data. The example of ECG data shown in FIG. 40 is merely an example of ECG data according to the present embodiment, and hence, the ECG data according to the present embodiment is not limited to the ECG data shown in FIG. 40.

2. Modified Example of First Embodiment

It should be understood by those skilled in the art that various modifications, combinations, sub-combinations and alterations may occur depending on design requirements and other factors insofar as they are within the scope of the appended claims or the equivalents thereof.

For example, in the present embodiment, a TV set as an example of the information processing apparatus can display on a tuning screen in a superimposed manner an image based on image data included in content-related information. At the present day, there are some cases where TV sets produced by manufacturers are each standardly equipped with a widget function (which is a function of freely performing overlay display of a pop-up menu and the like within a TV screen). According to the widget function, it is possible to display an image and the like at an arbitrary position on a video or on an existing menu screen and to delete the image and the like. The function of the overlay display can be also applied to the function of the superimposing display according to the present embodiment. By doing so, it becomes possible to provide versatile services in collaboration with broadcast stations, as well as realizing a unique menu display on TV and a collaboration with network services. Further, by suggesting a service which becomes a standard, the service can provide users with novel and good operability and can provide broadcast stations with a new place for a program introduction for attracting viewers and a platform for realizing income other than from broadcasting.

3. Summary

According to the present embodiments, when viewed from the business model side and in terms of a relationship between a user, an ECG service company (an example of a provider of content-related information), and a broadcast station (an example of a provider of content), there can be maintained a Win/Win relationship (which is a relationship that all of the user, the ECG service company, and the broadcast station can each earn a profit). The profit that each of the user, the ECG service company, and the broadcast station can earn will be specifically described.

The broadcast station has generally broadcasted, when advertising a program on TV, the program advertisement by being included in video CM or in the video of the program. Since it is necessary for a user to press a data broadcast button for starting viewing data broadcast, there has been few users who watch and listen to data broadcast. When the broadcast station has provided EPG-SI, the EPG-SI could only be displayed in a form of text information on an electronic program guide, and in the case of strongly recommending a program, the broadcast station could not recommend the program by visually expressing information related to the program. According to the present embodiments, the broadcast station can perform an effective ECG service (provision of content-related information) to the users. Accordingly, it becomes possible to increase viewing attraction to the users (for example, the viewing rate of a program of the own station is increased by inducing the viewing attraction of the program of the own station to the users) and income other than from broadcasting (commercial product sales related to the program). Even though the content holders with a central focus on broadcast stations handle ECG data, which serves as an example of content-related information, as valuable information called metadata, there are few business models for effectively providing the ECG data to the users or provision methods for TV in actual conditions. According to the present embodiments, the content holders with a central focus on broadcast stations can effectively provide ECG data, which serves as an example of content-related information, to the users.

As for the user, it becomes possible to view information related to the program of the user's interest on a screen of a TV set without performing complicated operation or maintenance. Further, since it becomes possible to increase an opportunity for the user to know a program which the user has not known, there may be an effect that the tuning operation on the TV set becomes fun. Further, after viewing information related to the program of the user's interest, it is possible to watch and listen to the program and make a recording reservation of the program. Still further, it becomes possible to improve the efficiency of finding a program to be provided from that point by a simple operation, and it also becomes possible to understand the program more deeply. Further, in accordance with a tuning operation of the user, it becomes possible to link a broadcast station selected by the tuning operation with an ECG service (program information service) related to a program provided by the broadcast station, and hence, the operability can be improved.

The ECG service company makes it possible to propose a business model that can build, with respect to the broadcast station, a Win/Win relationship (which is a relationship that both of the ECG service company and the broadcast station can each earn a profit). Accordingly, the ECG service company can stably obtain metadata (e.g., pieces of information that constitute content-related information) from the broadcast station. As a result, the ECG service company can stably provide the user with ECG data which serves as an example of the content-related information. The ECG service company can provide the user with a novel added value related to a program by providing the ECG data to the user. Further, it becomes easier for the ECG service company to expand business to manufacturers and the like and to obtain licensing of the metadata of a commercial product and the like from the manufacturers. When the user purchases the commercial product from a site having the metadata the licensing of which is obtained as ECG data, the ECG service company can earn affiliate income from the manufacturer which produces the commercial product. The ECG service company may collaborate with manufacturers which produce commercial products such as DVD, CD, and books.

Further, according to the present embodiments, the TV set as an example of the information processing apparatus provides ECG data to the user by using viewing history of programs which are watched and listened to by the user. Therefore, the user can be provided with a TV set free from inequality between broadcast stations. Also, it is easy to obtain consensus on providing such TV set to the user from each broadcast station.

In addition, a home appliance maker or the like which produces the TV set as an example of the information processing apparatus causes the TV set to use the function to display a general tuning menu or an EPG electronic program guide, and can easily provide program having a function necessary for the present embodiments via a network. The provision of the program is performed by an asynchronous procedure, and hence can reduce the load on the network.

In the present embodiments, program content is to be used as content. The program content is edited, and the program transits with time. The program content includes the programs provided by, for example, terrestrial digital broadcasting, BS (Broadcasting Satellite) digital broadcasting, and CS (Communications Satellite) digital broadcasting. Further, the program content includes the programs provided via a network, such as IPTV (Internet Protocol TeleVision), and VOD (Video On Demand). Thus, there exit many pieces of program content that can be watched and listened to by the user.

In order to find the program content which the user wants to watch and listened to from among many pieces of program content, the time at which the user performs an operation and the filtering (selection) of the program to be provided are particularly important. However, a complicated GUI (Graphical User Interface) operation is not suitable when the user watches and listens to the TV. Further, when transmission/reception of data is performed frequently at the time of the program content being selected by the user, it may take a long time for the data to be displayed, and the operability may deteriorate. According to the present embodiments, it is possible to extract present preference information of the user within a predetermined range without a complicated maintenance operation to a view log by the user. Further, according to the present embodiments, in order to ensure an uninterrupted response, it is possible to acquire content-related information not by real-time processing but by batch processing.

The present application contains subject matter related to that disclosed in Japanese Priority Patent Application JP 2009-093410 filed in the Japan Patent Office on Apr. 7, 2009, the entire content of which is hereby incorporated by reference.

What is claimed is:

1. An information processing apparatus comprising:
a display section which is capable of displaying information;
an input section which accepts, from a user, an input of content tuning information which is information for identifying a provider that is a providing source of content;
a storage section which stores one or a plurality of pieces of viewed content identification information each of which is information for identifying each of one or a plurality of pieces of content that has been watched and listened to by the user;
a content-related information control section which transmits the one or plurality of pieces of viewed content identification information to another device and receives, from such other device, content-related information related to content having a relationship with respect to viewed content identified by each of the transmitted one or plurality of pieces of viewed content identification information; and
a display control section which causes the display section to display an image based on image data included in each of one or a plurality of pieces of content-related information corresponding to the content tuning information the input of which is accepted by the input section from among respective pieces of content-related information that the content-related information control section have received,
wherein the content-related information control section further receives a relation attribute from such other device, the relation attribute indicating a relationship between the content having a relationship with respect to the viewed content and the viewed content and being correlated with each of the one or plurality of pieces of content-related information,
wherein the content-related information control section further receives a relation point from such other device, the relation point indicating a degree of relationship for the relation attribute between the content having a relationship with respect to the viewed content and the viewed content and being correlated with each of the one or plurality of pieces of content-related information,
wherein the display control section decides a priority order of the one or plurality of pieces content-related information based on the degree of respective relation points, and causes the display section to display a plurality of images one at a time based on image data included in each of the one or plurality of pieces of content-related information according to the decided priority order.

2. The information processing apparatus according to claim 1,
wherein the display control section further causes the display section to display the relation attribute received by the content-related information control section by being correlated with the image which is displayed based on the image data included in each of the one or plurality of pieces of content-related information which is received by being correlated with the relation attribute.

3. The information processing apparatus according to claim 1,
wherein the display control section causes a predetermined tuning screen to be displayed on the display section and also switches the predetermined tuning screen which is displayed on the display section to a tuning screen depending on the content tuning information the input of which is accepted by the input section, and causes the image to be displayed on the tuning screen which is being displayed on the display section in an overlapping manner based on the image data.

4. The information processing apparatus according to claim 1,
wherein the input section is capable of accepting an input of image selection information for selecting one image from the images displayed on the display section and a recording reservation request for performing recording reservation of content, and
wherein, when the input section accepts the inputs of the image selection information and the recording reservation request, the display control section acquires, from the content-related information including the image data which is a source of the image selected by the image selection information, tuning information for identifying the provider that provides content related to the content-related information and a start time from which the content is provided from the provider, and registers in the storage section recording reservation information obtained by correlating the acquired tuning information with the start time.

5. The information processing apparatus according to claim 4, further comprising
a recording processing section which manages a current time and, when the current time reaches the start time included in the recording reservation information stored in the storage section, stores in the storage section the content received from the provider identified by the tuning information stored in the storage section by being correlated with the start time.

6. The information processing apparatus according to claim 1, wherein the relation attribute is one of a program characteristic, genre, location, and cast of a television program.

7. The information processing apparatus according to claim 1, wherein the display control section causes the display section to display the plurality of images simultaneously on the display section at predetermined positions while overlapping a pre-existing content on the display section.

8. An information providing apparatus comprising:
a storage section which stores program-related information obtained by being correlated with content identification information used for identifying each piece of related content and also stores content-related information related to content;
a content-related information acquisition section which receives one or a plurality of pieces of viewed content identification information from another device, acquires the content identification information correlated with each of the received one or plurality of pieces of viewed content identification information from the program-related information stored in the storage section, and acquires content-related information related to content identified by the acquired content identification information from the storage section; and
a content-related information transmission section which transmits the content-related information acquired by the content-related information acquisition section to such other device,
wherein the storage section further stores a relation attribute which indicates a relationship with related content by correlating the relation attribute with content identification information for identifying each of the pieces of related content and by causing the relation attribute to be included in the program-related information,
wherein the storage section further stores a relation point which indicates a degree of relationship for the relation attribute with related content by correlating the relation point with content identification information for identifying each of the pieces of related content and by causing the relation point to be included in the program-related information,
wherein the content-related information acquisition section correlates the relation point which is correlated with the acquired content identification information and included in the program-related information with the content-related information related to content identified by the acquired content identification information, and
wherein the content-related information transmission section further transmits to such other device the relation point correlated with the content-related information by the content-related information acquisition section to cause the such other device to decide a priority order of the one or plurality of pieces content-related information based on the degree of respective relation points, and cause such other device to display a plurality of images on a display section of the other device one at a time based on image data included in each of the one or plurality of pieces of content-related information according to the decided priority order.

9. The information providing apparatus according to claim 8,
wherein the content-related information acquisition section correlates the relation attribute which is correlated with the acquired content identification information and included in the program-related information with the content-related information related to content identified by the acquired content identification information, and
wherein the content-related information transmission section further transmits to such other device the relation attribute correlated with the content-related information by the content-related information acquisition section.

10. The information providing apparatus according to claim 8, further comprising a viewing time list creation section,
wherein the storage section further stores content management information with which the content identification information and a provision start time, a provision end time, and a day of the week of a provision time are correlated, the provision time being a time period during which content identified by the content identification information is provided by the provider, and also stores a predetermined permissible time period,
wherein the viewing time list creation section acquires the provision start time, the provision end time, and the day of the week correlated with each of the one or plurality of pieces of viewed content identification information received by the content-related information acquisition section from the content management information stored in the storage section, calculates a viewing start time which corresponds to a time earlier than the acquired provision start time by the predetermined permissible time period and a viewing end time which corresponds to a time later than the acquired provision end time by the predetermined permissible time period, and registers viewing time data obtained by being correlated with the calculated viewing start time, the calculated viewing end time, and the day of the week in the storage section, and
wherein the content-related information acquisition section acquires the day of the week, the provision start time, and the provision end time correlated with each of the acquired pieces of content identification information from the content management information stored in the storage section, determines whether it is registered in the storage section that at least one piece of viewing time data in which the acquired day of the week corresponds to the day of the week and a part of or entire time period from the acquired provision start time to the acquired provision end time overlaps with a part of or entire time period from the viewing start time to the viewing end time, and acquires content-related information related to content identified by the content identification information which is determined to be registered from the storage section.

11. An information processing system comprising an information processing apparatus and an information providing apparatus, wherein the information processing apparatus has a display section which is capable of displaying information, a storage section which stores one or a plurality of pieces of viewed content identification information each of which is information for identifying each of one or a plurality of pieces of content that has been watched and listened to by a user, a content-related information control section which transmits the one or plurality of pieces of viewed content identification information to the information providing apparatus and receives, from the information providing apparatus, content-related information related to content having a relationship with respect to viewed content identified by each of the transmitted one or plurality of pieces of viewed content identification information, and a display control section which causes the display section to display an image based on image data included in the content-related information that the content-related information control section has received, wherein the content-related information control section further receives a relation attribute from the information providing apparatus, the relation attribute indicating a relationship between the content having a relationship with respect to the viewed content and the viewed content and being correlated with each of the one or plurality of pieces of content-related information, wherein the content-related information control section further receives a relation point from the information providing apparatus, the relation point indicating a degree of relationship for the relation attribute between the content having a relationship with respect to the viewed content and the viewed content and being correlated with each of the one or plurality of pieces of content-related information, and wherein the display control section decides a priority order of the one or plurality of pieces content-related information based on the degree of respective relation points, and causes the display section to display a plurality of images one at a time based on image data included in each of the one or plurality of pieces of content-related information according to the decided priority order, and wherein the information providing apparatus has a storage section which stores program-related information obtained by being correlated with content identification information used for identifying each piece of related content and also stores content-related information related to content, a content-related information acquisition section which receives one or a plurality of pieces of viewed content identification information from the information processing apparatus, acquires the content identification information correlated with each of the received one or plurality of pieces of viewed content identification information from the program-related information stored in the storage section, and acquires content-related information related to content identified by the acquired content identification information from the storage section, and a content-related information transmission section which transmits the content-related information acquired by the content-related information acquisition section to the information processing apparatus.

* * * * *